US012784034B2

(12) United States Patent
Vijayan et al.

(10) Patent No.: US 12,784,034 B2
(45) Date of Patent: Nov. 3, 2026

(54) SYSTEMS AND METHODS FOR INSTANT NFTs AND PROTECTION STRUCTURE, DETECTION OF MALICIOUS CODE WITHIN BLOCKCHAIN SMART CONTRACTS, TOKENS WITH TRANSFER LIMITATIONS, MIRROR TOKENS AND PARALLEL ADDRESSES, SMART CONTRACT RISK SCORING METHOD, AND CROSS-DEVICE DIGITAL RIGHTS MANAGEMENT

(71) Applicant: Artema Labs, Inc, Los Angeles, CA (US)

(72) Inventors: Madhu Vijayan, Venice, CA (US); Bjorn Markus Jakobsson, New York, NY (US); Keir Finlow-Bates, Eura (FI); Stephen C. Gerber, Austin, TX (US); Perry R. Cook, Jacksonville, OR (US); Guy Stewart, Olympia, WA (US); Kenneth Rosen, Portola Valley, CA (US)

(73) Assignee: Artema Labs, Inc, Los Angeles, CA (US)

( * ) Notice: Subject to any disclaimer, the term of this patent is extended or adjusted under 35 U.S.C. 154(b) by 105 days.

(21) Appl. No.: 18/299,546

(22) Filed: Apr. 12, 2023

(65) Prior Publication Data

US 2023/0325814 A1 Oct. 12, 2023

Related U.S. Application Data

(60) Provisional application No. 63/476,352, filed on Dec. 20, 2022, provisional application No. 63/387,476,
(Continued)

(51) Int. Cl.
*G06Q 20/36* (2012.01)
*G06Q 20/38* (2012.01)

(52) U.S. Cl.
CPC ..... *G06Q 20/3672* (2013.01); *G06Q 20/3827* (2013.01); *G06Q 20/3829* (2013.01); *G06Q 20/389* (2013.01)

(58) Field of Classification Search
None
See application file for complete search history.

(56) References Cited

U.S. PATENT DOCUMENTS 5,913,061 A * 6/1999 Gupta ........................ G06F 9/54
719/310
6,865,545 B1 3/2005 Epstein et al.
(Continued)

FOREIGN PATENT DOCUMENTS

WO WO-2016065153 A2 * 4/2016 ............. G06Q 30/06
WO 2021054989 A1 3/2021
WO WO-2022159519 A1 * 7/2022 ........... G06Q 20/065

OTHER PUBLICATIONS

Balagolla et al., "Credit Card Fraud Prevention Using Blockchain", 2021 6th International Conference for Convergence in Technology (12CT), 2021, pp. 1-8.
(Continued)

*Primary Examiner* — Jahed Ali
(74) *Attorney, Agent, or Firm* — KPPB LLP

(57) ABSTRACT

Non-fungible token (NFT) platforms in accordance with various embodiments of the invention are described. In an embodiment of the NFT platform includes generating an instant NFT that includes data, at least one record, and a first timestamp, where the instant NFT is privately maintained and not publicly accessible; determine a modification to the at least one record associated with the instant NFT to generate several records associated with the instant NFT,
(Continued)

where the modification is indicative of a transaction associated with the instant NFT; protect the instant NFT and the modification to the at least one record associated with the instant NFT, where the modification to the at least one record is associated with a second timestamp; detect an indication to mint the instant NFT as an NFT; and mint the instant NFT as an NFT on a public blockchain.

20 Claims, 54 Drawing Sheets

Related U.S. Application Data filed on Dec. 14, 2022, provisional application No. 63/370,099, filed on Aug. 1, 2022, provisional application No. 63/368,868, filed on Jul. 19, 2022, provisional application No. 63/365,186, filed on May 23, 2022, provisional application No. 63/362,880, filed on Apr. 12, 2022.

(56) References Cited

U.S. PATENT DOCUMENTS

| | | | | |
|---|---|---|---|---|
| 10,108,909 | B2 | 10/2018 | Sulavik et al. | |
| 10,373,129 | B1 | 8/2019 | James et al. | |
| 10,946,283 | B1 * | 3/2021 | Meilich | G06Q 20/3674 |
| 11,139,955 | B1 | 10/2021 | So et al. | |
| 11,562,451 | B1 * | 1/2023 | Kozlowski, III | G06F 16/27 |
| 11,641,283 | B2 | 5/2023 | Fletcher et al. | |
| 11,909,860 | B1 | 2/2024 | So et al. | |
| 11,961,142 | B2 | 4/2024 | Leshner et al. | |
| 11,966,886 | B2 | 4/2024 | Hunter et al. | |
| 12,067,308 | B2 * | 8/2024 | Baker | H04L 63/10 |
| 12,271,898 | B1 | 4/2025 | Arvanaghi et al. | |
| 2012/0296716 | A1 | 11/2012 | Barbeau et al. | |
| 2016/0062821 | A1 * | 3/2016 | Yoon | G06F 11/1048<br>714/763 |
| 2017/0116693 | A1 * | 4/2017 | Rae | G06Q 50/184 |
| 2019/0287101 | A1 | 9/2019 | Xia et al. | |
| 2019/0303932 | A1 | 10/2019 | Klaedtke | |
| 2019/0333030 | A1 | 10/2019 | Ramasamy et al. | |
| 2020/0364813 | A1 | 11/2020 | Turgman et al. | |
| 2020/0380624 | A1 | 12/2020 | Turgman et al. | |
| 2021/0035246 | A1 * | 2/2021 | Schouppe | H04L 9/50 |
| 2021/0065302 | A1 | 3/2021 | Leshner et al. | |
| 2021/0110474 | A1 | 4/2021 | Morrow et al. | |
| 2021/0119807 | A1 | 4/2021 | Chen et al. | |
| 2021/0133735 | A1 | 5/2021 | Maim | |
| 2021/0166223 | A1 | 6/2021 | Moiyallah et al. | |
| 2021/0248214 | A1 * | 8/2021 | Goldston | G06F 21/16 |
| 2021/0357927 | A1 | 11/2021 | Kita et al. | |
| 2022/0084013 | A1 | 3/2022 | Kulkarni et al. | |
| 2022/0108232 | A1 * | 4/2022 | Hardgrave | G06Q 50/12 |
| 2022/0122050 | A1 | 4/2022 | Pacella et al. | |
| 2022/0138640 | A1 * | 5/2022 | Augustine | H04L 67/535<br>705/5 |
| 2022/0139566 | A1 * | 5/2022 | Gardina | G16B 50/20<br>705/2 |
| 2022/0239495 | A1 * | 7/2022 | Norton | H04L 9/0825 |
| 2022/0309491 | A1 * | 9/2022 | Shapiro | G06F 21/64 |
| 2022/0309504 | A1 | 9/2022 | Joseph et al. | |
| 2022/0329446 | A1 * | 10/2022 | Jackson | H04L 9/3247 |
| 2022/0351189 | A1 | 11/2022 | Gardner | |
| 2022/0391895 | A1 * | 12/2022 | Weber | G06Q 20/3823 |
| 2023/0017499 | A1 | 1/2023 | Agrawal | |
| 2023/0055618 | A1 * | 2/2023 | Jakobsson | G06Q 20/3674 |
| 2023/0073140 | A1 * | 3/2023 | Richter | G06Q 20/02 |
| 2023/0073859 | A1 * | 3/2023 | Matthews | G06Q 30/0641 |
| 2023/0092012 | A1 | 3/2023 | Matthews et al. | |
| 2023/0104103 | A1 * | 4/2023 | Eby | G06Q 20/3678<br>705/69 |
| 2023/0108983 | A1 * | 4/2023 | Vosseller | G06Q 20/38215<br>705/76 |
| 2023/0123993 | A1 * | 4/2023 | Meyers | H04L 9/3213<br>705/69 |
| 2023/0124806 | A1 | 4/2023 | Quigley et al. | |
| 2023/0139878 | A1 * | 5/2023 | Clark | H04L 9/3297<br>713/157 |
| 2023/0162180 | A1 * | 5/2023 | Deng | G06Q 20/381<br>705/64 |
| 2023/0169578 | A1 * | 6/2023 | Krishna | G06Q 30/0625<br>705/27.1 |
| 2023/0186281 | A1 * | 6/2023 | Todasco | G06Q 20/38215<br>705/64 |
| 2023/0261869 | A1 * | 8/2023 | Russell, III | G06F 21/6218<br>726/9 |
| 2023/0274244 | A1 | 8/2023 | Quigley et al. | |
| 2023/0274283 | A1 * | 8/2023 | Kryvoshei | H04L 9/3213 |
| 2023/0298001 | A1 * | 9/2023 | Jethmalani | G06Q 20/065<br>705/65 |
| 2023/0306543 | A1 * | 9/2023 | Beaty | H04L 9/3236 |
| 2023/0394455 | A1 * | 12/2023 | Meyers | G06Q 20/3674 |
| 2024/0144262 | A1 | 5/2024 | Zhang et al. | |
| 2024/0171399 | A1 | 5/2024 | Gopi et al. | |
| 2026/0189565 | A1 | 7/2026 | Jakobsson | |

OTHER PUBLICATIONS

Elsden et al., “Making Sense of Blockchain Applications: A Typology for HCI”, In Proceedings of the 2018 CHI Conference on Human Factors in Computing Systems (CHI ’18). Association for Computing Machinery, 2018, Paper 458, pp. 1-14.

* cited by examiner

Instant NFTs and Protection Structure

Instant NFTs and Protection Structure

Smart Contract Risk Scoring Method

Smart Contract Risk Scoring Method

Smart Contract Risk Scoring Method

Smart Contract Risk Scoring Method

Smart Contract Risk Scoring Method

Smart Contract Risk Scoring Method

Detection of Malicious Code within Blockchain Smart Contracts

Tokens with transfer limitations

Tokens with transfer limitations

3420

Token Ledger

| Token Id (3510) | Owner (3520) | URL (3530) | Transfer count (3540) |
|---|---|---|---|
| 1 | 0xabc…def | https://…/1.json | 3 |
| 2 | 0x123…456 | https://…/2.json | 0 |
| 3 | 0x987…654 | https://…/3.json | 2 |

Fig. 35

Tokens with transfer limitations

Tokens with transfer limitations

Mirror tokens and parallel addresses

Mirror tokens and parallel addresses

Mirror tokens and parallel addresses

Mirror tokens and parallel addresses

Mirror tokens and parallel addresses

Cross-Device Digital Rights Management

SYSTEMS AND METHODS FOR INSTANT NFTs AND PROTECTION STRUCTURE, DETECTION OF MALICIOUS CODE WITHIN BLOCKCHAIN SMART CONTRACTS, TOKENS WITH TRANSFER LIMITATIONS, MIRROR TOKENS AND PARALLEL ADDRESSES, SMART CONTRACT RISK SCORING METHOD, AND CROSS-DEVICE DIGITAL RIGHTS MANAGEMENT

CROSS-REFERENCE TO RELATED APPLICATION

This application claims benefit of and priority under 35 U.S.C. 119(e) to U.S. Provisional Patent Application No. 63/362,880 entitled "Instant NFTs and Protection Structure", filed Apr. 12, 2022, and to U.S. Provisional Patent Application No. 63/365,186 entitled "Detection of Malicious Code within Blockchain Smart Contracts", filed May 23, 2022, and to U.S. Provisional Patent Application No. 63/368,868 entitled "Tokens with Transfer Limitations", filed Jul. 19, 2022 and to U.S. Provisional Patent Application No. 63/370,099 entitled "Mirror Tokens and Parallel Addresses", filed Aug. 1, 2022, and to U.S. Provisional Patent Application No. 63/387,476 entitled "Smart Contract Risk Scoring Method", filed Dec. 14, 2022, and to U.S. Provisional Patent Application No. 63/476,352 entitled "Cross-Device Digital Rights Management", filed Dec. 20, 2022, the disclosures of which are hereby incorporated by reference in their entirety for all purposes.

FIELD OF THE INVENTION

This invention relates to tokens including non-fungible tokens (NFTs) in distributed and tokenized environments. In particular, to environments that provide protection against token-based malicious scripts.

BACKGROUND

The emergence of Non-Fungible Token (NFT) marketplaces has allowed content creators (e.g., artists, musicians, among others) to reach buyers. Furthermore, the trading of NFTs is becoming increasingly common. In particular, an NFT may be used for assigning a digital representation of ownership for digital items, such as images, but also other physical items. As NFTs become increasingly complex, it can be increasingly difficult to protect against potential abuses, including protecting against malicious scripts.

The relationship between artists and fans can be made difficult by numerous factors. The desired level of scarcity of an artwork may elevate the sale price, but disappoint fans that are unable to enjoy the work. Such scarcity drives artists to create new art to sell, which can involve significant work. The burdens of keeping up with demand can overtax artists, and restrict their ability to innovate and create varied artworks. To reduce such demands, artists often sell many copies of a same piece, which decreases value and compromises the sense of scarcity. The artist can number and sign the series, but all of the "prints" are identical in every other way. Art sold as non-fungible tokens (NFTs) enables artists to create editions, or multiple "copies" of an art work, but pricing needs put pressure on the artist to limit the supply which in turn frustrates buyers that would like to obtain an entire artist's portfolio. Collectors wishing to collect a large portion or all of an artist's portfolio are prevented from comparing the works of an artist due to supply constraints and the collector can also miss out on creating fan communities around the series of unique works.

SUMMARY OF THE INVENTION

Systems and methods for providing generating personal profile record NFTs in distributed and tokenized environments in accordance with various embodiments of the invention are described. One embodiment includes a non-fungible token (NFT) platform for processing tokens in a distributed computing environment, including: a network interface; memory; and at least one processor executing on at least one computing unit from several computing units in a distributed computing environment, where a processor is configured to: generate an instant NFT comprising data, at least one record, and a first timestamp, wherein the instant NFT is privately maintained; determine a modification to the at least one record associated with the instant NFT to generate a plurality of records associated with the instant NFT, wherein the modification is indicative of a transaction associated with the instant NFT; protect the instant NFT and the modification to the at least one record associated with the instant NFT, wherein the modification to the at least one record is associated with a second timestamp; detect an indication to mint the instant NFT as an NFT; and mint the instant NFT as an NFT on a public blockchain.

In a further embodiment, protecting the instant NFT and the modification to the at least one record associated with the instant NFT comprises performing at least protection technique selected from the group consisting of: recording a value representing the plurality of records associated with the instant NFT on a private blockchain and a public blockchain; digitally signing using a private key associated with a certified public key, wherein the certification indicates a level of trust associated with a holder of the private key; recording the modification by time-stamping an updated collection resulting from the modification of the record; and storing in a secure store area in a format that provides audit of access and modification.

In a further embodiment, the recording the modification by time-stamping of the updated collection comprises generating a hash of edits in a hash chain, and incorporating a current hash value of the chain in a blockchain entry.

In a further embodiment, a processor is further configured to: generate a plurality of instant NFTs, each associated with a record from a plurality of records; time-stamp the plurality of records as a collection; and generate a hash of the collection; and record the hash on a blockchain.

In a further embodiment, protecting the instant NFT and the modification to the at least one record associated with the instant NFT comprises storing in a secure storage area in a format that enables auditing of access to data and auditing of modifications to data stored in the secure storage area, wherein the secure storage area is incorporated into a wallet.

In a further embodiment, the minted NFT indicates at least one public key associated with prior ownerships, wherein minting the instant NFT as an NFT on the public blockchain comprises specifying a most recent owner as an owner of the NFT.

In a further embodiment, the at least one record associated with the instant NFT is associated with an ownership that confers at least one right on an associated entity, wherein the modification is a modification of ownership.

In a further embodiment, the detecting the indication to mint the instant NFT as the NFT comprises receiving a request to mint the NFT from a user.

In a further embodiment, detecting the indication to mint the instant NFT as the NFT comprises detecting an occurrence of a triggering event based on a policy specified for the NFT.

In a further embodiment, the instant NFT is a first instant NFT, wherein a processor is configured to: generate a second instant NFT; detect a modification to the at least one record associated with the second instant NFT, wherein the modification is indicative of a transaction associated with the instant NFT; detect that the transaction is at least one transaction selected from the group consisting of an accidental transaction and a fraudulent transaction; and revert the modification to the at least one record associated with the second instant NFT.

One embodiment includes a method for handling data associated with an instant NFT, an instant NFT referring to data that is maintained and which represents an NFT to be minted at a later stage, wherein the instant NFT is associated with a first time stamp, the method comprising: determining (110) a modification of one or more records, such as indicating an ownership transfer of the instant NFT, protecting (120) the instant NFT and the modification thereof, the protection comprising recording a value representing two or more of records on a blockchain, including a private blockchain; digitally signing using a private key associated with a certified public key, where the certification indicates a level of trust associated with the private key holder; recording the determined modification by time-stamping an updated collection resulting from the modification of the record; and storing in a secure storage area in a format that enables audit of access and modification.

In a further embodiment, the protecting of the instant NFT and the modification thereof comprises storing in a secure storage area in a format that enables audit of access and modification, wherein the storage area is incorporated into a wallet.

In a further embodiment, the time-stamping of the updated collection comprises minting a new NFT associated with the updated collection.

In a further embodiment, the minting of the new NFT comprises reading the one or more records comprising data related to the recorded modification, and generating a new record for the minted NFT from the data that is read.

In a further embodiment, the time-stamping of the updated collection comprises including (130) a hash of the edits in a hash chain, and incorporating (135) the current hash value of the chain in a blockchain entry.

In a further embodiment, the record in the collection identifies one or more events related to the instant NFT, wherein the instant NFT corresponds to one or more such records.

In a further embodiment, the minted NFT, also referred to as the converted instant NFT, indicates, one or more public keys associated with prior ownerships, and where the most recent owner is represented as the NFT is minted by being recorded on a blockchain.

In a further embodiment, the method is performed by a device implemented in one or more of a wallet, node, server and computer.

One embodiment includes a method for lowering costs associated with the management of ownership information, the method comprising: receiving input comprising a record representing data, where the record represents a non-fungible token (NFT) or comprises data to be used in the minting of an NFT; wherein the record is associated with an ownership, and wherein the ownership confers at least one right on an entity to which the ownership is associated; wherein: an event is observed, the event triggering a modification of ownership; the further method further comprising: recording a modification of ownership corresponding to an action comprising at least one of (a) combining at least two records and recording a value representing their combination on a blockchain; (b) digitally signing at least a value associated with the record using a private key associated with a certified public key, where the certification indicates a level of trust associated with the private key holder; and (c) storing in a secure storage area of a value associated with the record, in a format that enables audit of access and modification.

In a further embodiment, the record comprises data to be used in the minting of an NFT, and wherein an NFT is minted based on said data.

In a further embodiment, the method is performed by a device implemented in one or more of a wallet, node, server and computer.

One embodiment includes a non-fungible token (NFT) platform for processing tokens in a distributed computing environment, comprising: a network interface; memory; and at least one processor executing on at least one computing unit from a plurality of computing units in a distributed computing environment, wherein a processor is configured to: obtain a token, wherein the token is associated with at least one smart contract, the at least one smart contract comprising at least one smart contract component having executable instructions; generate a risk score by: accessing a database and analyzing records associated with the at least one smart contract component, wherein the risk score is based on determining an existence of records associated with the at least one smart contract component and, upon determining a lack of records, computing the risk score based on an evaluation of the smart contract component; and perform a security action based on the risk score.

In a further embodiment, evaluating the smart contract component comprises executing the smart contract component in a sandbox environment to determine whether there is malicious behavior.

In a further embodiment, executing the smart contract in the sandbox environment comprises: copying at least a portion of the smart contract to the sandbox environment; copying at least a portion of a blockchain to the sandbox environment; executing a transaction to the portion of the blockchain to test the smart contract; and analyzing effects of the transaction.

In a further embodiment, generating the risk score comprises analyzing data obtained from a plurality of different sources, wherein the plurality of different sources comprise different digital wallets that have executed the smart contract.

In a further embodiment, generating the risk score comprises utilizing ratings provided by a certified trusted entity.

In a further embodiment, generating the risk score comprises generating a plurality of risk scores.

In a further embodiment, each risk score of the plurality of risk scores is associated with a different dimension, wherein a first dimension associates a level of risk associated with the smart contract, and a second dimension indicates a certainty value.

In a further embodiment, each risk score of the plurality of risk scores is associated with a rule of a plurality of individual rules in the smart contract, In a further embodiment, generating the risk score comprises failing to identify records associated with the at least one smart contract component in the database and weighting a first risk score of the plurality of risk scores with a null value.

In a further embodiment, a processor is further configured to generating an entry in the database, wherein the entry comprises a reference to the smart contract component and the risk score.

In a further embodiment, a processor is further configured to generating the risk score based on an identify of a creator of the smart contract component, wherein the identify is digitally signed.

In a further embodiment, the security action is at least one security action selected from the group consisting of: blocking the token from being evaluated by a wallet, blocking an evaluation of the smart contract, notifying a user of a risk, allowing the smart contract to be evaluated by a wallet, and evaluating the smart contract in a sandbox environment, and notifying a third party.

In a further embodiment, the database is decentralized.

In a further embodiment, the database is accessed by a wallet of a user.

In a further embodiment, generating the risk score comprises determining a number of times the smart contract has been evaluated.

In a further embodiment, the records comprise a replacement smart contract component to be utilized instead of the smart contract component.

In a further embodiment, the replacement smart contract is digitally signed.

In a further embodiment, the replacement smart contract comprises a patch.

In a further embodiment, the replacement smart contract comprises a reference to an external resource used for executing at least a portion of the smart contract.

One embodiment includes a method for determining a risk associated with a token, the token being associated with at least one smart contract, the at least one smart contract being comprised of at least one smart contract component, said smart contract component having at least one of executable instructions and configuration data pertaining to executable instructions, comprising: based on the token, determining the at least one smart contract; based on the at least one smart contract, determining the at least one smart contract component; accessing a database to determine whether it contains a record associated with the at least one smart contract component, wherein if the database contains the record associated with the at least one smart contract component, obtaining a first risk score from the record, and otherwise, generating a second risk score based on an evaluation of the smart contract component; and based on at least one of the first risk score or the second risk score, determining a security action.

In a further embodiment, an entry is created in the database, the entry comprising a reference to the smart contract component and the second risk score.

In a further embodiment, the first risk score is based on an identity of the creator of the smart contract component.

In a further embodiment, an indicator of the identity is digitally signed.

In a further embodiment, the security action is blocking the token from being evaluated by a wallet.

In a further embodiment, the security action is blocking an evaluation of the smart contract.

In a further embodiment, the security action is notifying a user of a risk.

In a further embodiment, the security action is allowing the smart contract to be evaluated by a wallet.

In a further embodiment, the security action is evaluating the smart contract in a sandbox.

In a further embodiment, the database is decentralized.

In a further embodiment, the database is accessed by a wallet of a user.

In a further embodiment, the risk score indicates a certainty.

In a further embodiment, the risk score comprises at least two scores.

In a further embodiment, the record indicates a commonality of the smart contract component, said commonality corresponding to a number of times it has been evaluated.

In a further embodiment, the security action comprises the notification of a third party.

In a further embodiment, the third party is an insurance provider associated with a wallet associated with the token.

In a further embodiment, the record comprises a replacement smart contract component to be utilized instead of the smart contract component.

In a further embodiment, the replacement smart contract is digitally signed.

In a further embodiment, the replacement smart contract comprises a patch.

In a further embodiment, the replacement smart contract comprises a reference to an external resource used for executing at least a portion of the smart contract.

One embodiment includes a method for limiting an execution of a function in a smart contract, the function comprising a digital signature verification key and protected code, wherein a transaction for executing the protected code is accepted and the protected code is executed if the transaction comprises a payload signed with a digital signing key and the payload is verified as signed with the digital signing key by the smart contract using the digital signature verification key.

In a further embodiment, the protected code is not executed if the payload is not verified as signed with the digital signing key by the smart contract using the digital signature verification key.

In a further embodiment, the payload comprises one or more parameters for the function.

One embodiment includes a method for safeguarding against abuse with regard to a smart contract associated with a digital asset, the method comprising; obtaining a smart contract, evaluating the smart contract by parsing the smart contract into one or more code segments, and determining an individual safety level of the code segment(s), determining an overall safety level of the smart contract based on the individual safety levels of the one or more code segments; and performing a security action based on the determination of the security level, wherein the security action comprises at least one of: (a) blocking the smart contract from being executed, (b) generating a notification to a user associated with the digital asset, (c) initiating additional analysis of the smart contract, and (d) blocking transactions to the smart contract.

In a further embodiment, the method is triggered by the detection initiating of an action.

In a further embodiment, the determining of individual safety levels of the one or more code segments comprises querying a database comprising records of code segments of smart contracts that have previously been evaluated with regard to malicious content.

In a further embodiment, the determining of individual safety levels of the one or more code segments comprises scanning one or more blockchains for existing or newly deployed smart contracts and evaluating any detected smart contracts.

In a further embodiment, a wallet comprises the obtained smart contract.

In a further embodiment, the overall safety level is based on the presence of a subscription in the smart contract.

In a further embodiment, the overall safety level is based on the detection of an anomaly associated with the smart contract.

One embodiment includes a method performed by a node or smart contract of a digital asset associated with the node for imposing a limit on a number of transfers of ownership of the digital asset, wherein the digital asset is associated with a counter initialized with a value corresponding to the number of transfers of the digital asset that are permitted, and the method comprising: receiving information that a transaction for transferring the digital asset from an owner to a receiver has occurred, determining whether the counter should be decremented and decrementing the counter if it is determined that the counter should be decremented.

In a further embodiment, the determining whether the counter should be decremented comprises determining that the receiver is on a list of receivers for which the counter is not decremented, wherein the counter is not decremented if the receiver is on the list.

In a further embodiment, the method further comprising obtaining the value of the counter, and if the counter value equals zero then blocking the transaction for transferring the digital asset from the owner to the receiver.

In a further embodiment, the association between the digital asset and the counter comprises a smart contract of the digital asset identifying the counter and a value of the counter.

In a further embodiment, the association between the digital asset and the counter comprises a data mapping storing a number of allowed transfers remaining for the digital asset.

In a further embodiment, the method further comprising obtaining a transfer policy associated with the digital asset and blocking the transaction for transferring the digital asset from the owner to the receiver if the transfer policy is not fulfilled with regard to the owner and the receiver.

In a further embodiment, the method is performed by (a) a marketplace associated with the digital asset or the transaction of the digital asset, (b) a wallet of the owner of the digital asset or (c) a wallet of the receiver of the digital asset.

In a further embodiment, the method is performed by a wallet of the buyer of the digital asset, the method further comprising obtaining information pertaining to one or more of (i) previous activity associated with the digital token and/or the owner thereof, (ii) abuse associated with the digital token and/or the owner thereof, and (iii) the owner; and providing a warning thereof to the receiver of the digital asset.

One embodiment includes a method performed by an entity, such as a bridging component, for transferring ownership of a first digital asset, such as a first token, and a second digital asset, such as a second token, being a copy of the first digital asset, wherein the first digital asset is recorded on a first blockchain and the second digital asset is recorded on a second blockchain, and wherein the ownership of the digital assets is indicated by an address associated with the seller, the method comprising: detecting a transfer of the first digital asset from a seller to a buyer, wherein the seller has signed a transaction using a private key of the seller, determining that the seller is the owner of both the first digital asset and the second digital asset, requesting an Asset Contract of the second digital asset to transfer ownership of the second digital asset from the seller to the buyer.

In a further embodiment, the determining that the seller is the owner of both the first digital asset and the second digital asset comprises, when the first blockchain and the second blockchain use the same digital signing algorithm and address schema wherein any private key on the parent chain derives the same address on the secondary chain, parsing the second blockchain for an address of the seller of the first digital asset using the same address on the second blockchain as on the first blockchain.

In a further embodiment, the determining that the seller is the owner of both the first digital asset and the second digital asset comprises, when the first blockchain and the second blockchain use the same digital signing algorithm, but a different address schema wherein a private key derives different addresses on the parent chain and the secondary chain, receiving a digital signature to a challenge from the seller thereby obtaining a public key associated with the seller's private key, deriving a first address on the first blockchain and a second address on the second blockchain, and verifying that the first digital asset is owned by the first address and the second digital asset is owned by the second address, both addresses being associated with the seller.

In a further embodiment, further comprising providing the challenge to the seller.

In a further embodiment, the determining that the seller is the owner of both the first digital asset and the second digital asset comprises, when the first blockchain and the second blockchain use a different digital signing algorithm, and a different address schema wherein there may be no correspondence between digital signing algorithms and address generation schemes used by the two blockchains, the method comprising receiving a digital signature to a first challenge comprising a first address, wherein the seller uses the private key and the digital signing algorithm of the second blockchain, receiving a digital signature to a second challenge comprising a second address, wherein the seller uses the private key and the digital signing algorithm of the first blockchain, and verifying that a public key revealed by the first challenge may be used to derive the second address, and a public key revealed by the second challenge may be used to derive the first address, thus proving a linked ownership of the first and the second digital asset.

In a further embodiment, further comprising providing the first challenge and the second challenge to the seller.

In a further embodiment, the entity is a physical entity such as a server, wherein the entity scans the first blockchain, in order to detect the transfer of the first digital asset from a seller to a buyer.

In a further embodiment, the entity is distributed and comprises a first entity running on the first blockchain and a second entity running on the second blockchain, wherein the first entity is associated with the first digital asset and the second entity is associated with the second digital asset, and where the first entity monitors the second digital asset and the second entity monitors the first digital asset.

In a further embodiment, further comprising recording addresses of the first and the second digital in a registry for recording matching mirror addresses.

One embodiment includes a content delivery method performed by an entity comprising processing means and memory means, for delivering content to a content providing entity, the entity comprising a first computational environment, the first computational environment having access to a digital container associated with a policy, a second computational environment physically distinct from the first computational environment, the method comprising: evaluating, by a processor associated with the first computational environment, whether the second computational environment satisfies the policy associated with the digital container, securely transmitting data associated with the digital container to the second computational environment based on the result of the evaluation, wherein the data associated with the digital container enables the second computational environment to access the digital container.

In a further embodiment, the data comprises at least one of the digital container, a reference to the digital container, or a cryptographic key associated with the digital container.

In a further embodiment, the second computational environment comprises a rendering component to which information associated with the digital container is rendered.

In a further embodiment, the rendering component is at least one of a screen, a speaker or a tactile output device.

In a further embodiment, further comprising the second computational environment evaluating whether a third computational environment satisfies the policy associated with the digital container.

One embodiment includes a content delivery method comprising: a first computational environment, the first computational environment having access to a digital container associated with a policy; a second computational environment physically distinct from the first computational environment; evaluating, by a processor associated with the first computational environment, whether the second computational environment satisfies the policy associated with the digital container, and conditional on the result of the evaluation, securely transmitting data associated with the digital container to the second computational environment; wherein the data associated with the digital container enables the second computational environment to access the digital container.

In a further embodiment, the data comprises at least one of the digital container, a reference to the digital container, or a cryptographic key associated with the digital container.

In a further embodiment, the second computational environment comprises a rendering component to which information associated with the digital container is rendered.

In a further embodiment, the rendering component is at least one of a screen, a speaker or a tactile output device.

In a further embodiment, the second computational environment evaluates whether a third computational environment satisfies the policy associated with the digital container.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 35 illustrates a token ledger comprising a data structure in which a token, identified by a token identifier is mapped to an owner, a uniform resource locator or URL for the token, and a transfer count in accordance with an embodiment of the invention.

DETAILED DESCRIPTION

Figure 1:
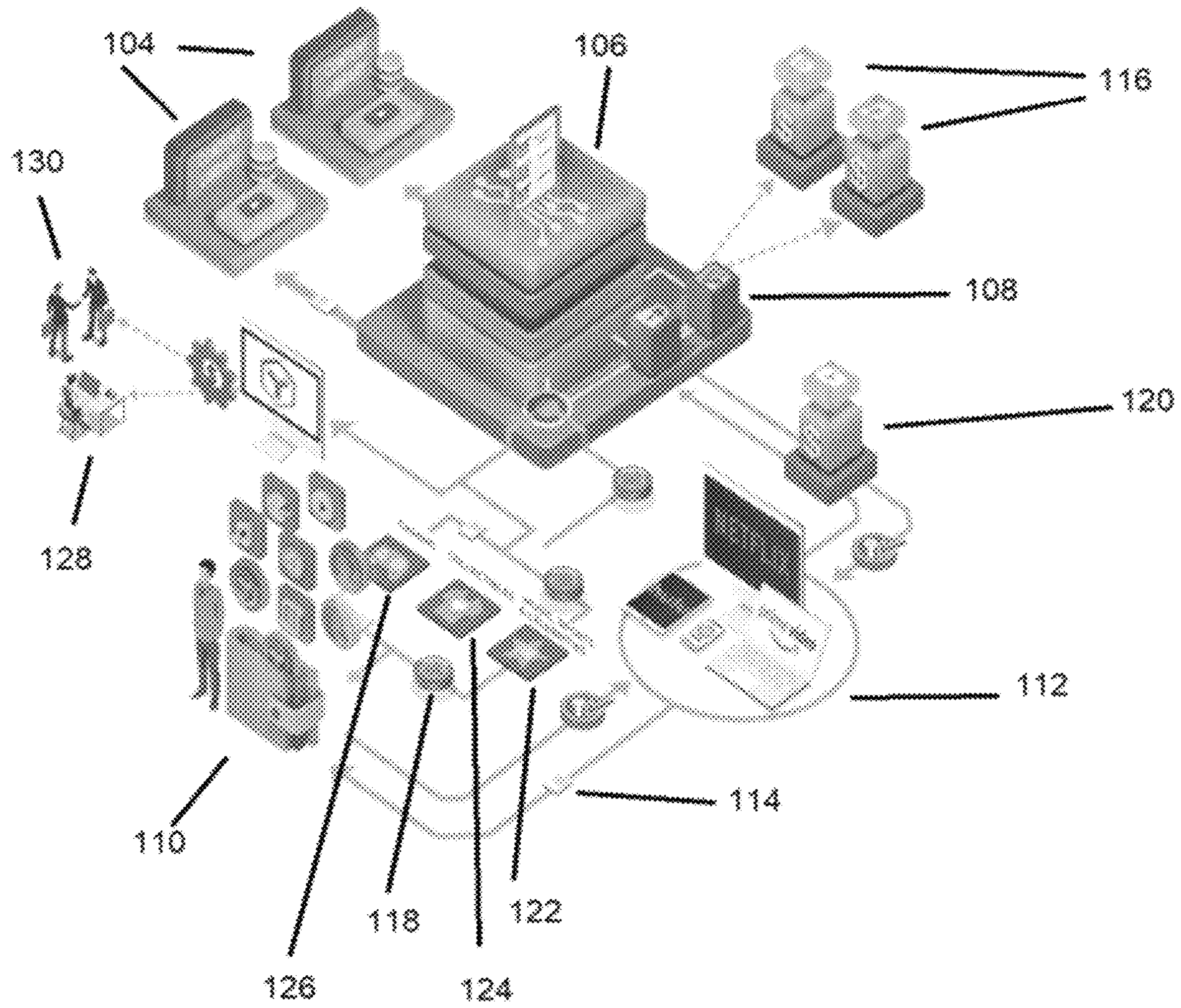
FIG. 1 is a conceptual diagram of an NFT platform in accordance with an embodiment of the invention.

Turning now to the drawings, systems and methods for implementing blockchain-based Non-Fungible Token (NFT) that can generate instant NFTs in accordance with various embodiments of the invention are illustrated. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFT platforms can include different execution environments that facilitate the storage and usage of tokens, including digital wallets and/or digital wallet applications, digital rights management (DRM) systems that can include secure software and/or hardware, secure execution environments such as TrustZone among others that can provide security assurances using secure boot processes. NFT platforms in accordance with many embodiments can include software and/or hardware configurations that protect an execution environment against potential abuses.

In several embodiments, a blockchain-based NFT security platform is provided that generates NFTs that enable content creators to issue, mint, and/or transfer NFTs that can include different data elements that can specify different access control settings, including permitted and/or restricted data that can be accessible by other NFTs.

However, the minting of NFTs can be costly, especially for content creators who wish to create large volumes, such as a series of NFT editions, of protected content, but who do not yet know the extent to which such content can be monetized, e.g., sold and/or rented out. Accordingly, NFT platforms in accordance with many embodiments provide for storing, referencing, and using data in a manner that protects the data against alterations, to enable lazy-minting that survives ownership change. In particular, NFT platforms can generate "instant NFTs" that can be data that can be maintained and which corresponds to an NFT, this is because it is associated with a capability of minting an NFT with properties dictated by the stored data and with timing dictated by the owner, and/or as defined by policies controlled by the NFT and determined by the creator, such as when the instant NFT exists on a private system in a distributed ledger technology.

NFT platforms in accordance with many embodiments can generate instant NFTs that can lower costs associated with minting NFTs. In many embodiments, an instant NFT can be associated with a first time stamp and the instant NFT can refer to data that is maintained and which represents an NFT to be minted at a later stage. NFT platforms can monitor and detect modifications to one or more records, where records can be modified using different mechanisms, including transactions (e.g., sale, licensing, among others). For example, a first owner sells the instant NFT to a second owner. Once such a determination is made, NFT platforms in accordance with many embodiments can protect the instant NFT and the modification thereof. NFT platforms in accordance with many embodiments can apply different processes of protecting an instant NFT and the modification thereof. NFT platforms in accordance with many embodiments can include recording a value representing two or more of records on a blockchain, including a private blockchain; digitally signing using a private key associated with a certified public key, where the certification indicates a level of trust associated with the private key holder; recording the determined modification by time-stamping an updated collection resulting from the modification of the record; and/or storing in a secure storage area in a format that enables audit of access and modification, among other techniques.

NFT platforms in accordance with many embodiments can include a hash of the edits in a hash chain, and can incorporate the current hash value of the chain in a blockchain entry.

NFT platforms in accordance with many embodiments can lower the costs associated with the management of ownership information of an instant NFT. In particular, NFT platforms can, when an event is observed that triggers a modification of ownership, record the modification of ownership corresponding to an action that includes at least one of (a) combining at least two records and recording a value representing their combination on a blockchain; (b) digitally signing at least a value associated with the record using a private key associated with a certified public key, where the certification indicates a level of trust associated with the private key holder; and/or (c) storing in a secure storage area of a value associated with the record, in a format that enables audit of access and modification, among others.

In many embodiments, a personal profile record can be associated with an individual, a group of individuals, an enterprise, among other type of groups and/or entities. A personal profile record NFT can include a digital signature that can be verified using a public key associated with the personal profile record.

NFT platforms in accordance with many embodiments can include personal profile record NFTs that include several data elements, each data element associated with a particular type of data. In many embodiments, different data elements of a personal profile record NFT can be associated with a smart contract and/or policy that can specify settings for the particular data elements. Different data elements can have different privacy settings, including public, private, and/or limited access.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platforms Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
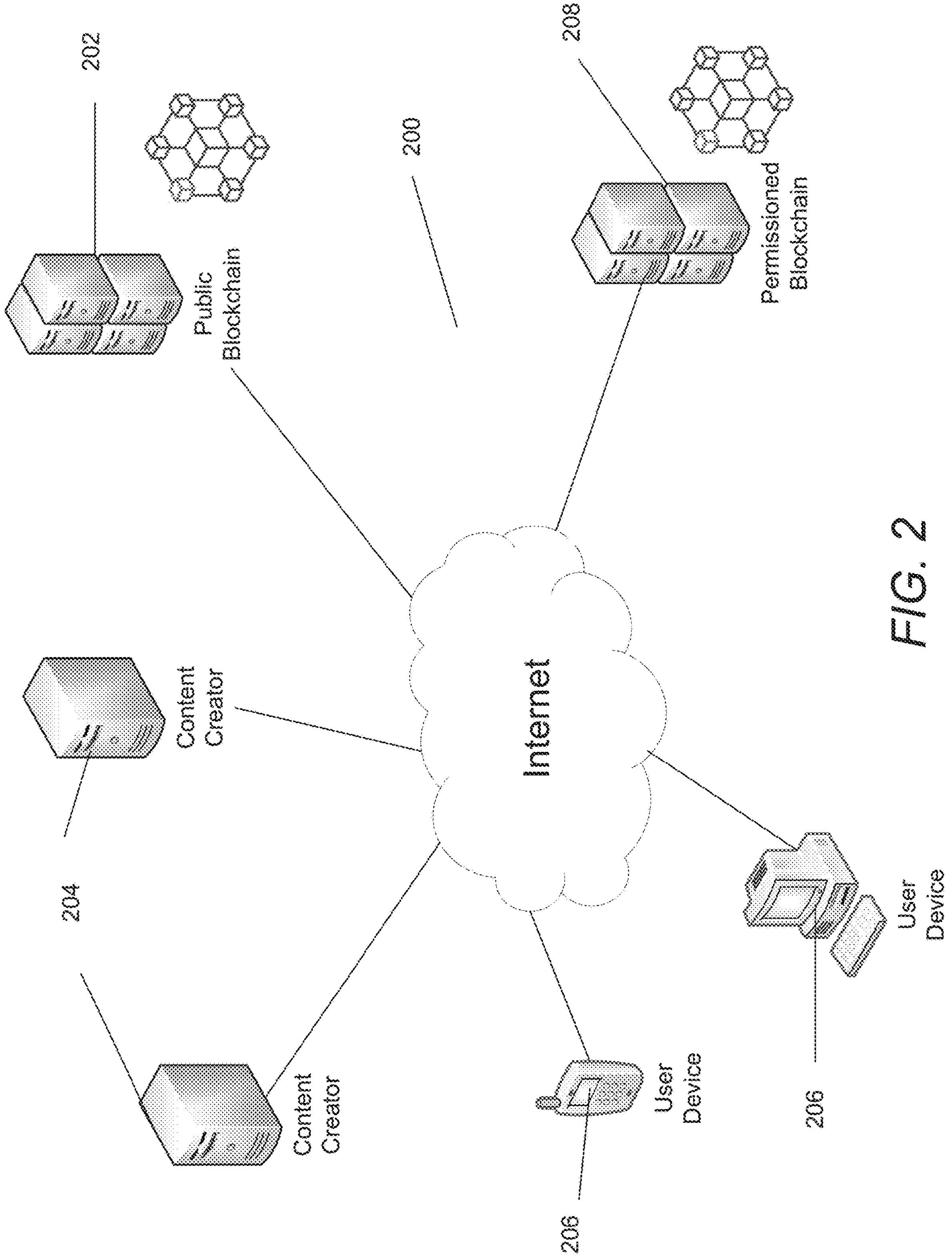
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
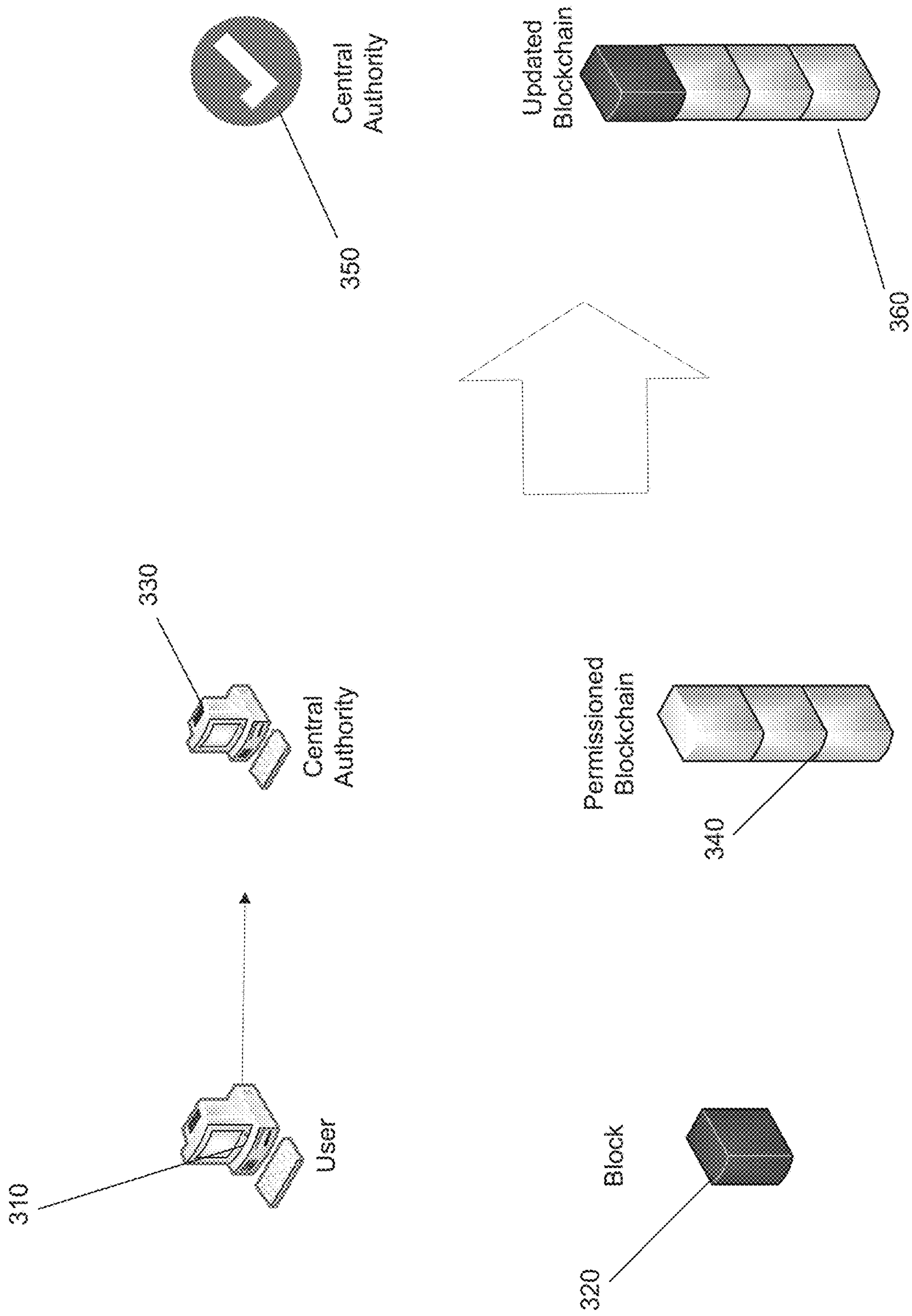
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
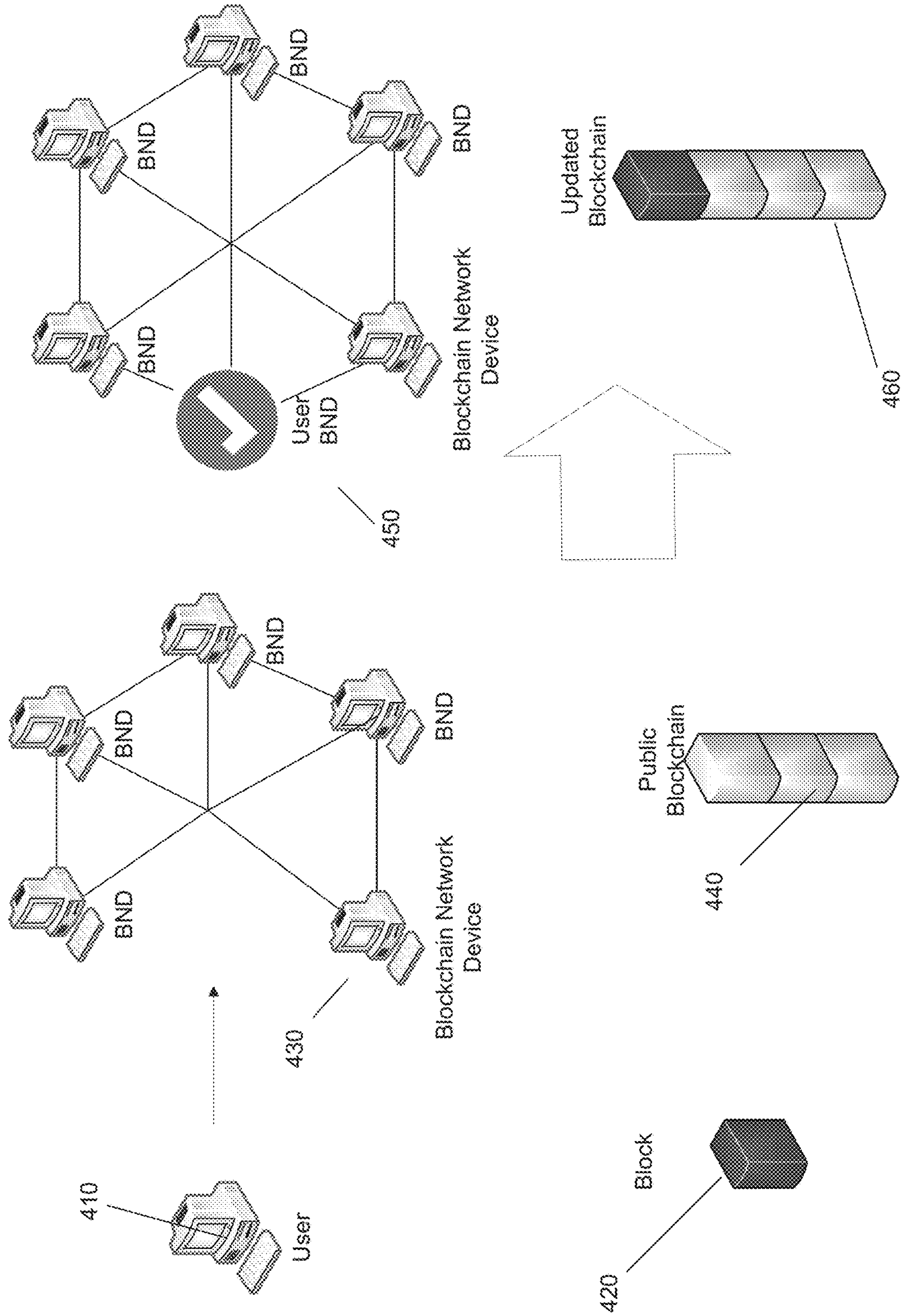
FIG. 4 is a conceptual diagram of a permission-less blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions.

In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
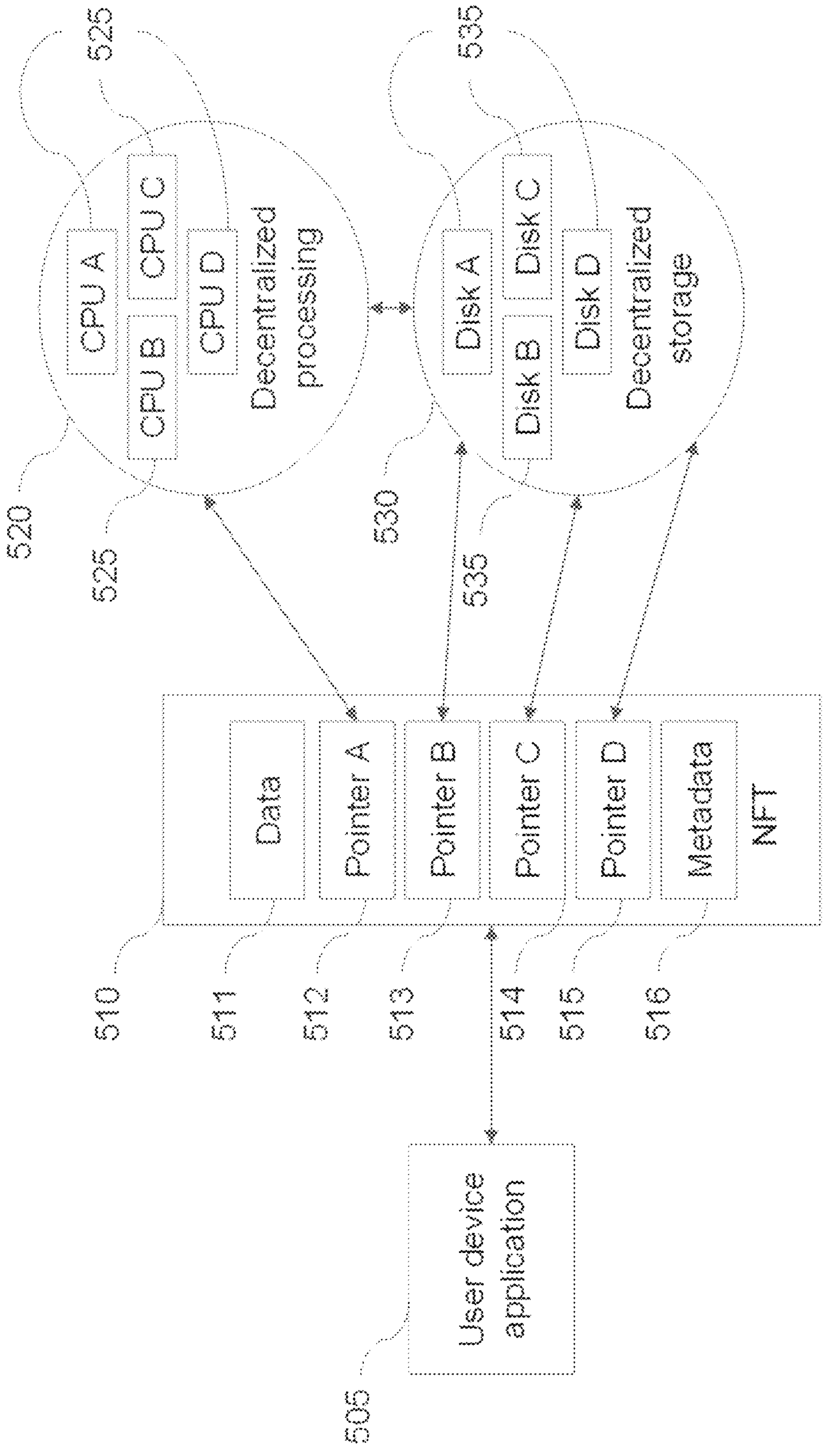
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
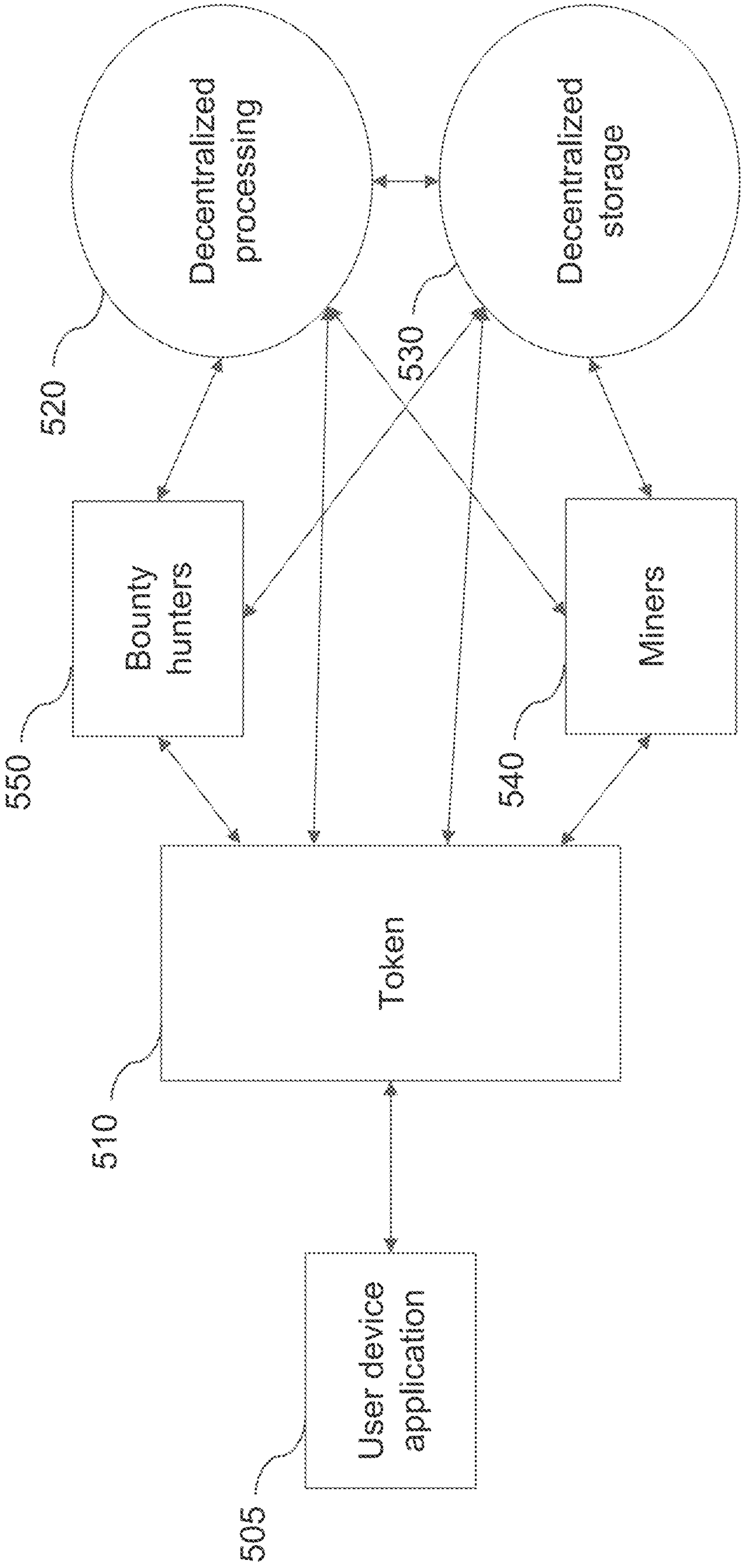

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platforms Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
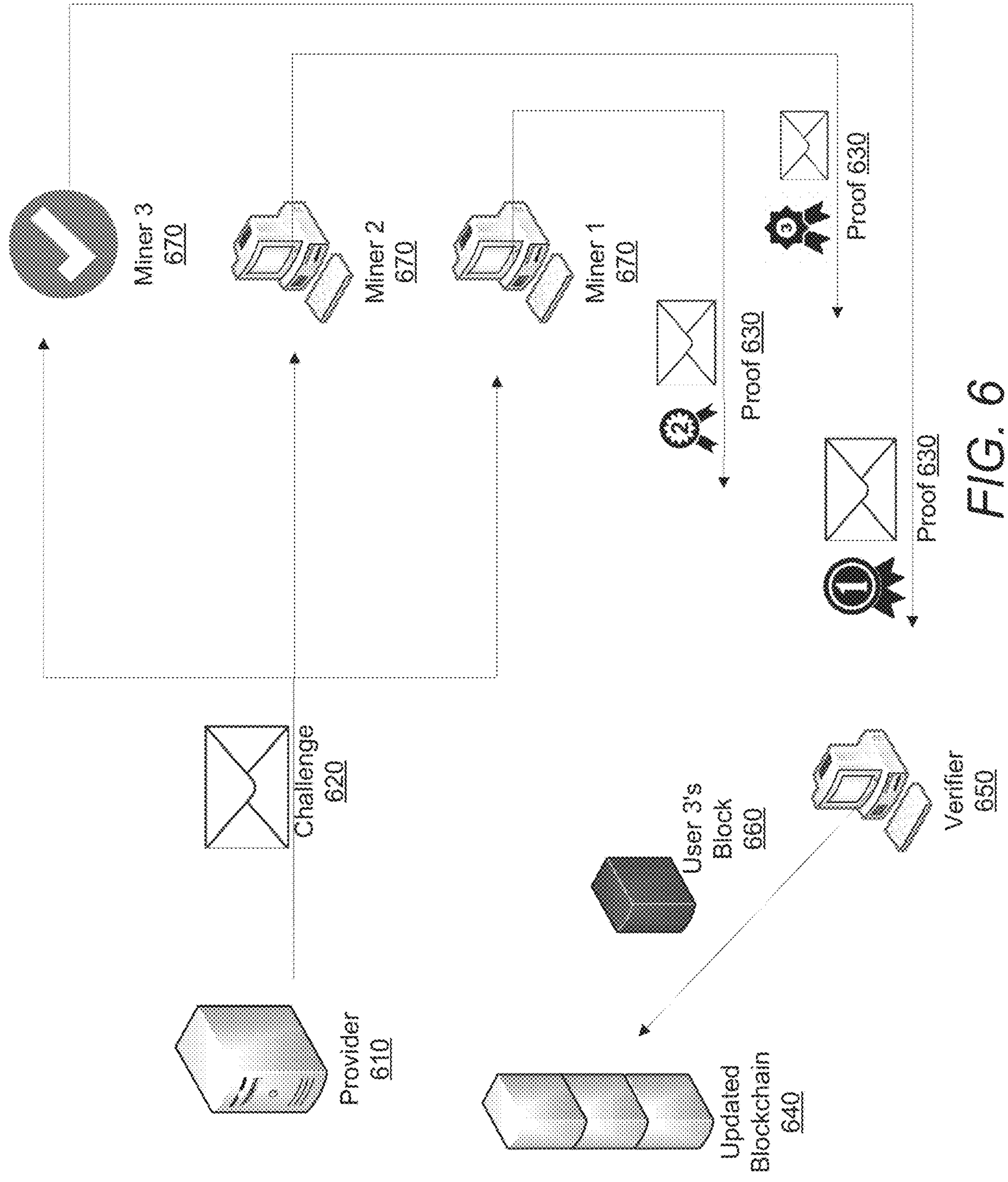
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
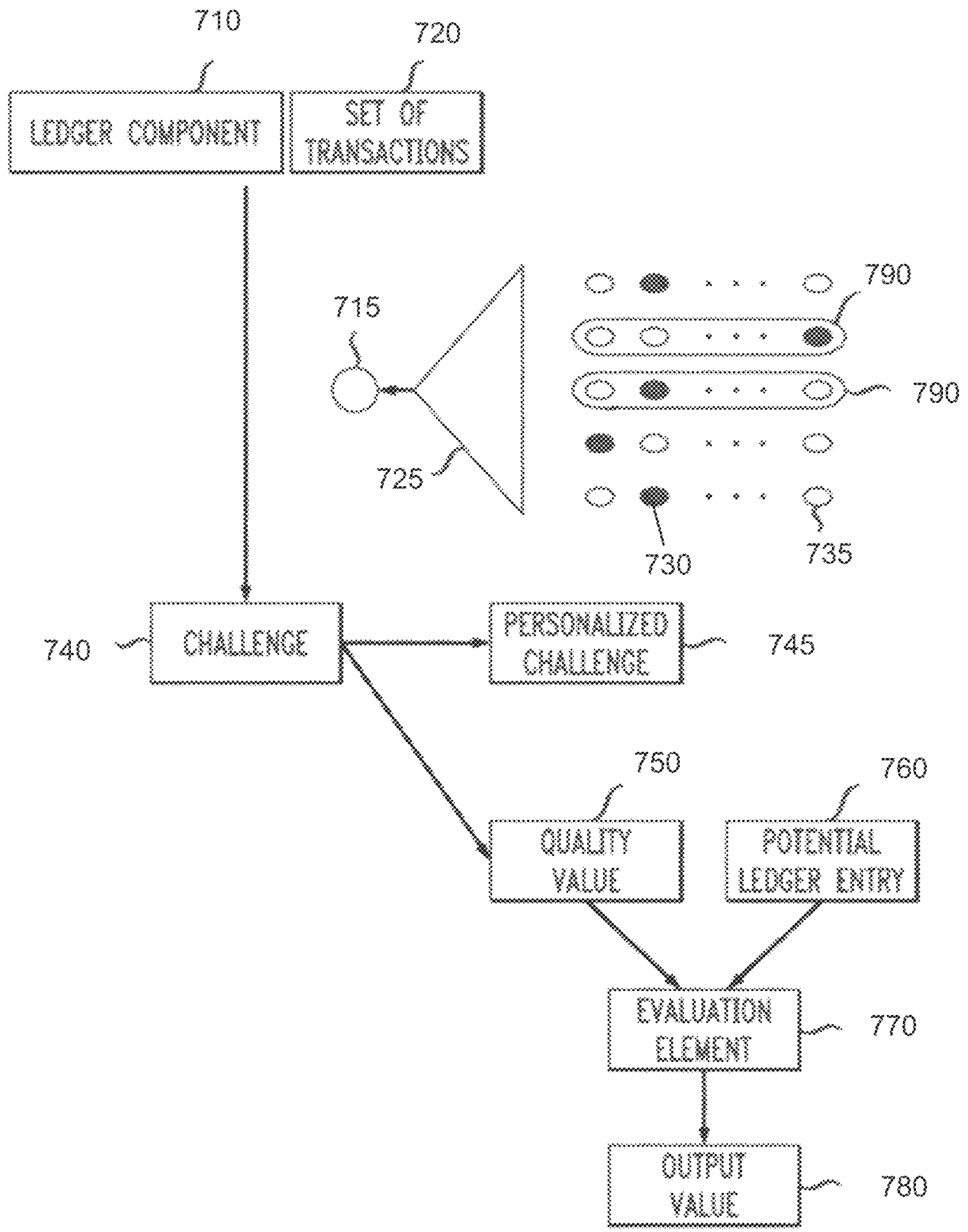
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHAI cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
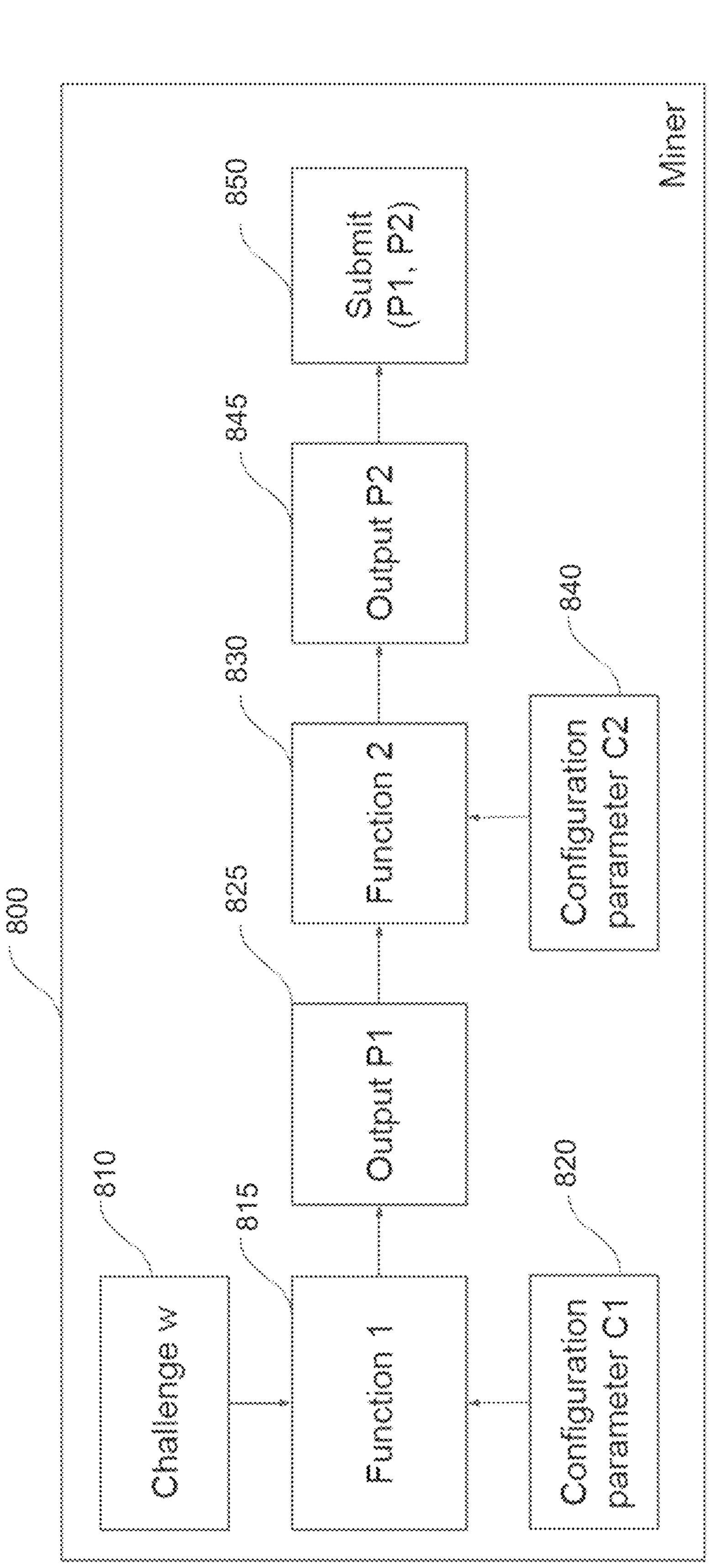
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances exist of integrity by virtue of incorporating private/isolated processing environments.

Figure 9:
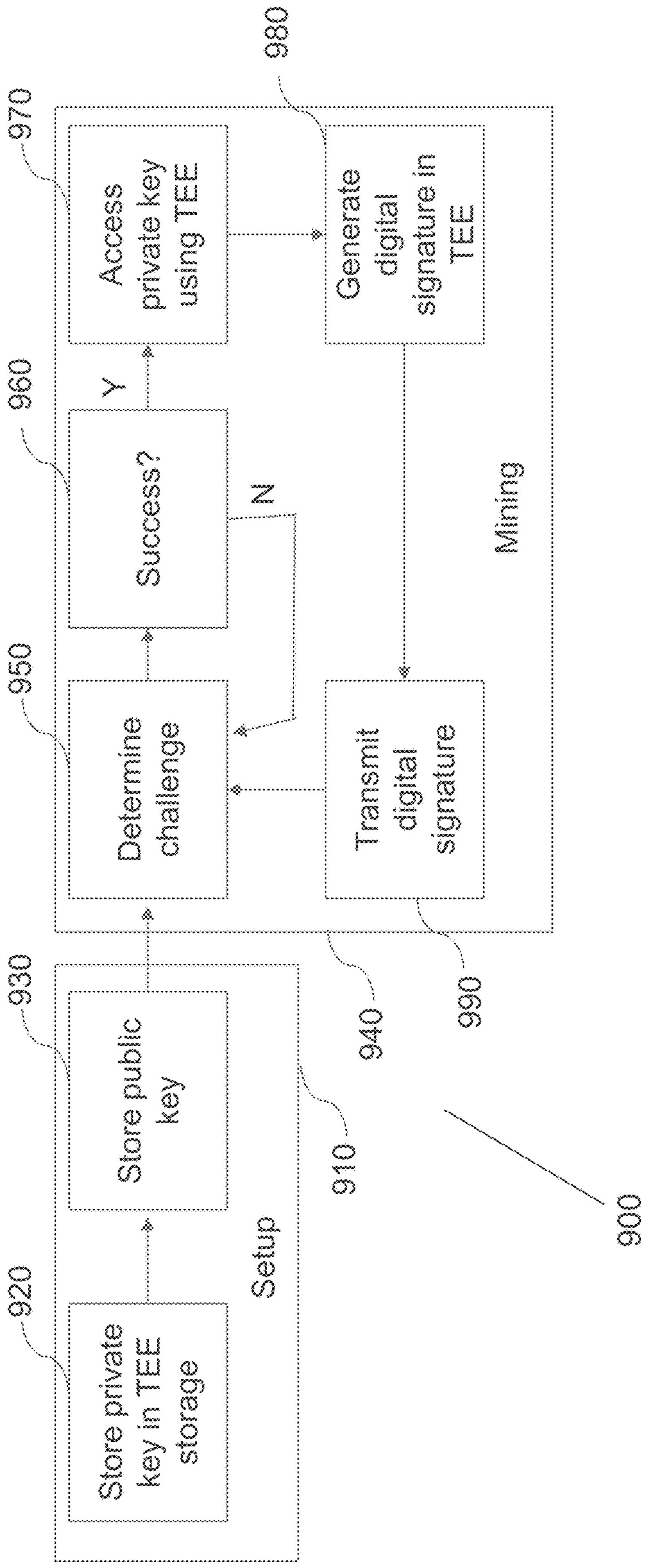
FIG. 9 illustrates a process followed by a Trusted Execution Environment-based consensus mechanism in accordance with some embodiments of the invention.

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platforms Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
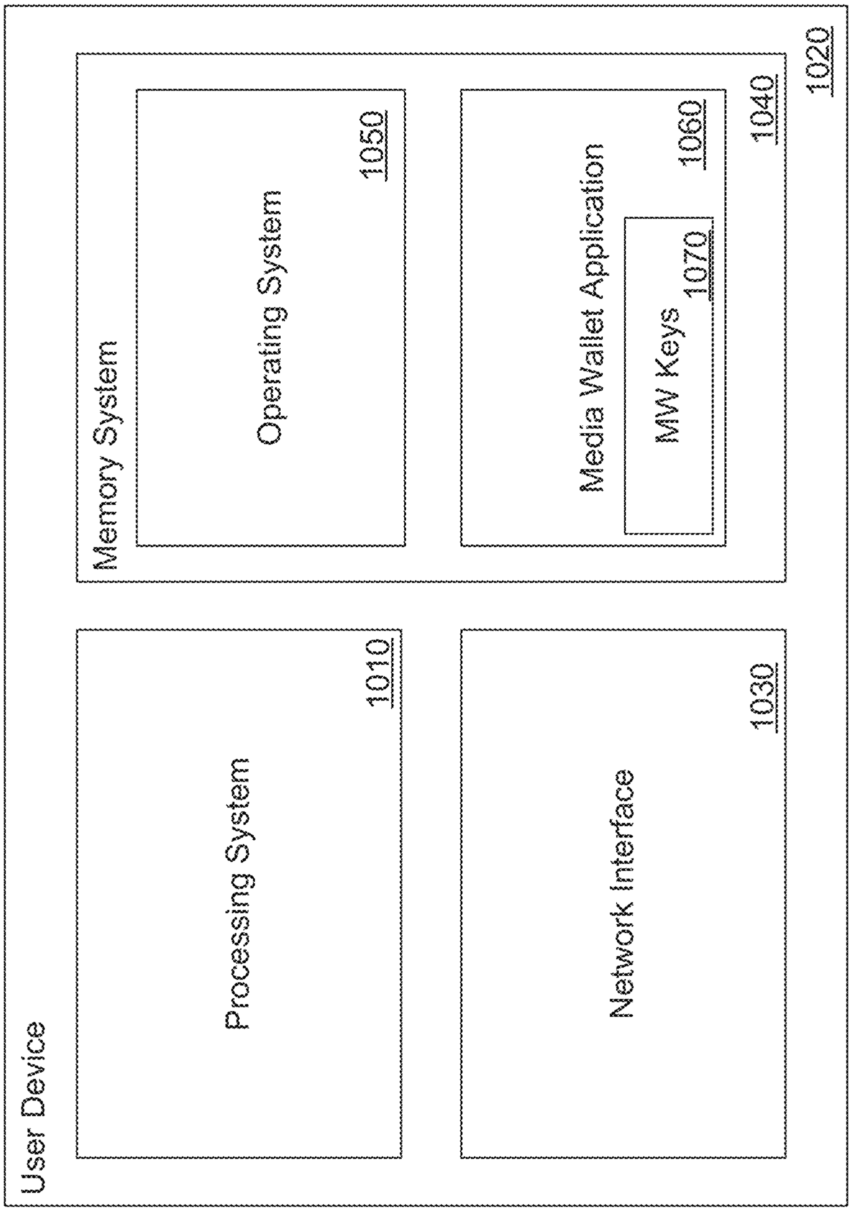
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
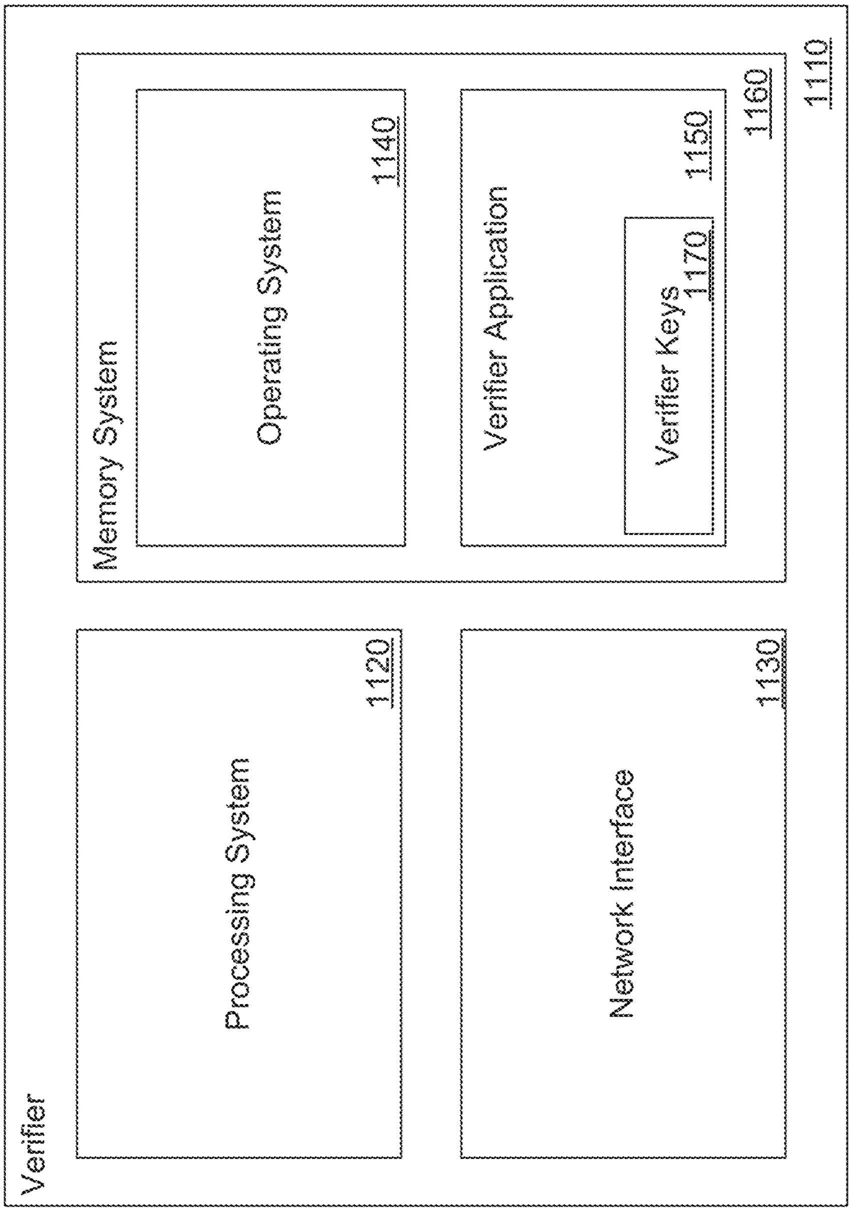

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
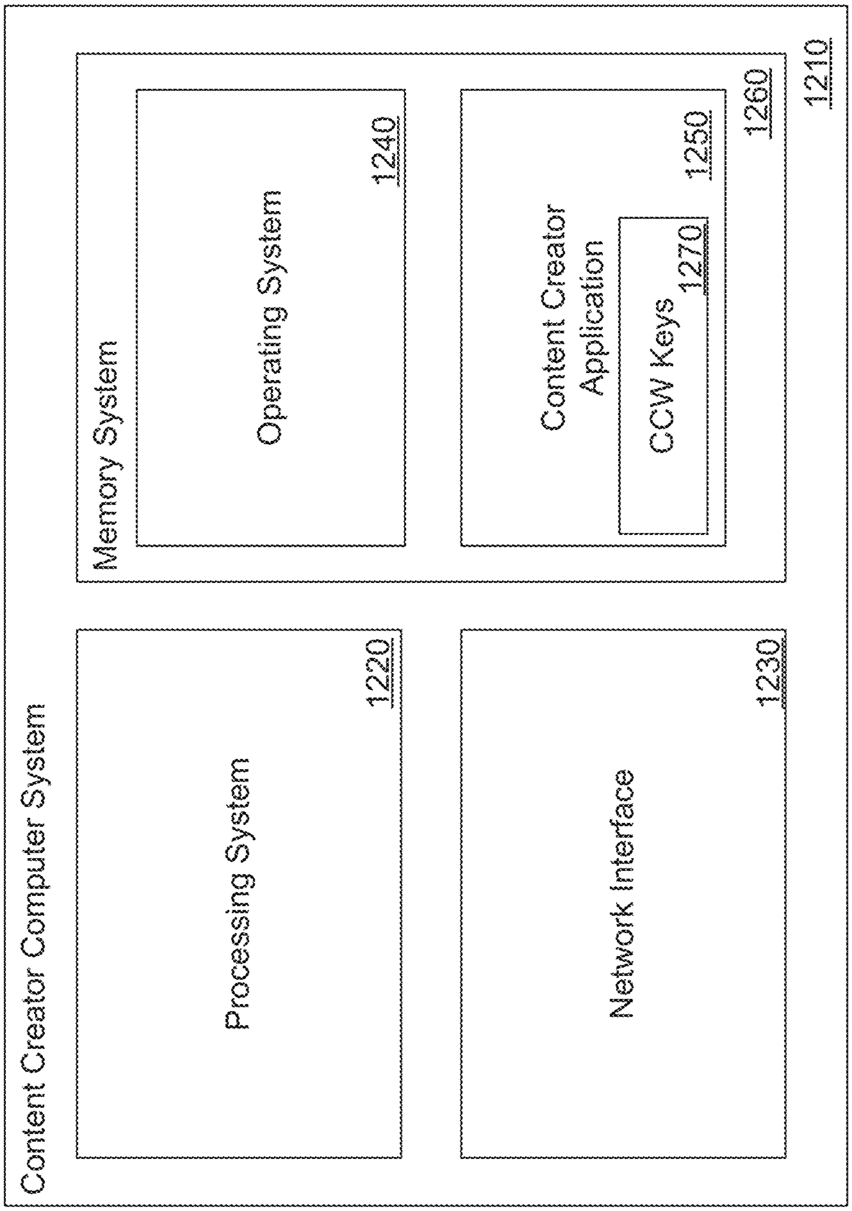

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
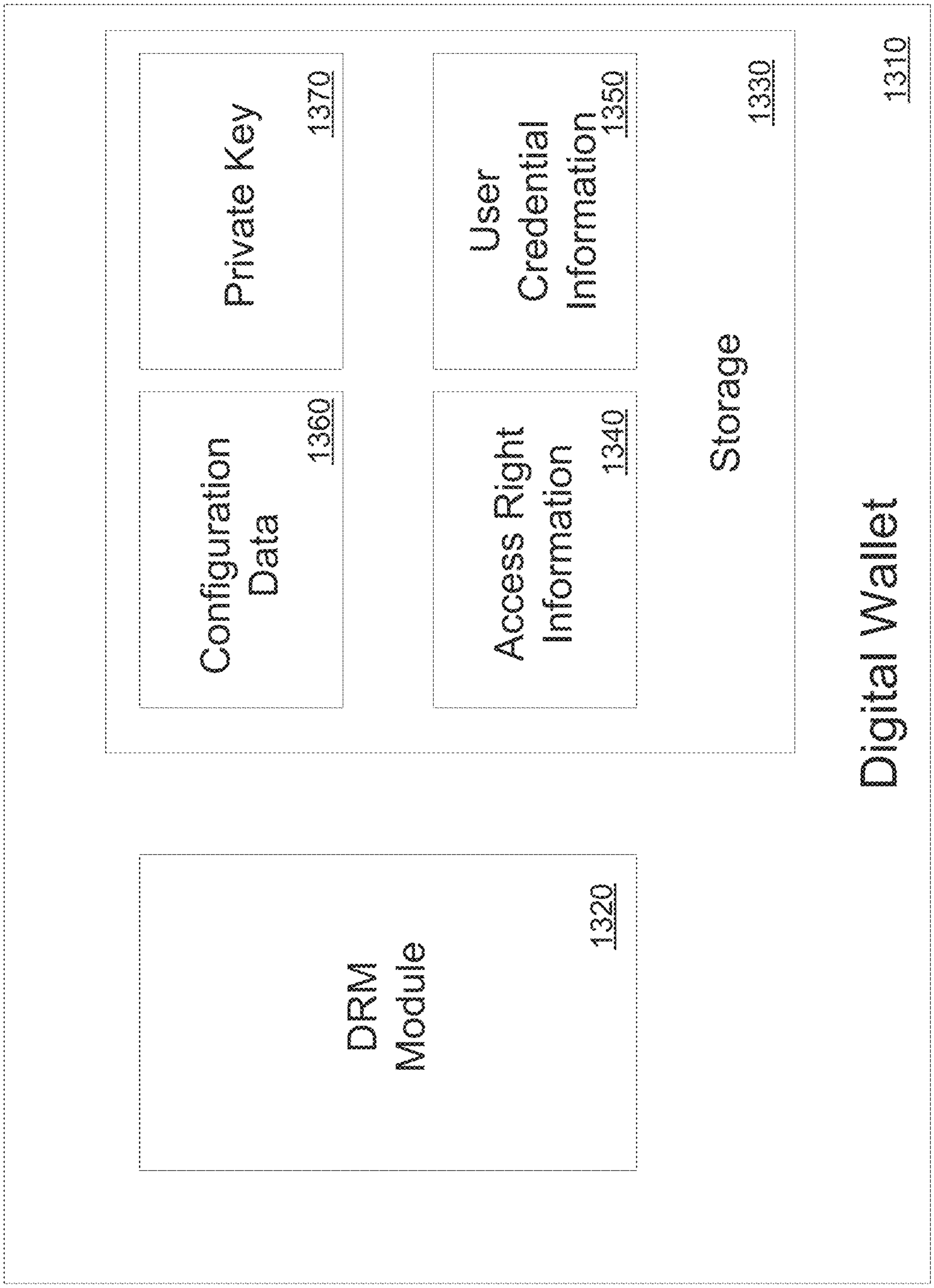
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
FIGS. 14A-14C depicts user interfaces of various media wallet applications in accordance with a number of embodiments of the invention.
Figure 14A:
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs.

This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platforms NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
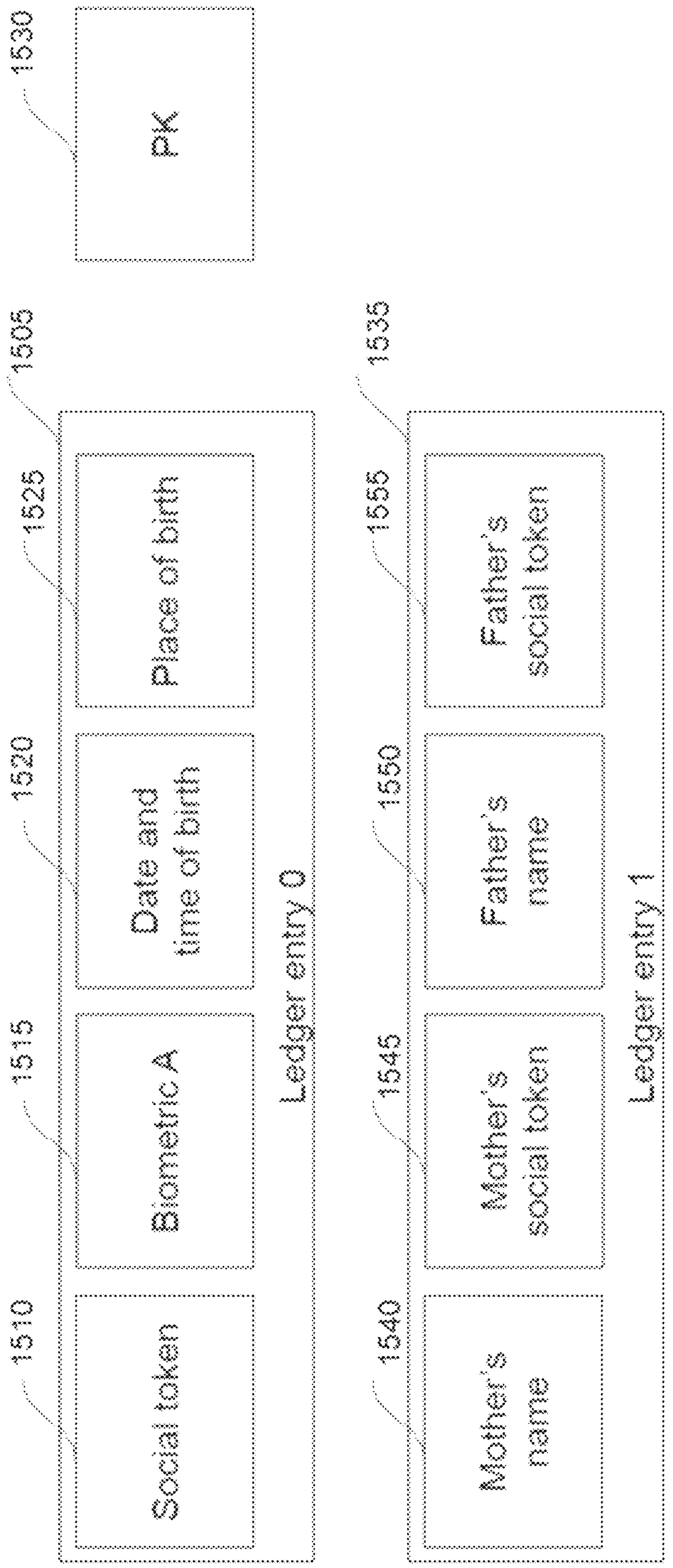
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
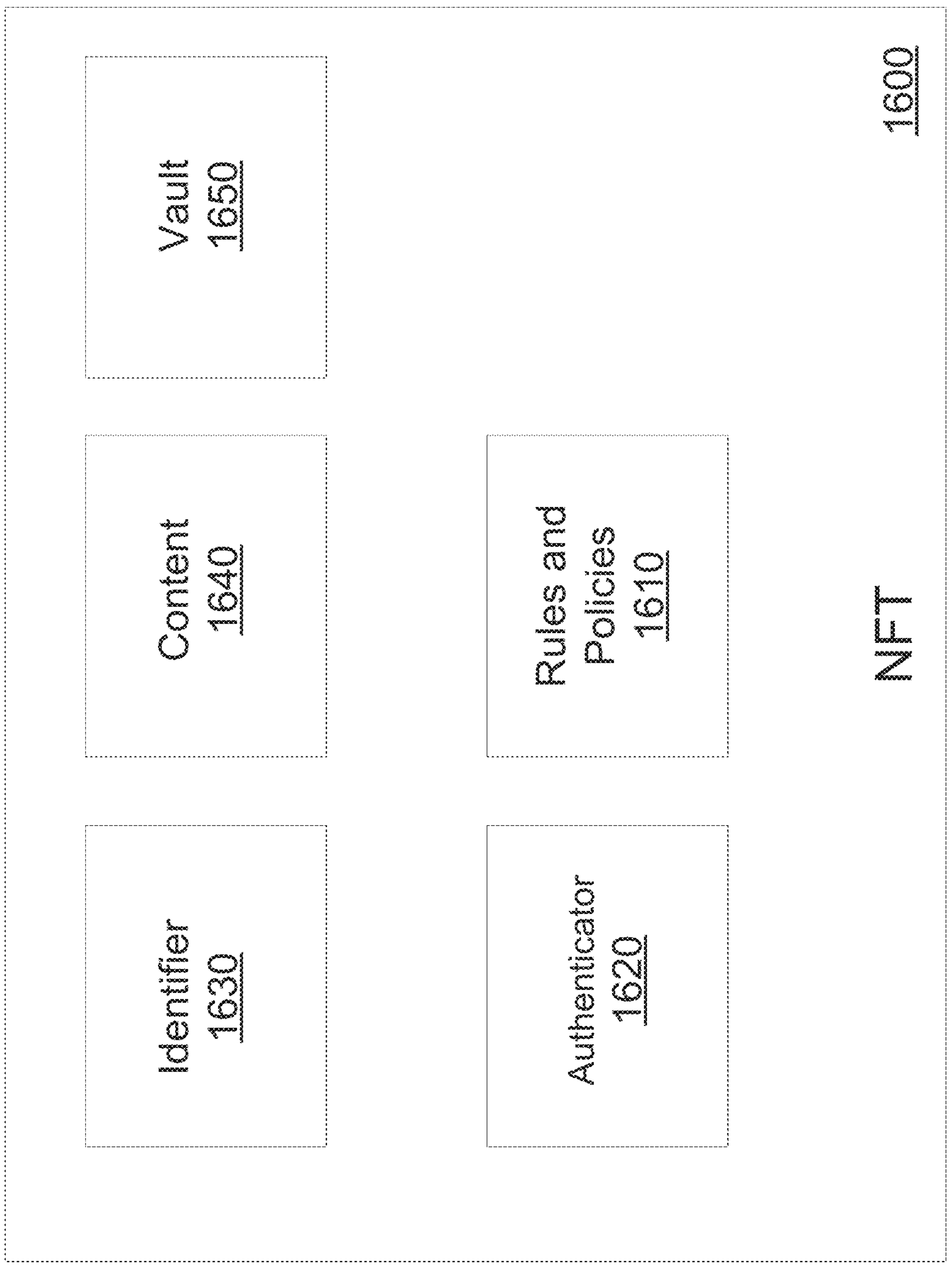
FIGS. 16A-16B illustrate an NFT arrangement relationship with corresponding physical content in accordance with an embodiment of the invention.
Figure 16B:
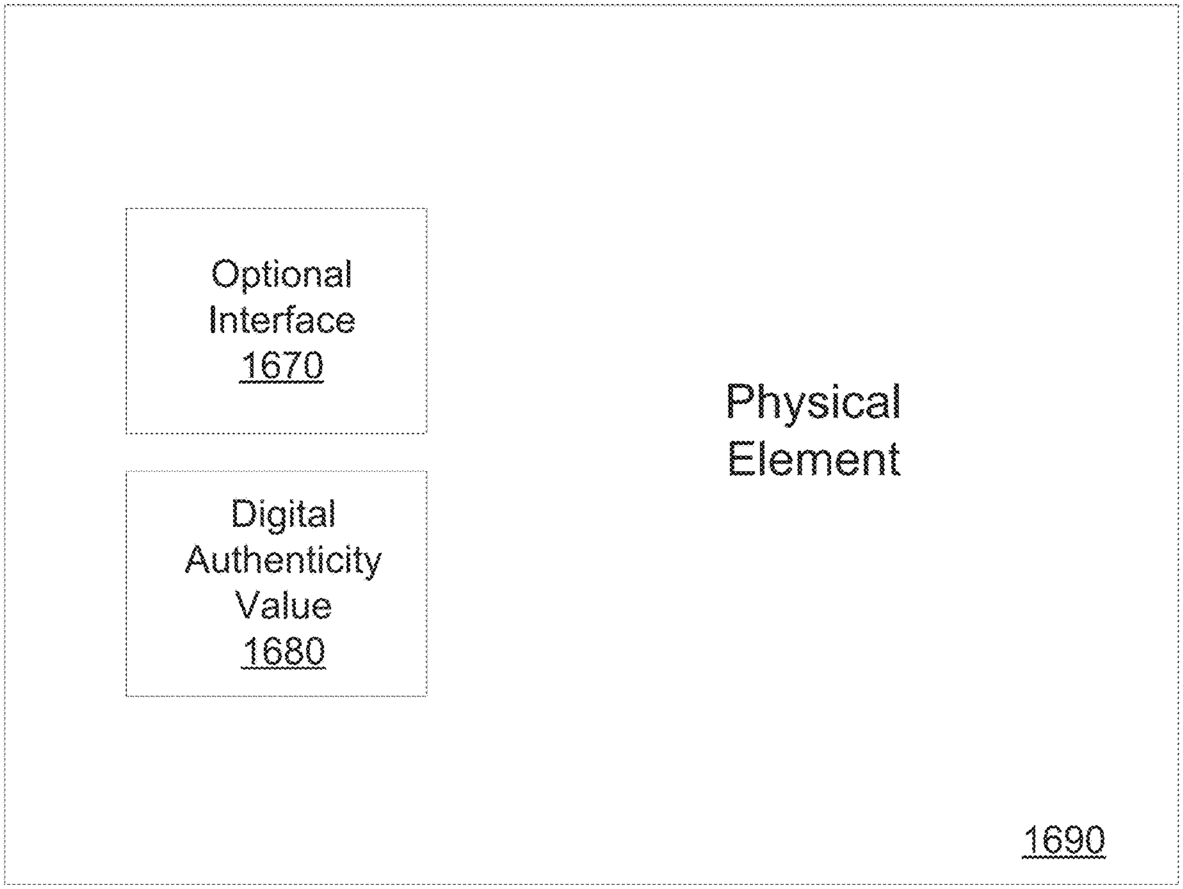

An example NFT which may be associated with specific content in accordance with several embodiments of the invention is illustrated in FIG. 16. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV)

1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
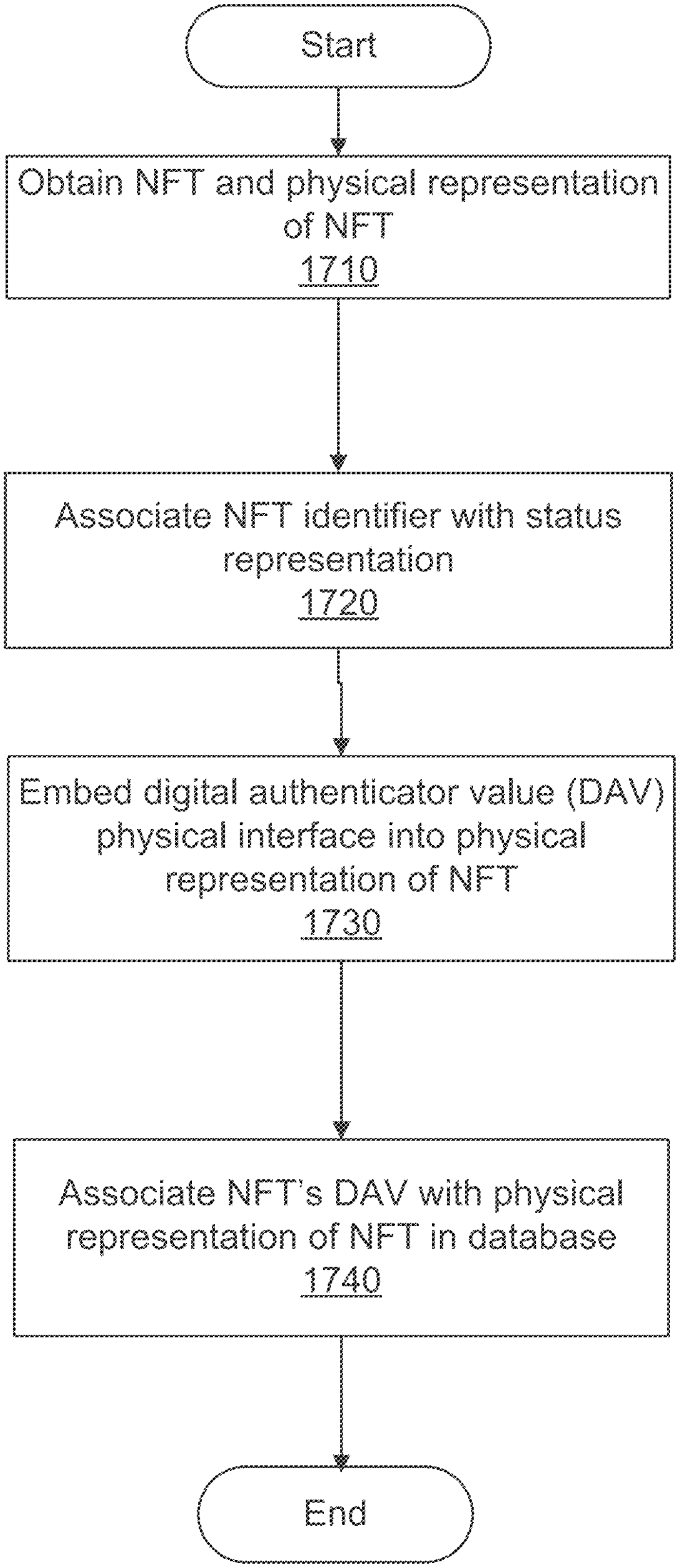
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Instant NFTs and Protection Structure

It can be desirable to motivate content creators to express content in the form of non-fungible tokens (NFTs). However, the minting of NFTs can be costly, especially for content creators who wish to create large volumes, such as a series of NFT editions, of protected content, but who do not yet know the extent to which such content can be monetized, e.g., sold and/or rented out. "Lazy minting" can enable content creators to advertise NFTs and obtain commitments from tentative buyers prior to taking on the costs of minting. Lazy minting can also enable content creators to maintain NFTs, their associated assets, and metadata in private databases and/or ledgers prior to revealing the data on public distributed ledger technology. A "cost" of making assets public can be the resulting exposure to theft. However, lazy minting may delay the minting of an NFT until a tentative buyer has committed to purchasing the advertised NFT, the tentative buyer not necessarily knowing that the advertised NFT is only minted upon initiation of payment by the tentative buyer. Whereas this allows the delay of costs and efforts until the first purchase has been committed to, it does not allow further delaying of such costs; moreover, traditional approaches can require costly actions to be performed for each and every transaction including ownership change of an NFT, where these actions corresponds to recording entries on a blockchain, requiring the payment of gas fees, and/or exposure of the assets publicly. While public blockchain token ownership can be designed to be anonymous, bad actors may have many tools available for identifying supposedly anonymous owners and absconding with tokens.

If a prospective buyer does not intend to display a given NFT and/or take advantage of a utility that the given NFT provides, then they may not wish to pay the minting fee associated with redeeming the NFT through lazy minting, but may wish to pass on the cost on a subsequent resale. In the current state of the art this is not possible. Additionally, prospective buyers may wish to shield their purchase and their respective assets from public visibility in an effort to avoid theft and/or loss of anonymity.

NFT platforms in accordance with many embodiments provide non-fungible tokens (NFT) that can be associated with one or more content elements, which may be included in and/or referenced by the NFT, including: by an ownership status, which can be expressed by a linking to an address and the recording on a blockchain; and a provenance, which can be associated with one or more ownership records. A first ownership record for an NFT can correspond to when the NFT was minted, at which time its ownership can be typically assigned to the content creator and/or an associated party, and/or, in the case of lazy minting, to a buyer. The minting of an NFT can associate the NFT with a first owner and to an optional one or more policies and protection modes. An example policy can express royalty requirements among many other types of transactions. Example protection modes may be expressed by the encryption of one or more content elements; by the association between a capability to access and/or use content and a hardware or software functionality; and/or by the linking of the NFT with another resource, such as another NFT and/or a service provider. This other resource may impact the access to and usage of content, e.g., by limiting access based on credentials; by collection of usage fees; and/or by verification of malware-freeness of the environment requesting access to content.

These and other properties related to security and functionality can be beneficial, and can motivate content creators to express content in the form of NFTs. However, as noted, the minting of NFTs can be costly, especially for content creators who wish to create large volumes, such as a series of NFT editions, of protected content, but who do not yet know the extent to which such content can be monetized, e.g., sold and/or rented out. Lazy minting enables content creators to advertise NFTs and obtain commitments from tentative buyers prior to taking on the cost of minting. Lazy minting also enables content creators to maintain NFTs, their associated assets, and metadata in private databases and ledgers prior to revealing the data on public distributed ledger technology. Lastly, private systems can offer superior theft protection as compared to public-facing systems.

NFT platforms in accordance with many embodiments provide for storing, referencing, and using data in a manner that protects the data against alterations, to enable lazy-minting that survives ownership changes. Data that can be maintained and which corresponds to an NFT can be referred to herein as an “instant NFT”; this is because it is associated with a capability of minting an NFT with properties dictated by the stored data and with timing dictated by the owner, and/or as defined by policies controlled by the NFT and determined by the creator, such as when the instant NFT exists on a private system in a distributed ledger technology.

NFT platforms in accordance with many embodiments can generate and protect instant NFTs using different techniques, as described herein. In NFT platforms in accordance with many embodiments, a collection of instant NFTs, each represented by a record, can be time-stamped as a collection. Many embodiments can apply a hash of the collection being recorded on a blockchain. In many embodiments, a collection may include N records, which may be sorted according to record identifiers before being hashed and tokenized. A given record in this collection may include one or more content elements, one or more policies, one or more ownership assertions, one or more event descriptors, and/or one or more time indicators. A content element may be an image, an audio file, a script, and/or an identifier such as what is used in biometric tokens. Biometric tokens are disclosed in U.S. patent application Ser. No. 17/808,264 titled “Systems and Methods for Token Creation and Management” by Jakobsson et al. and U.S. patent application Ser. No. 17/933,659 entitled “Systems and Methods for Token Content Unlocking, Biometric Authentication using Privacy-Protecting Tokens, Ownership-Based Limitations of Content Access, Policy-Based Time Capsule Technology, and Content Lock Mechanisms” by Jakobsson et al, which are herein incorporated by reference in their entirety. An ownership assertion can correspond to an address, e.g., of a wallet and/or of a token. Wallet addresses being used as ownership identifiers is traditional; using a token identifier to indicate ownership is disclosed in co-pending application titled “Hybrid Service Provision” by Markus Jakobsson.

NFT platforms in accordance with many embodiments can record a change of one or more records (e.g., indicating an ownership transfer of one instant NFT associated with a collection of records) by time-stamping the updated collection resulting from the modification of the changed record, the addition of a record to a collection, and/or the removal of a record from a collection. In many embodiments, performing this time-stamping can be to mint a new NFT associated with the updated collection, e.g., by generating a new hash of the updated information. Time-stamping can also be performed by including a hash of the edits in a hash chain, and to later, (e.g., every ten minutes), incorporating the current hash value of the chain in a blockchain entry. Techniques for time-stamping using hash chains are disclosed in U.S. patent application Ser. No. 18/179,884 entitled “Systems and Methods for the Facilitation of Blockchains” by Jakobsson et al., which is herein incorporated by reference in its entirety.

NFT platforms in accordance with many embodiments can provide security of records by recording them in a secure storage system that is possible to audit. An example of this type of structure is disclosed in the 2009 publication “Server-Side Detection of Malware Infection” by Markus Jakobsson and Ari Juels, which is incorporated by reference herein in its entirety, and where a malware-resistant audit mechanism is disclosed. A same mechanism can also be used to enable auditing of services that need to time-stamp the changes associated with a collection of records. Periodically, a state associated with such a time-stamping mechanism can be logged on a blockchain and/or otherwise timestamped in a manner different from the hash-based structure of this mechanism, in order to associate that state with a time and/or to provide evidence on the blockchain. In certain embodiments, the hash-chain based structure may periodically incorporate time-based events in order to create associations between hash chain values and verifiable points in time.

NFT platforms in accordance with many embodiments can provide a record in a collection that may identify one or more events related to an instant NFT, and an instant NFT may correspond to one or more such records. In the latter case, new records might replace, modify, and/or correct previous records referring to the same NFT. The most recent replacement record may be the one in force, and/or subsequent modify/correct records may contain changes from previous records.

NFT platforms in accordance with many embodiments, to convert an instant NFT to an NFT, one or more records, including data related to the one or more events, can be read and a new record can be generated from the data that is read. This may result in a slightly different format from a traditional NFT. A traditional NFT may correspond to one or more entries on a blockchain, where each entry may correspond to an ownership change, and a public key of the new owner is indicated in the entry. A converted instant NFT may be created to have the same structure, but can also be created in a way that is more desirable from a cost and efficiency perspective. In certain embodiments, a converted instant NFT may indicate, as part of its data and/or meta-data, the one or more public keys associated with prior ownerships, in an order that may be chronological, and where the most recent owner is represented in a traditional manner as the NFT is minted by being recorded on a blockchain.

NFT platforms in accordance with many embodiments can include a time-stamped value representing two or more instant NFTs, e.g., records as described, represents either the current state of these two or more instant NFTs and/or changes in state of the two or more instant NFTs, and/or a combination of these. If it represents the current state at the time of the time-stamping, which can be performed by recording of the value on a blockchain, then a new representation related to an instant NFT can replace a previous record on the same instant NFT. In certain embodiments, a value may be a cryptographic hash of a sorted list of the records that are part of the collection.

In NFT platforms in accordance with many embodiments, a collection of records is represented by generating a hash of the collection and referencing the hash value in a meta-token, where meta-tokens are disclosed in co-pending application titled "Hybrid Service Provision" by Markus Jakobsson. A meta-token may represent one or more such hash values, which may be committed to over time without a need to record the meta-token on a blockchain. In many embodiments, a meta-token may include a root of a Merkle tree, where series of leaves of the Merkle tree can be used to sign consecutive hash values, each such hash value representing a collection of records at the time of the generation of the digital signature corresponding to the series of leaves. This enables the consecutive generation of a series of digital signatures, each one of which represents a new state, indicating the invalidity of the previously recorded state, e.g., the previous signature. In certain embodiments, a digital signature may also indicate the changes made to the collection of records, e.g., indications of what records are removed from the collection and indications, e.g., using hash digests, of what records are being added. Efficient management of Merkle trees is disclosed in the 2003 publication titled "Fractal Merkle Tree Representation and Traversal" by Markus Jakobsson, Tom Leighton, Silvio Micali and Michael Szydlo, which is herein incorporated by reference in its entirety.

In NFT platforms in accordance with many embodiments, a creator of an instant NFT may elect to mint an NFT that is either on a private blockchain, and/or is substantially hidden in plain view on a public network with encrypted assets, anonymous addresses, and/or disguised metadata. This minted NFT may be able to accomplish most, if not all, of the same characteristics of an Instant NFT described. The minted NFT may be configured by the creator with smart contract policies that allow the spawning, or minting, of new NFTs as described in U.S. patent application Ser. No. 17/929,894 entitled "Methods for Evolution of Tokenized Artwork, Content Evolution Techniques, Non-Fungible Token Peeling, User-Specific Evolution Spawning and Peeling, and Graphical User Interface for Complex Token Development and Simulation" by Jakobsson et al., which is herein incorporated by reference in its entirety. Spawning and minting an NFT from the parent NFT may be triggered by on-chain events, off-chain events, which are typically configured with an oracle, or by a wallet action. The described techniques, including evolution and spawning may apply to public blockchains and/or also private blockchains and databases. NFT evolutions and spawns may originate on the private systems and evolve and/or spawn automatically to the public systems based upon policies set forth in the private system blockchains and/or databases. For example, a private NFT representing a wager on a championship ball game may automatically become public if the wager is a winner based upon an oracle. In another example, an NFT may become public on the 18th birthday of a child.

NFT platforms in accordance with many embodiments can provide for protecting resources, e.g., resources corresponding to the records that can be referred to as instant NFTs, is to store them in secure wallets. Traditional wallets do not store NFTs, but store references to NFTs. A secure wallet can store the resources corresponding to the instant NFTs. Secure wallets are disclosed in U.S. patent application Ser. No. 17/823,014 entitled: Methods for Conditional Transaction Tokens, Secure Sharing of Token Assets, Wallet Spam Protection, and User Interfaces for Acceptance of Terms by Jakobsson et al.; U.S. patent application Ser. No. 18/155,662 entitled "Crypto Wallet Configuration Data Retrieval" by Jakobsson et al.; and U.S. Patent Application No. PCT/US2023/062851 entitled: Systems and Methods for Abuse Safeguards in NFT-Directed Environments by Fiebrink et al.; and U.S. patent application Ser. No. 17/821,444 entitled "Systems and Methods for Management of Token Interactions" by Jakobsson et al., which are herein incorporated by reference in their entirety.

Other aspects of secure wallets include privacy management, as disclosed in U.S. patent application Ser. No. 17/821,444 entitled "Systems and Methods for Management of Token Interactions" by Jakobsson et al., which is herein incorporated by reference in its entirety.

To transfer assets, such as instant NFTs, between two secure wallets, techniques disclosed in U.S. patent application Ser. No. 18/176,920 entitled "Partitioned Address Spaces in Blockchain Wallets" by Jakobsson et al., which is herein incorporated by reference in its entirety. For example, a secure channel can be set up between two wallets protected by digital rights management (DRM) modules.

Figure 18:
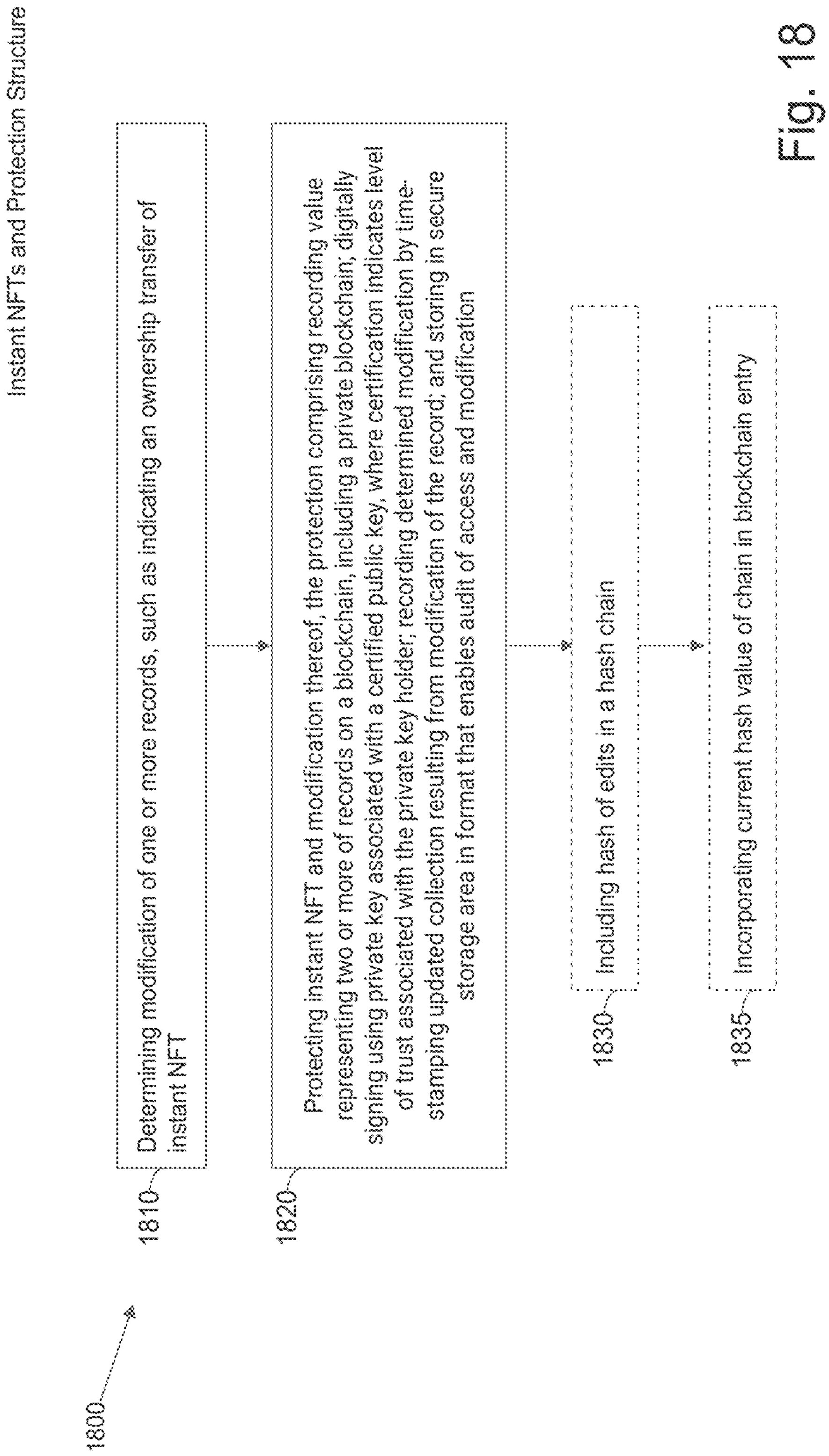
FIG. 18 illustrates a process for handling data associated with an instant NFT in accordance with an embodiment of the invention.

A process for handling data associated with an instant NFT in accordance with an embodiment of the invention is illustrated in FIG. 18. In many embodiments, an instant NFT can be associated with a first time stamp and the instant NFT can refer to data that is maintained and which represents an NFT to be minted at a later stage. The process determines (at 1810) a modification of one or more records. Records can be modified using different mechanisms, including transactions (e.g., sale, licensing, among others). For example, a first owner sells the instant NFT to a second owner. Once such a determination is made, the process protects (at 1820) the instant NFT and the modification thereof. As described, the process can apply several different processes of protecting the instant NFT and the modification thereof. NFT platforms in accordance with many embodiments can include recording a value representing two or more of records on a blockchain, including a private blockchain; digitally signing using a private key associated with a certified public key, where the certification indicates a level of trust associated with the private key holder; recording the determined modification by time-stamping an updated collection resulting from the modification of the record; and/or storing in a secure storage area in a format that enables audit of access and modification, among other techniques.

The process can (at 1830), include a hash of the edits in a hash chain, and can (at 1835) incorporate the current hash value of the chain in a blockchain entry. Although FIG. 18 illustrates a particular process for protecting and handling data associated with an instant NFT, any of a variety of processes can be utilized as appropriate to the requirements of specific applications in accordance with embodiments of the invention.

Figure 19:
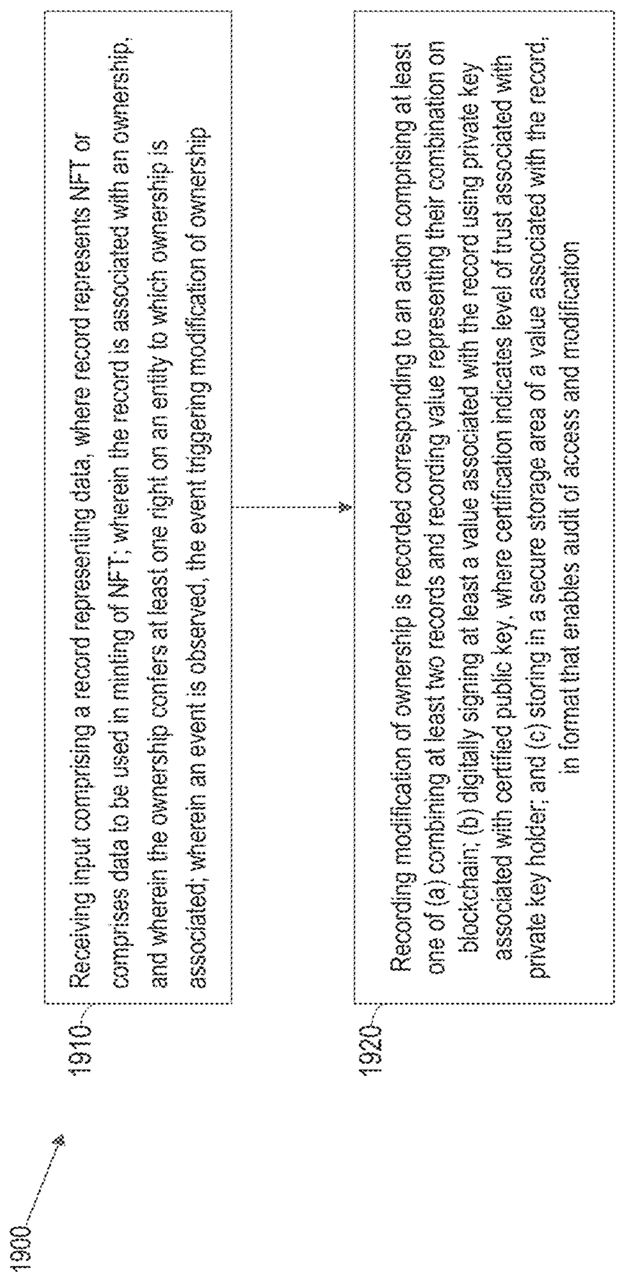
FIG. 19 illustrates a process for the management of ownership information of an instant NFT in accordance with an embodiment of the invention.

A process for the management of ownership information of an instant NFT in accordance with an embodiment of the invention is illustrated in FIG. 19. FIG. 19 illustrates the process 1900 receives (at 1910) input that includes a record representing data, where the record represents an NFT and/or includes data to be used in the minting of an NFT. The record can be associated with an ownership, and the ownership confers at least one right on an entity to which the ownership is associated. The process 1900, when an event is observed, the event triggering a modification of ownership, the process can record (at 1920) the modification of ownership corresponding to an action that includes at least one of (a) combining at least two records and recording a value representing their combination on a blockchain; (b) digitally signing at least a value associated with the record using a private key associated with a certified public key, where the certification indicates a level of trust associated with the private key holder; and/or (c) storing in a secure storage area of a value associated with the record, in a format that enables audit of access and modification, among others. Although FIG. 19 illustrates a particular process for the management of ownership information using instant NFTs, any of a variety of processes can be utilized as appropriate to the requirements of specific applications in accordance with embodiments of the invention.

NFT platforms in accordance with many embodiments can provide instant tokens that can relate to fungible tokens, such as representations of funds, and transfer of such. For example, a first user can pay a second user using a crypto currency, transferring the funds by recording, on a ledger of a blockchain, a change of ownership associated with the token or parts thereof, e.g., by using a private key associated with the token to digitally sign a transfer statement, the transfer statement including the public key of the recipient, and an amount to be transferred. NFT platforms in accordance with many embodiments, to reduce the cost of the transfer, multiple such transactions can be committed to one entry of a blockchain, e.g., using an intermediary that collects multiple transaction requests and represents these, e.g., by a cryptographic hash of the collection, on the ledger. During the time of collecting a sufficient number of transaction records of this type, the intermediary, which may be a trusted intermediary, can state to users involved in transactions its intent of posting the combined transaction statement on a ledger, where such a statement may include a digital signature using the public key of the intermediary, and be a function of the record specifying the transaction. This can lower transaction fees, such as gas fees, by spreading the fees over multiple transactions. Different manners of generating statements to provide assurance to parties of a transaction can be issued. The transaction records recorded on the ledger may also specify the exchanges, e.g., not only provide details of the transfer of funds but also indicate the tokens being purchased, e.g., other fungible tokens (in the case of a currency exchange operation, for example) and/or non-fungible tokens (in a situation where an NFT is purchased using crypto funds.) Thus, NFT platforms in accordance with many embodiments can reduce costs on both ends. In addition, NFT platforms in accordance with many embodiments can provide benefits in providing the possibility to revert accidental and/or fraudulent transactions within a period of time corresponding to the time from the receipt of the trade request to the recording of the combined transaction request on the ledger, a time during which the intermediary can undo selectively if provided convincing arguments from the parties involved.

Additionally, methods for reducing fraud disclosed in U.S. patent application Ser. No. 17/810,741 entitled "Systems and Method for Providing Security Against Deception and Abuse in Distributed and Tokenized Environments", by Jakobsson et al., which is herein incorporated by reference in its entirety, can be used in combination with the instant invention. The use of batching of transactions therefore can both reduce transaction costs (thereby enabling micropayments, for example, and low-cost auctions) and improves security (e.g., by providing an option for cancellation of inauthentic or otherwise undesirable transactions.) An example of a micro-payment is a royalty fee to be paid to an organization owning a standard, such as a rendering standard; such payments may be on the order of a few cents per transaction, making them highly undesirable to perform using traditional crypto payment schemes where the royalty would be dwarfed by the gas fee. Using approaches disclosed herein is of great benefit in such an example setting, where very small payments can be made without excessive overheads.

NFT platforms in accordance with many embodiments can generate and utilize an instant NFT to postpone minting until which time the network processing fees, also known as gas fees, are below a given threshold, and/or another set of conditions associated with a transaction are satisfied. Such conditions may be expressed in one or more policies set by a marketplace, selected by or agreed to by a user, and/or otherwise negotiated between two or more parties associated with a transaction, such as a transfer of ownership rights of one or more tokens.

For example, an NFT marketplace auction may complete at 7 PM in New York when the blockchain network is at its busiest. Immediate minting of the NFT may incur a substantial gas fee on either the buyer, seller, or the marketplace, especially in circumstances where the gas fees were estimated and funds provided in advance and vary widely from the current gas fees. In an effort to maintain expected economics, the marketplace may utilize an instant NFT to delay mint until network fees are within desired range. A user may choose to pay higher gas fees and obtain an NFT right after initiating a transaction, and/or the user may choose to lower the fees by instead receiving an instant NFT and/or a promise of an NFT, where such a promise may be associated with a set of conditions as described herein. The instant NFT may enable the marketplace to document the provenance of the yet to be minted NFT. The marketplace may also transfer the instant NFT to the buyer, e.g., further postpone the minting of the associated NFT, e.g., based on a selection made by the user. A combination operation may be performed, including providing an instant NFT at the time of the initiation of the transaction and receiving a delayed NFT corresponding to the instant NFT at a time, and/or in a situation specified by the one or more policies expressing conditions and being associated with the instant NFT and the corresponding NFT. Two or more instant NFTs and their associated ownership and/or ownership changes may be recorded in one combination record which may include a hash value of the records that are combined, and where the hash value and an optional reference to the combined records are logged on a blockchain to memorialize the status or change thereof.

NFT platforms in accordance with many embodiments can delay payment recording, e.g., the processing of credit cards and/or the logging of a crypto coin transaction on a ledger, and may be scheduled to take place at the same time as the minting of the NFT associated with an instant NFT and/or other purchase. This can provide opportunities for arbitrage of transactions, e.g., where multiple currencies are involved, and where such currencies may be crypto currencies and/or fiat currencies, and where the marketplace reduces costs related to gas fees as well as other per-transaction fees, while providing assurances to users involved in the transaction that the transaction has been committed to, where such assurances may be in the form of digital signatures generated by the marketplace and/or an associated trusted party involved in the managing of the transactions.

In NFT platforms in accordance with many embodiments, two or more records that are not related to a same transaction can be protected using one and the same protection event. Protection events may include but are not limited to recording on a blockchain, including a private blockchain; digitally signing using a private key associated with a certified public key, where the certification indicates a level of trust associated with the private key holder; and/or storage in a secure storage area in a format that enables audit of access and modification. By combining the two or more unrelated records, each one corresponding to a token, with each other, a reduction of costs can be achieved. The protection of this collection of records may, for example, be performed by a marketplace and/or an aggregator that is part of or associated with a blockchain.

In NFT platforms in accordance with many embodiments, an NFT smart contract may include functionality for the verification of a voucher entitling a holder of a first private key corresponding to a first public key to sign a blockchain transaction that includes the voucher, with the NFT smart contract subsequently verifying a validity of the signed transaction and the voucher, and hence minting a given NFT specified in the voucher. A process for producing the voucher may then include further components enabling a signing-over of the voucher to another party holding a second private key corresponding to a second public key, as specified by a timestamped record in the voucher and/or appended to the voucher, with the timestamped record including the second public key and signed by the first private key, and the NFT smart contract may include functionality for verifying the timestamped record and signature as well as a main component of the voucher indicating that an NFT may be minted. In many embodiments, the aforementioned process may be repeated to produce a chain of time-stamped signed records appended to the in turn, voucher, in which each record indicates a new over of the voucher, and in which the chain of signed records may be verified through individual verification of the signature for each timestamped record, and through verification that the timestamps are monotonically increasing through time. The validity of the voucher may be verified off-chain during a voucher transfer, and ultimately may be verified on-chain by the NFT smart contract when the voucher is redeemed for the NFT or NFTs it represents. Through this, the "promise" of a minting of the NFT may be traded off-chain.

A shortcoming associated with the aforementioned method can be that a malicious vendor may sell duplicate copies of the voucher to different parties, resulting in multiple valid vouchers that have been resold. In such a circumstance, the first voucher that is redeemed would mint the NFT, and subsequent vouchers would be invalid when presented to the NFT smart contract through a transaction. Alternatively, if a subsequently presented voucher contained an earlier timestamp for the sale, then the NFT smart contract may transfer the ownership of the NFT from the earlier presented voucher to the later one. These two possibilities may be considered undesirable by some, and NFT platforms in accordance with many embodiments can include processes for overcoming the problem of duplicate vouchers as now described.

NFT platforms in accordance with many embodiments can enable a voucher transfer transaction and a timestamp associated with it to be publicly viewable, and verifiable in order to prevent duplicate valid vouchers from being sold, details of a voucher transfer including one or more of: the timestamp, the public address of the seller, the public address of the buyer, and/or details of an NFT minting authorized by the voucher may be published in one or more of: a public database maintained and controlled by a trusted third party, the blockchain on which the NFT smart contract is deployed, and/or a second blockchain.

In NFT platforms in accordance with many embodiments, a buyer may wish to reserve a particular NFT identifier in the NFT smart contract, for example because the identifier is a desirable number such as e.g., #1, #8, or #100. In many embodiments, the NFT smart contract may include functionality that allows a buyer to reserve an identifier for an indefinite and/or defined period of time, optionally on payment of a fee. A transaction for reserving the identifier may include a reference to a minting voucher, for example a hash of the voucher, and subsequently on redemption of the voucher the NFT smart contract may mint an NFT with the reserved identifier using details obtained from the voucher.

NFT platforms in accordance with many embodiments can include objects, where an object may start its life by being represented by the data of the object; then by an instant NFT that identifies the objects and the policies and ownership governing it. The ownership of the instant may be transferred, as disclosed herein, and/or using variants of the disclosed techniques. At one point, the instant NFT may be converted to an NFT; this may be initiated by the owner of the NFT and/or by a requirement associated with the owner, e.g., by a jurisdiction. It may also be initiated as a result of a rule indicated in the instant NFT; for example, the rule may specify that as the instant NFT turns a year old from its recorded "birth", a conversion is required. A rule may depend on a market event, such as the instant NFT selling for a price that exceeds a threshold. This may be a rule that an owner may override, but which where overriding it may cause an impact on ownership, such as the loss of an insurance policy associated with the asset corresponding to the instant NFT, or after conversion, its corresponding NFT.

After an instant NFT has been converted to an NFT, it may then again regain aspects of an instant NFT. For example, a user may select for an ownership change transaction of an NFT not to be recorded in the manner otherwise done for NFTs, but instead, record the change of ownership using one of the techniques associated with instant NFTs. This effectively makes the NFT into an instant NFT again, although now anchored in an NFT record. This can be thought of as a "born again" instant NFT. Just like distinct rules and policies may be associated with instant NFTs and NFTs, distinct rules may also be associated with born-again instant NFTs. An example of such a rule may indicate the maximum number of ownership transfers the born-again instant NFT may be involved in after becoming a born-again NFT, before a required conversion step in which it is again converted to an NFT. Such rules may be required by a system, by individual jurisdictions, by external parties such as insurers, by content creators associated with the asset, by the current owner of the asset, and/or a combination of these. One potential benefit associated with causing an NFT to become a born-again instant NFT is that this may reduce the amount and/or type of public disclosure of ownership, which may be desirable for privacy-conscious investors. To balance this need for privacy with the need for law enforcement to be able to audit transactions, a system may allow select entities, such as designated law enforcement entities, to perform tracking of resources, e.g., as disclosed in U.S. patent application Ser. No. 17/821,444 entitled "Systems and Methods for Management of Token Interactions" by Jakobsson et al, which is herein incorporated by reference in its entirety.

Figure 22:
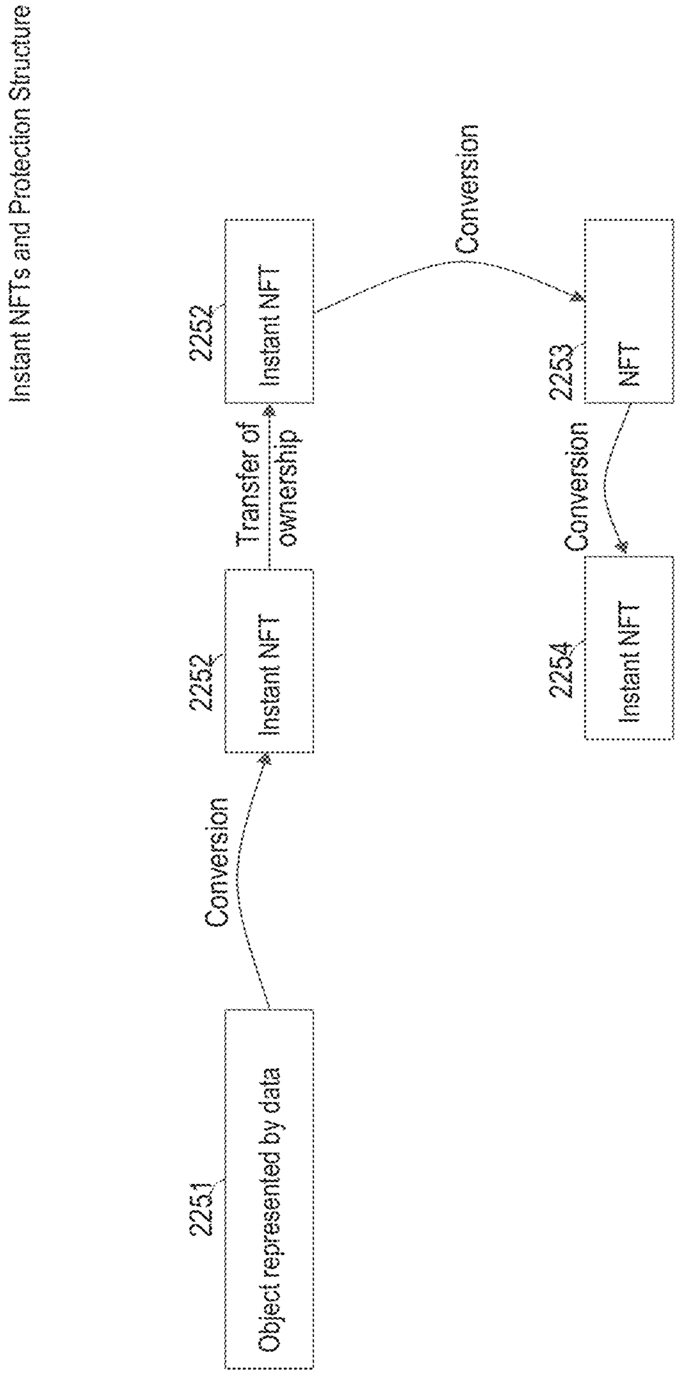
FIG. 22 illustrates a process for converting object from data to an instant NFT and then to an NFT in accordance with an embodiment of the invention.

A process for converting object from data to an instant NFT and then to an NFT in accordance with an embodiment of the invention is illustrated in FIG. 22. In particular, FIG. 22 illustrates how an object first being represented by data may be converted into an instant NFT and then sold and converted to an NFT. FIG. 22 illustrates how an object may start its life by being represented by the data of the object, by box 2251. At a point in time, an instant NFT 2252 is created for the object. The instant NFT identifies the object as well as policies and ownership governing it. At a later stage in time, the instant NFT is sold by a first user to a second user. The second user chooses to convert the instant NFT to an NFT 2253. As described, the NFT may then again regain aspects of an instant NFT and this is illustrated in by the NFT 2253 being converted into an instant NFT 2254. The "new" instant NFT 2254 may in this illustrative example be similar to the instant NFT 2252 but not identical, hence the "new" instant NFT has reference sign 2254. However, this is an illustrative example, and the "new" instant NFT may be identical to the original instant NFT 2252, e.g., the conversion arrow between boxes 2253 and 2254 might in an example not shown also go from NFT 2253 to instant NFT 2252. Although FIG. 22 illustrates a particular process for converting data to instant NFTs and NFTs, any of a variety of processes can be utilized as appropriate to the requirements of specific applications in accordance with embodiments of the invention.

In NFT platforms in accordance with many embodiments, an instant NFT that has subsequently been minted may be transferred to the ownership of an NFT holding smart contract through a token locking transaction, and may only subsequently be redeemed, that is, transferred back to an externally owned account, by the smart contract through a redemption transaction to the NFT holding smart contract. In many embodiments, the token locking transaction may include a cryptographic hash function digest message, and the redemption transaction may include a valid preimage of the cryptographic hash function digest message. In several embodiments, a secret one-time password pad may be constructed through recursively hashing an initial seed to generate a plurality of passwords, where each password is a cryptographic hash function message digest of a preceding password in the list and the seed is a first password on the list, the token locking transaction includes a last password from the list, and where multiple redemption transactions may be presented to the NFT holding smart contract, such that the NFT holding smart contract redeems the NFT to the sender of a transaction comprising an earliest password from the secret one-time password pad.

Figure 20:
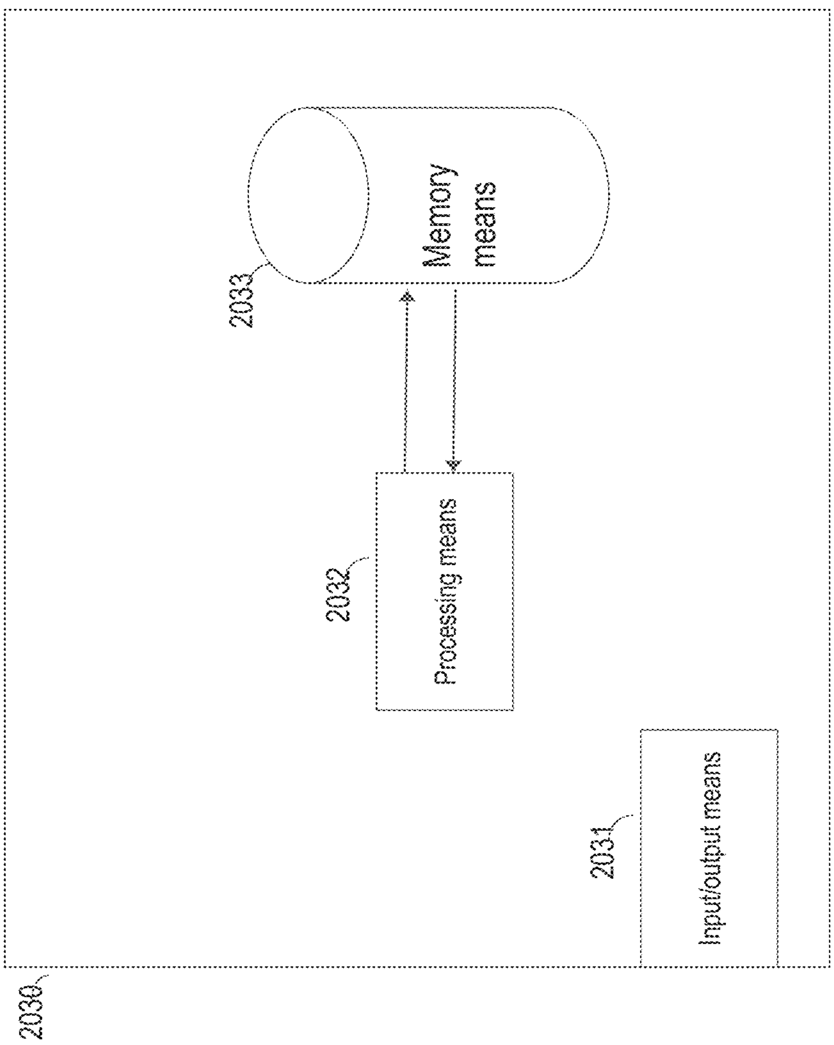
FIG. 20 illustrates a device for handling data associated with an instant NFT which can be used to lower costs associated with the management of ownership information in accordance with an embodiment of the invention.

FIG. 20 illustrates a device 200 for handling data associated with an instant NFT which can be used to lower costs associated with the management of ownership information in accordance with an embodiment of the invention. The device 200 can include input/output means 201 by means of which the device may receive information and transmit and/or provide information to other units, devices and/or entities. The device can include processing means 202 and memory means 203, the memory means 203 including instructions, which when executed by the processing means 202 causes the device to perform the methods described herein. Although FIG. 20 illustrates a particular device configuration for handling data associated with an instant NFT, any of a variety of device architectures can be utilized as appropriate to the requirements of specific applications in accordance with embodiments of the invention.

Figure 21:
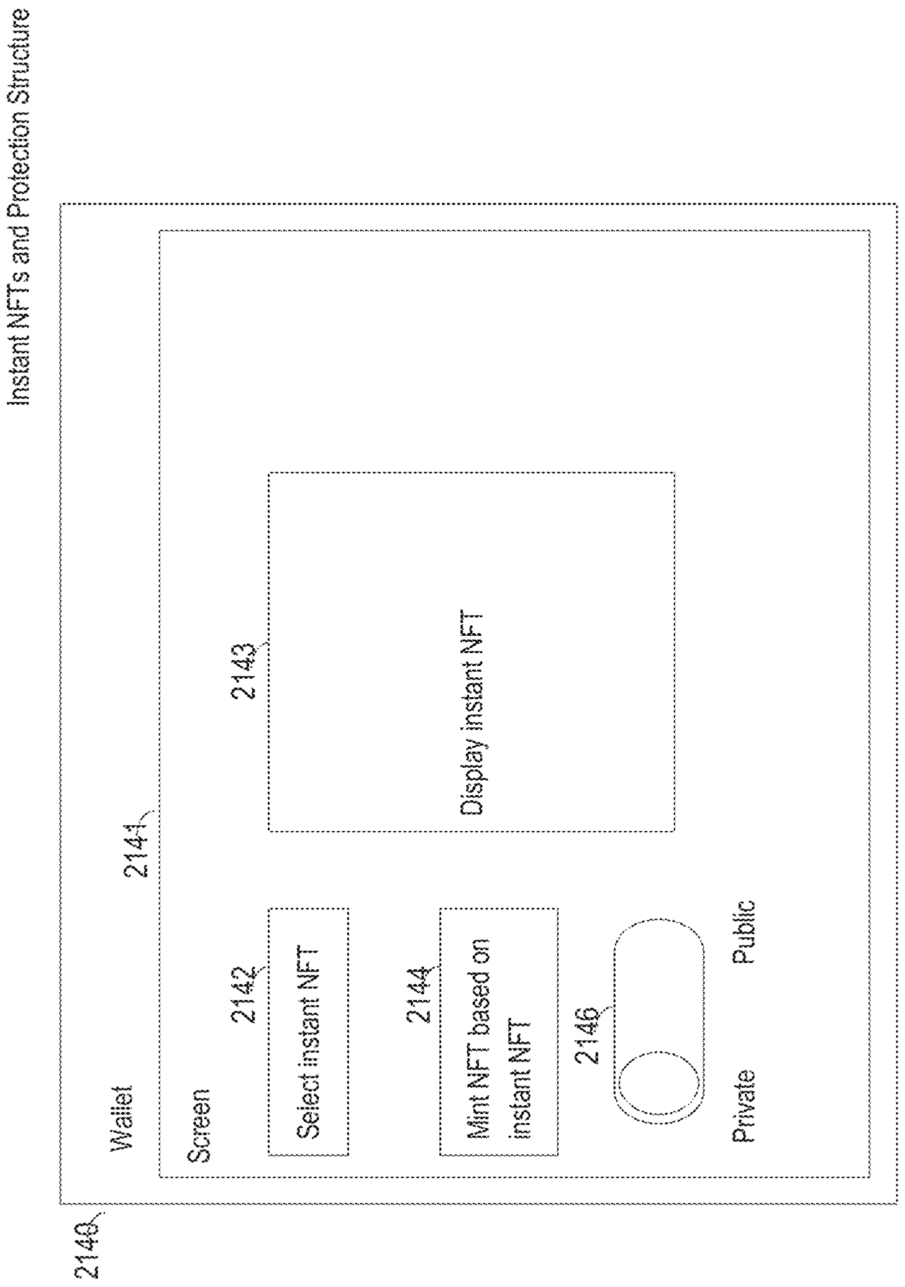
FIG. 21 illustrates a system diagram of a of a wallet in accordance with an embodiment of the invention.

A system diagram of a of a wallet in accordance with an embodiment of the invention is illustrated in FIG. 21. A wallet 2140 may include, and/or be connectable to a device, comprising a screen 2141. Merely as illustrative and non-limiting examples, the wallet may be incorporated in, and/or connectable to, a smartphone, a laptop, a computer, a tablet, a personal digital assistant etc. The wallet 2140 can include a user interface with which a user may interact with their wallet including a button and/or icon 2142 named "Select instant NFT". In certain embodiments can include a button as tap-to-mint, and/or slide-to-mint when utilizing a slider interface. A user may have several instant NFTs and by clicking this button and/or icon a list of their instant NFTs can be provided, from which the user may select one instant NFT that the user wants to "interact" with and/or look at. Once the user selects that instant NFT, information about that selected NFT may appear in the field of the screen denoted 2143. FIG. 21 also illustrates the user interface can include an icon and/or button 2144 denoted "Mint NFT based on instant NFT". By clicking this button or icon, the NFT can be minted based on the instant NFT. An interface, such as a slider 2146, may be provided in the screen 2141 whereby a user may convert, and/or transfer, an NFT and/or instant NFT from a private to a public blockchain, or vice-versa. The private and public blockchains may be two separate blockchains or a single blockchain with a privacy feature or partition. Although FIG. 21 illustrates a particular wallet configuration and user interface for a wallet, any of a variety of configurations can be utilized as appropriate to the requirements of specific applications in accordance with embodiments of the invention.

Smart Contract Risk Scoring Method

In the web1.0 environment in which there were only a small number of content and service providers, reputation could be managed by individual users recognizing a given service provider out of some ten or a hundred available service providers. In the web2.0 world, when a large number of content consumers also became content producers, it was no longer practical for individuals to manually recognize service providers and assess their quality based on previous engagements or hearsay; accordingly, automated mechanisms generating reputation scores of service providers were created and maintained.

Examples of such scores are available on different services, including on eBay™, Yelp™ and other marketplaces. Twitter™ tracks reputation by indicating the number of followers, and Meta™ indicates the number of likes a post has received. However, these web2.0 mechanisms may not be useful in a web3.0 environment, as there can be a vastly larger number of parties, whose control may change over time, and accordingly, abuse may form in an instant.

A problem of being able to identify risk can also be much higher, as tokens and content may increasingly include executables, which may be malicious. The proximity to financial value can also be likely to soon exacerbate the problem and make malicious and adversarial actors more prominent. This problem can also be likely to increase due to the relative anonymity of web3.0 and the difficulty to perform take-down and filtering of undesirable content in a distributed environment in which users do not rely on trusted service providers as gateways to the Internet.

Additionally, in web2.0, a retailer selling a product was generally responsible for deploying a payment gateway solution and product delivery mechanism. In web3.0, many purchases are made via smart contracts with sometimes dubious authors. The same smart contracts can also provide and/or trigger "delivery" of digital assets. The contract author, or deployer, may be entirely different from the actual seller of the digital asset; thereby making the reputational assessment more difficult for the average consumer. Difficult reputational assessment can also increase the difficulty and cost, or risk, of providing buyers with buyer protection. An example of buyer protection outside of a web3.0 environment can be: when a credit card company refunds the buyer of a new television that is damaged or stolen during transport to the buyer's residence.

NFT platforms in accordance with many embodiments provide for a rating mechanism and/or reliability indicator for web3.0 enabled websites and blockchain smart contracts that may not be predicated on the authority of a monolithic and centralized corporation.

NFT platforms in accordance with many embodiments provide a rating mechanism that can be associated with smart contracts. In many embodiments, a smart contract can include at least one rule, which is typically an executable component and which may be malicious, and an optional one or more parameters that associate the smart contract with one or more content elements and/or one or more references to content external data. A parameter may be functional, by modifying the execution path of the executable component, and/or non-functional, such as a token price or a content location reference may be. Non-functional parameters may not affect the execution path of the executable. Smart contracts may be included in tokens, such as non-fungible tokens (NFTs), or may be referenced by NFTs, and/or otherwise associated with NFTs. For example, a first smart contract may include code and/or libraries, and an NFT instantiated in a second NFT smart contract may include data structures for storing details pertaining to the NFT and may further include a data structure for storing the code and/or libraries, and/or may include a data structure for storing a URI (uniform resource identifier), said URI pointing to the code and/or libraries, with the code and/or libraries stored on the blockchain, a fileserver, the InterPlanetary File System, and/or other data storage systems.

NFT platforms in accordance with many embodiments can associate one or more rules with a smart contract, and/or an optional one or more functional parameters can also be associated with the smart contract, with a score indicating the security of the smart contract. In many embodiments, a score may be a vector score where a dimension of the score indicates a security value and a different dimension represents a certainty. The security value may indicate a level of risk associated with a smart contract, including that a smart contract is associated with perceived risk (a low score) or a determined lack of risk (a high score); the certainty value may indicate a number of observations supporting the score, a variance, a confidence interval, and/or one or more indications of trusted or untrusted instances of the use of the smart contract rule(s) and optional functional parameters.

NFT platforms in accordance with many embodiments can associate individual scores to individual rules within a smart contract. In particular, since a smart contract may include multiple rules, the smart contract may have multiple vector scores, each for one rule and its optional functional parameters. A smart contract may also be associated with a vector score that represents a multiplicity of rules and their associated optional functional parameters.

NFT platforms in accordance with many embodiments can represent a smart contract with an array of vector scores and/or a matrix, with each element of the array corresponding to one such representation. The smart contracts and the associated one or more scores may be stored in a lookup table, a blockchain, a proprietary database, a wallet, among other types of storage mechanisms. In certain embodiments, a storage may store a representation of the smart contract that is shorter than the smart contract itself, e.g., a cryptographic hash of it, along with the one or more scores, and/or the address of the smart contract.

NFT platforms in accordance with many embodiments can provide an indicator for one or more scores, such as a warning, an endorsement and/or an indication that neither warning nor endorsement exists. Such indicators may be associated with a digital signature attesting to the identity of the party providing the indicator; an example of such a provider is a trusted party such as a centralized service provider and/or a distributed entity such as a quorum of servers, where such servers may become members of the quorum by virtue of having authority or by staking a resource. In certain embodiments, indicators may be represented by whitelists, ban-lists and lists indicating the certainty associated with indicators.

Figure 23:
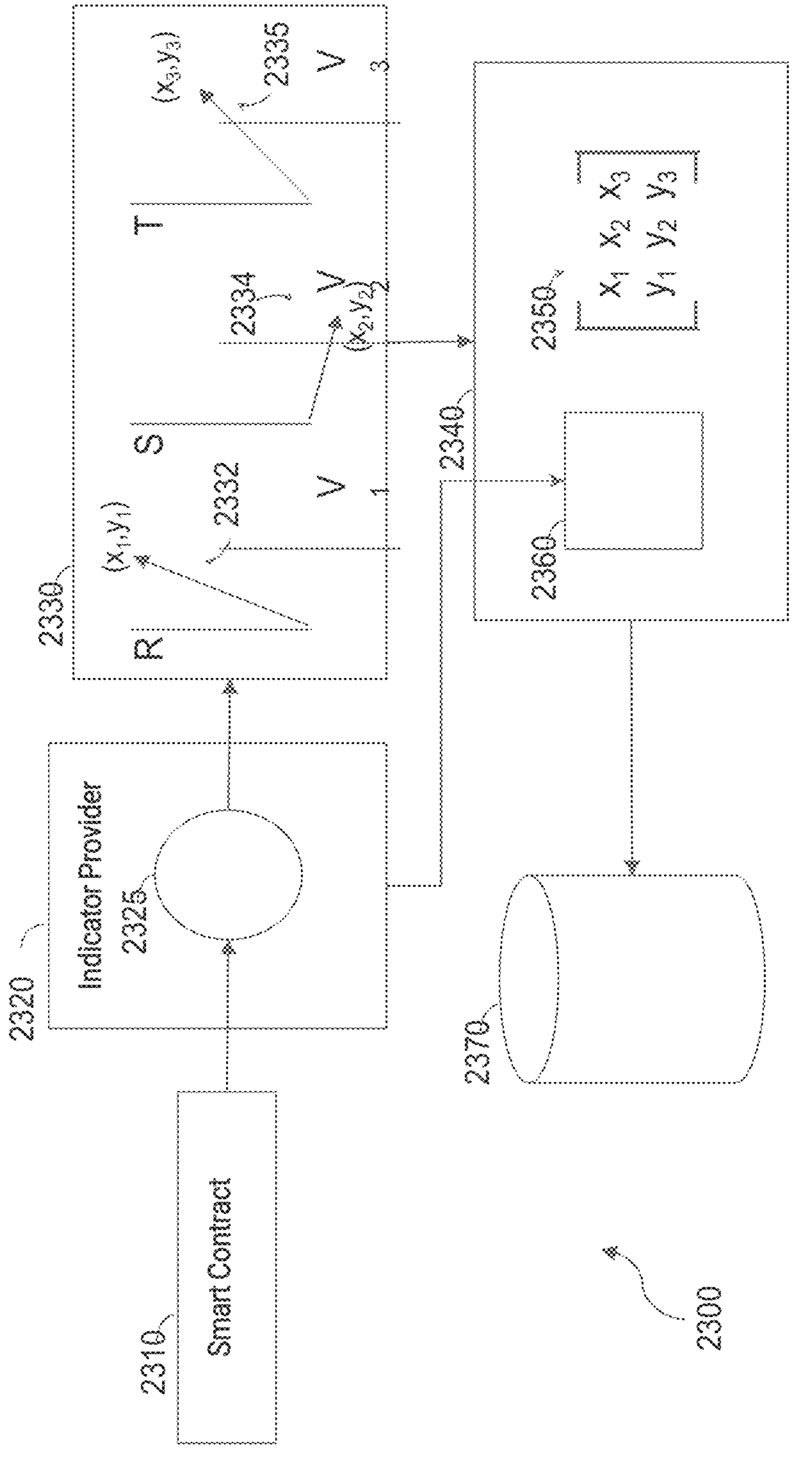
FIG. 23 illustrates a construction and storage by an indicator provider of a security indicator in accordance with an embodiment of the invention.

An NFT platform with smart contract risk scoring in accordance with an embodiment of the invention is illustrated in FIG. 23. In particular, FIG. 23 illustrates a block diagram illustrates components (2300) of a construction and storage of an indicator (2340) for a smart contract (2310) by an indicator provider (2320). The smart contract (2310) may be retrieved by an indicator provider (2320) and analyzed using an analysis function (2325) producing an indicator (2330) comprising a plurality of indicator vectors (2332, 2334, 2335). The indicator (2330) may be converted into a signed indicator collection (2340) comprising an indicator vector (2350) and a digital signature (2360) produced by the indicator provider (2320). The signed indicator collection (2340) may subsequently be stored in a database (2370). Although FIG. 23 illustrates a particular configuration for an NFT platform with smart contract risk scoring, any of a variety of configurations can be utilized as appropriate to the requirements of specific applications in accordance with embodiments of the invention.

NFT platforms in accordance with many embodiments can generate a security score for a contract by performing one or more observations of a behavior of the smart contract in a sandbox environment, including determining whether the execution of the smart contract results in a risk being determined, e.g., by the smart contract trying to break out of the sandbox, determine the presence of the sandbox, attempting to access signature private keys associated with one or more other tokens kept in the sandbox; attempting to access contents of the sandbox that are indicative of risk, among other types of behavior.

Figure 24:
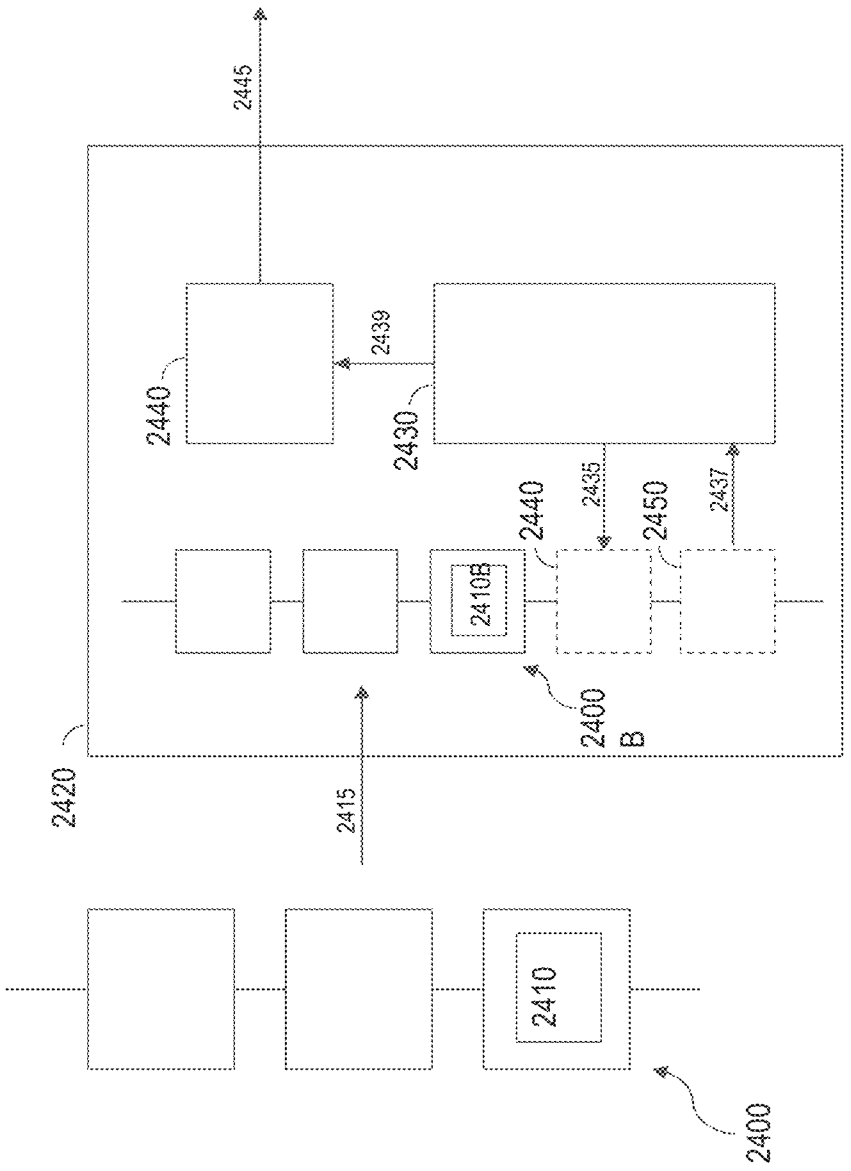
FIG. 24 illustrates a sandbox testing system for examining reliability and trustworthiness of a smart contract in accordance with an embodiment of the invention.

A configuration for determining a security score by performing observations in a sandbox environment in accordance with an embodiment of the invention is illustrated in FIG. 24. In FIG. 24, a blockchain (2400) may include a smart contract (2410) that a user wishes to interact with. A copy of part and/or all of the blockchain (2400B) may be instantiated within a sandbox (2420), as shown by arrow 2415. The copy of part or all of the blockchain (2400B) may include a smart contract copy (2410B) of the smart contract (2410).

A test unit (2430) may submit transactions to the copy of part or all of the blockchain (2400B) to test the smart contract copy (2410B). An example transaction is illustrated by arrow 2435, with the transaction (2435) being accepted into a first virtual block (2440). Effects of the transaction (2435) may be examined by the test unit (2430) in subsequent virtual blocks, for example a second virtual block (2450). The test unit may read values and parameters from virtual blocks, as illustrated by arrow 2437.

Test results may be passed to a scoring unit (2440) as shown by arrow 2439. The scoring unit (2440) may analyze test results using processes described herein to produce a scoring result, which may be passed to other components, as shown by arrow 2445. Although FIG. 24 illustrates a particular configuration for determining a security score by performing observations in a sandbox environment, any of a variety of configurations can be utilized to determine security scores using sandbox environments as appropriate to the requirements of specific applications in accordance with embodiments of the invention.

NFT platforms in accordance with many embodiments can determine a security score based on data and/or by collecting feedback from different sources, including from one or more wallets indicating the successful/problematic use of the smart contract (e.g., referenced by its hash value) and/or on an attempt to abuse associated with the presence of the smart contract, which may be reported by different sources, including a wallet, a security monitor, and/or a bounty hunter, among other sources.

NFT platforms in accordance with many embodiments can determine a security score by indications by one or more entities that have staked resources and which are paid for generating indications that are determined to be accurate. An indication may either be a warning or an endorsement. If such an entity incorrectly indicates that a smart contract is safe, it may lose a portion of its stake. In certain embodiments, a security score can be determined by observations of risk-free usage over a large number of transactions, e.g., by scanning contents on one or more blockchains and determining the smart contract to be common, along with an absence of reports of abuse from parties associated with the tokens to which the smart contract is associated. NFT platforms in accordance with many embodiments can determine a smart contract security score based on a determination that the smart contract is associated with a trusted entity, such as a known content creator, and/or a particular user, by ways of an anchor between the user identity and a physical identity. Such anchors can be referred to as "soulbound tokens". Such tokens may not be disassociated from their physical owners, and may utilize biometrics to link the soulbound token to the physical identity of the user, but without revealing the associated biometric template and/or other sensitive information. NFT platforms in accordance with many embodiments can generate a security score based on inputs from security companies, which may operate as centralized entities and which may operate agents in user wallets, where said agents block abuse and produce reports on smart contracts, such reports being warnings or endorsements.

Figure 25:
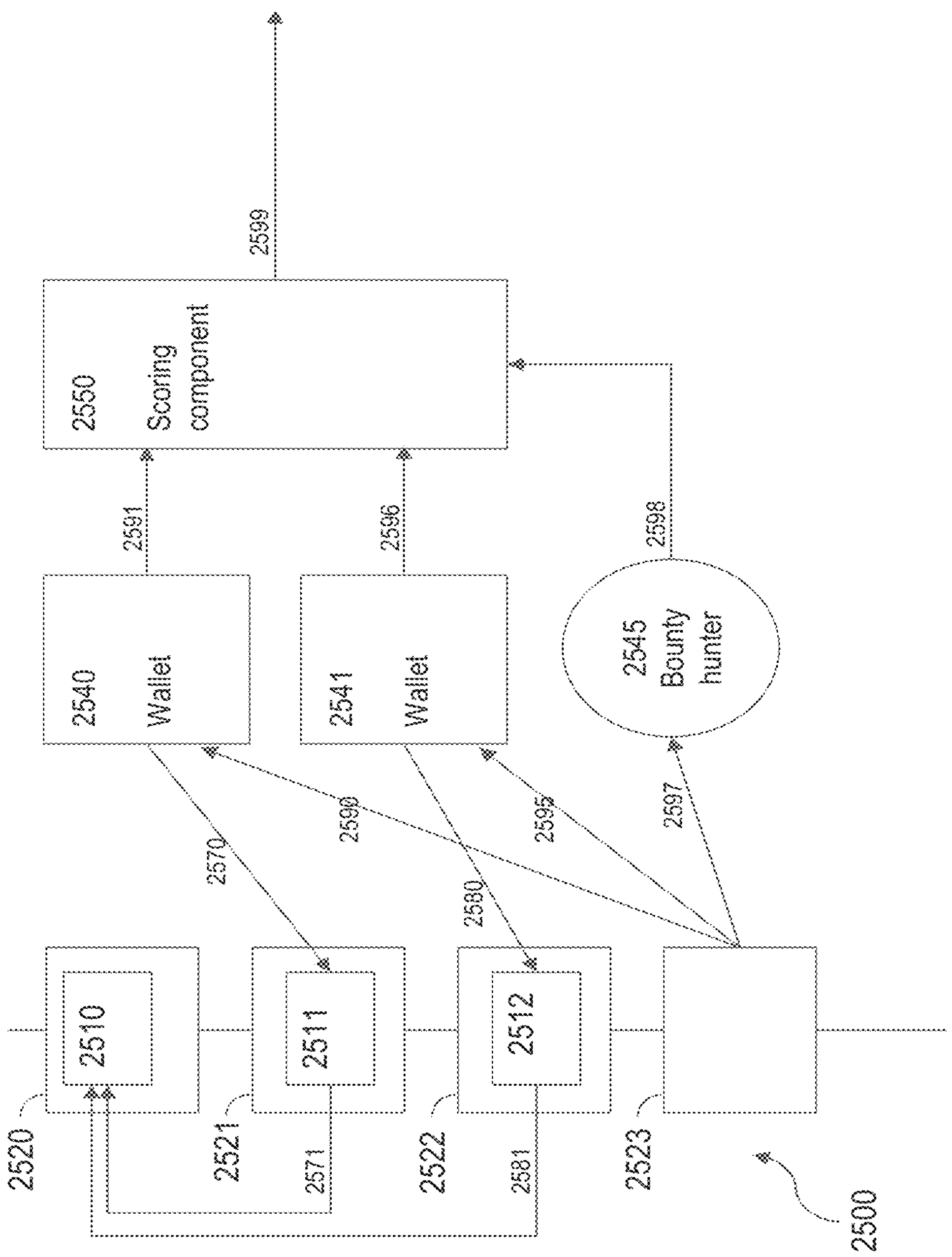
FIG. 25 illustrates scoring trustworthiness and reliability of a smart contract through the use of wallets and bounty hunters in accordance with an embodiment of the invention.

An NFT platform that generates risk scores based on feedback from several different sources in accordance with an embodiment of the invention is illustrated in FIG. 25. As illustrated in FIG. 25, a blockchain (2500) may include several blocks. At a beginning of a time period, a first block (2520) for the time period may be generated, said first block including a smart contract (2510).

One or more users may wish to interact with the smart contract (2510), and may have concerns about a security of the smart contract (2510). For example, a first user and a second user, with a first wallet (2540) and a second wallet (2541) respectively.

The first user may use the first wallet (2540) to submit a first transaction (2570), which may be accepted by the blockchain (2500) and included in a second block (2521) as a first accepted transaction (2511), said first accepted transaction interacting with the smart contract (2510) as illustrated by arrow 2571.

Similarly, the second user may use the second wallet (2541) to submit a second transaction (2580), which may be accepted by the blockchain (2500) and included in a third block (2522) as a second accepted transaction (2512), said first accepted transaction interacting with the smart contract (2510) as illustrated by arrow 2581.

The first wallet (2540) and/or the second wallet (2541) may subsequently report outcomes of transactions, as indicated by arrow 2590 and arrow 2595 respectively, back to a scoring component (2550) based on observations made by the wallets, as indicated by arrow 2591 and arrow 2596 respectively.

A bounty hunter (2545) may also extract information pertaining to the transactions, as indicated by arrow 2597, and may report this to the scoring component (2550).

The scoring component (2550) may then compute a score for the smart contract (2510), and make the score available to other parties, as indicated by arrow 2599. Although FIG. 25 illustrates a particular configuration for generating scores based on feedback from several sources, any of a variety of configurations can be utilized as appropriate to the requirements of specific applications in accordance with embodiments of the invention.

NFT platforms in accordance with many embodiments can assign weights to different scoring techniques based on different risks associated with the techniques. In particular, different processes of generating security scores associated with a smart contract can have different risks relative to each other, each such method may be associated with a weight, where the weight indicates the importance given to a given component of the final security score, such final security score being computed as a weighted function of the components. However, in instances where a risk is indicated and evidence is provided to demonstrate the risk, the associated score component may be given a much higher risk than other score components that do not come with associated evidence. An example type of evidence is a log indicating the test performed and how it indicated abuse, enabling a third party to replicate and verify the presence of the abuse.

NFT platforms in accordance with many embodiments can adjust security scores based upon a previous buyer's complaint and reputation. For example, a buyer of an NFT may publicly complain on a marketplace platform that the smart contract drained their account without delivering the digital asset.

NFT platforms in accordance with many embodiments can generate security scores based upon an artificial intelligence (AI) and/or machine learning (ML) assessment. For example, an NFT platform can use AI to determine that the risk of a particular smart contract is exceedingly high based upon an association of the author and/or deployer wallet, for example, with previously malevolent smart contracts. NFT platforms in accordance with many embodiments can use off-chain data in addition to on-chain data, such as data from a Twitter™ bio or post. An AI module, for example, can assess a likelihood of a smart contract associated with a Twitter™ bio being trustworthy based on a training set of other Twitter™ bios categorized as honest or scams by processing words and/or phrases, compositions of and frequency of images used, and/or posting patterns of the Twitter™ bio.

NFT platforms in accordance with many embodiments can generate security scores based upon the actions of potential buyers, and marketplaces, such as marketplaces that impose banlists or whitelists on blockchain addresses. For example, monitoring of a previous buyer's wallet(s) may indicate that they never received the promised digital asset.

NFT platforms in accordance with many embodiments can score a smart contract by a trusted entity that may gain access to the source code of the smart contract and/or a review of the smart contract by a third-party auditor; and where the trusted entity determines that the smart contract is trustworthy based on analysis of the source code and/or the review. Smart contracts can also be assessed by what entities have approved a given smart contract, e.g., by having used it or explicitly having endorsed it. If a trusted party uses a smart contract, that can be used to increase the security score for the smart contract.

NFT platforms in accordance with many embodiments can determine security scores using one or more rules, which may be heuristic. NFT platforms in accordance with many embodiments can use a machine learning element, and/or an artificial intelligence module to determine security scores. In several embodiments, scores can be based on statistical methods taking as input previously computed security scores and observations relating to the behavior of the smart contract, e.g., whether it was malicious or not, buggy or not, representing human-facing descriptions or not.

Figure 26:
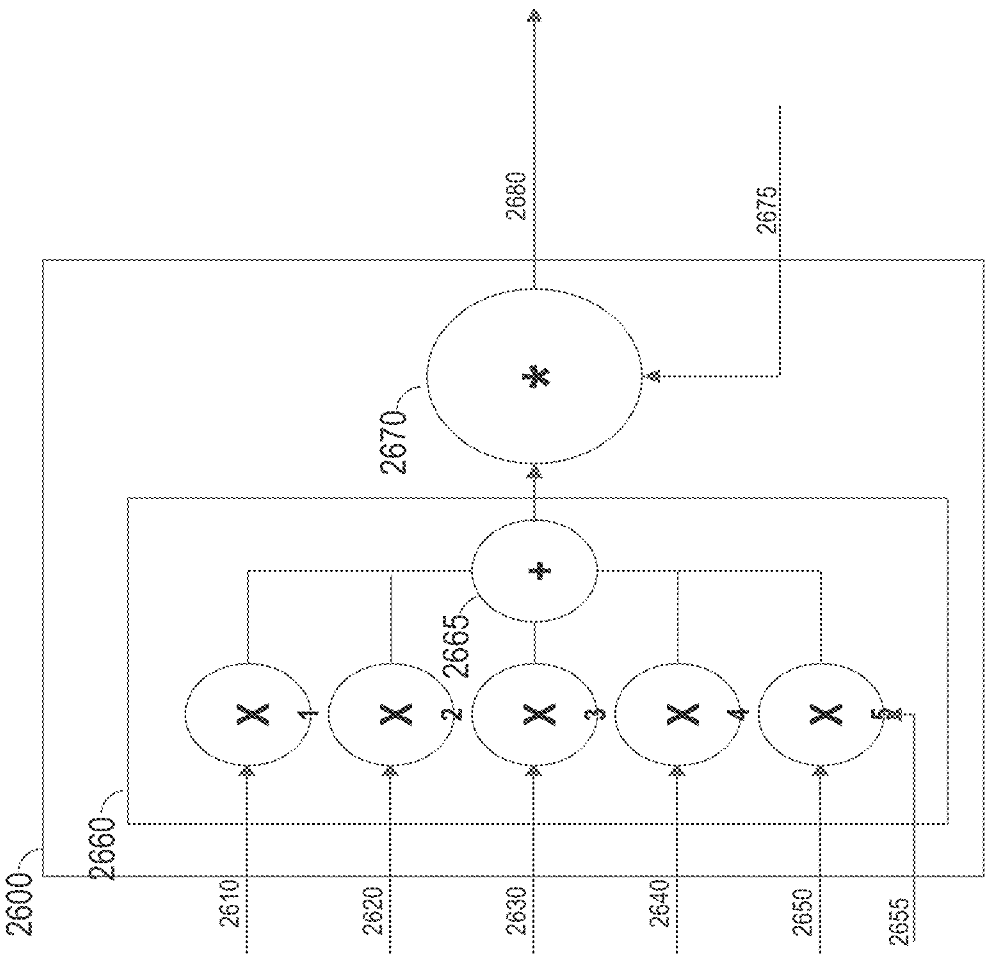
FIG. 26 illustrates a scoring component for a production of an amalgamated score for a smart contract in accordance with an embodiment of the invention.

An NFT configuration for generating security scores in accordance with an embodiment of the invention is illustrated in FIG. 26. A scoring component (2600) may receive and/or collect one or more scores for a smart contract.

The NFT platform in accordance with an embodiment can utilize a first score, indicated by arrow 2610, that may include an assessment and score generated by a trusted entity accessing source code of the smart contract and/or a review of the smart contract, possibly by a third party auditor.

The NFT platform in accordance with an embodiment can generate a second score, indicated by arrow 2620, that may include an assessment and a score generated through automated analysis of prior wallet transactions with the smart contract.

The NFT platform in accordance with an embodiment can generate a third score, indicated by arrow 2630, that may include an assessment and a score generated through automated analysis of a presence or absence of the smart contract on a set of banlists and allowlists.

The NFT platform in accordance with an embodiment can generate a fourth score, indicated by arrow 2640, that may include an assessment and a score generated through an AI interpreting external data gathered from social media accounts referencing or associated with the smart contract.

The NFT platform in accordance with an embodiment can generate a fifth score, indicated by arrow 2650, that may include some other method for generating an assessment and a score, with arrow 2655 indicating further external inputs for modifying the score.

The NFT platform in accordance with an embodiment can generate a weighting component (2660) that may include different weighting formulae $X_1$, $X_2$, $X_3$, $X_4$, $X_5$, applied to the scores, and an additive formula (2665) for combining outputs from the weighting formulae.

The NFT platform in accordance with an embodiment can include a scoring component that may include a multiplier component (2670) for modifying or influencing a final composite score, indicated by arrow 2680. The multiplier component may take an external input, indicated by arrow 2675, which may be used to increase or decrease the scoring components output based on previous performance and comparisons to other scoring components.

Those skilled in the art will appreciate that many other scores may be obtained and collated by the scoring component (2600) during the production of the final composite score (2680). Although FIG. 26 illustrates an NFT platform that utilizes a particular process for generating a security score using various scores from different sources with different weightings, any of a variety of processes can be utilized as appropriate to the requirements of specific applications in accordance with embodiments of the invention.

NFT platforms in accordance with many embodiments can specify that a party generating a smart contract, (e.g., from scratch or by modifying one or more pre-existing smart contracts), put up an amount of funds and/or a token with a value exceeding a threshold value as an assurance that the smart contract corresponds to its specifications or is otherwise desirable. An NFT platform in accordance with an embodiment can provide for a form of a staking of said resources. NFT platform in accordance with embodiments of the invention can provide, if the contract is determined not to meet the promised behavior, then the stake or a portion thereof may be confiscated and/or provided to one or more parties who suffered losses as a result of the behavior of the smart contract. NFT platform in accordance with many embodiments of the invention generate a security score generated based on the presence or absence of such a staking of resources, and the amount or value of these. In many embodiments, this may be one particular dimension of a security score. The size of the amount being staked may affect how many users may be encouraged to engage with the smart contract at any one point in time, where a greater engagement requires greater value being staked in order to address the potential losses being greater.

NFT platforms in accordance with many embodiments can generate a smart contract by a smart contract compiler that takes as input one or more policies, one or more parameters, and one or more references. A policy may state the conditions of access, for example, which may be limited to entities with possession of the associated token, or which may enable content sharing or content renting. The parameter may specify a royalty amount or percentage associated with a given action, such as the transfer or ownership (possession), the renting out of content, etc. The reference may indicate one or more elements external to the token that are governed by the smart contract, e.g., content, externally located policies, references to escrow authorities, etc.

NFT platforms in accordance with many embodiments can provide various buyer protection mechanisms. NFT platforms in accordance with several embodiments can protect a buyer of a token from malicious smart contracts that may attempt to transfer out other tokens from the ownership of the buyer, e.g., to a malicious thief associated with the malicious contract. NFT platforms in accordance with many embodiments can achieve this by identifying and accepting only smart contracts that are trusted (e.g., have a high security score and high certainty value associated with it); by identifying and rejecting contracts that have known-malicious content (e.g., implementing a ban-list, potentially based on low security scores); and/or a heuristic method in which smart contracts that are not well understood (e.g., whose security score has a low associated certainty or assurance value) are tested in a protected environment to determine whether they misbehave. Thus, both the score (whether high or low) and the certainty value (whether high or low) can be used to determine risk and protect a buyer. NFT platforms in accordance with many embodiments can combine a detection of trusted smart contracts with a detection of known-malicious contracts and the detection of low-certainty smart contracts in order to combine the benefits of these three solutions with each other and obtain the most flexible solution possible. Other related techniques for protection of users based on automated analysis of smart contracts are disclosed in U.S. patent application Ser. No. 18/048,346 entitled “Systems and Methods for Protecting Against Token-Based Malicious Scripts” by Jakobsson et al., and in U.S. Provisional Patent App. No. 63/365,186 titled “Detection of Malicious Code within Blockchain Smart Contracts” by Keir Finlow-Bates, Markus Jakobsson and Perry R. Cook and filed on May 23, 2022, which are herein incorporated by reference in their entirety. Heuristic assessment of smart contract risk and scoring may also include comparisons with previously scored smart contracts and the addresses that deployed the contracts, such as when a bad actor deploys a new smart contract from an address previously associated with high-risk or harmful effects. NFT platforms in accordance with many embodiments can make assessments that include analysis and tracking of metadata associated with a smart contract and/or the assets associated with the contract, such as NFT jpeg images. Metadata may also include tags associated with blockchain smart contracts and content among other data.

NFT platforms in accordance with many embodiments can provide buyer protection mechanisms that may govern whether a smart contract complies with a set of requirements. Some such requirements may be based on the jurisdiction, and may require that escrowing of identity information is performed in order to enable tracking. Tracking may not be immediately beneficial to a given token owner but still desirable for society as such, as it enables protection of vulnerable users. NFT platforms in accordance with many embodiments can provide various requirements that may be required by a wallet that receives a token, e.g., by means of purchasing, renting or borrowing it. An example of such a requirement is that the smart contract does not initiate the transfer of personally identifiable information (PII) and/or user activity data (e.g., past content viewing logs) to an advertiser and/or other third party. Yet other requirements may be put in place by third parties, such as a parent of a wallet user that may configure requirements relating to the type of content to be rendered, purchased, sold, etc. Parent guided protection is disclosed in U.S. patent application Ser. No. 18/176,920 entitled “Partitioned Address Spaces in Blockchain Wallets” by Jakobsson et al., and U.S. patent application Ser. No. 18/155,662 entitled “Crypto Wallet Configuration Data Retrieval” by Jakobsson et al, which are herein incorporated by reference in their entirety.

NFT platforms in accordance with many embodiments can leverage insurance-based security mechanisms. For example, a user may purchase insurance against undesirable events, such as ransomware attacks, where the user is required by the insurance company to constrain their wallet (s) in terms of their functionality in order to comply with the requirements of the insurance policy. One example of such a constraint is to not execute smart contracts belonging to some identified first set of classes, and/or only executing smart contracts that belong to some identified second set of classes. Here, the first set of classes and/or the second set of classes are associated with the insurance policy, and may be selected by the insurer. An example of a member of the first set of classes is a smart contract with a security score that is lower than a first threshold value, where this corresponds to a higher than acceptable risk. Another example of a member of the first class is a smart contract that is not certified by a trusted entity, where an example trusted entity is a certification authority that analyzes smart contracts and only certifies smart contracts with a security score that exceeds a second threshold value, where this security score may be determined by the certification authority and/or an entity collaborating with the certification authority. An example of the second set of classes is a smart contract that comes from or is endorsed by an entity that is whitelisted with the insurer, and/or which has put up a bond to guarantee the security of the smart contract, the bond satisfying a requirement by the insurer such as the amount of money being committed exceeding a minimum requirement amount.

Another example of the second set of classes is a smart contract whose security score and associated uncertainty value both exceed values set by the insurer. NFT platforms in accordance with many embodiments can utilize plugin executables to determine requirements associated with a smart contract. An insurer may provide or facilitate access to a plugin executable unit that expresses the requirements, and where this plugin executable is incorporated with the user wallet or other filter associated with the wallet. An example filter is a gateway or an anti-virus software unit screening data from and to the wallet. The plugin executable can be configured to only allow user actions that are in compliance with the insurance policy. The plugin executable can be configured to alert a user of non-compliance and ask the user whether the user still wishes to proceed, in spite of this invalidating or reducing the coverage of the insurance policy. In several embodiments, a plugin executable can be configured to convey non-compliant smart contracts, or information related to these, to an evaluation unit for the evaluation unit to make a security determination and generate a response to the wallet that dictates the actions of the wallet, e.g., blocking, alerting, allowing. The evaluation unit may require payment by the wallet to perform the evaluation, or may require a subscription by the user of the wallet or an associated entity. The evaluation unit may determine the security score of the smart contract by evaluating the smart contract (along with potential associated information referenced by the smart contract) in a sandbox or virtual machine, and determining whether the result is high-risk or low-risk. The evaluation unit may also generate or maintain updates to policies and lists useful to determine security scores, where an example policy may state the functional behavior of a smart contract and an associated risk score impact, and wherein example lists include whitelists, blocklists (which can also be referred to as banlists) and/or lists indicating certainty. The plugin may perform one or more of the automated actions disclosed in U.S. patent application Ser. No. 18/176,920 entitled “Partitioned Address Spaces in Blockchain Wallets” by Jakobsson et al., which is incorporated by reference herein in its entirety.

NFT platforms in accordance with many embodiments can utilize ratings from certified trusted entities in determine risk scores. One example insurer may allow an insured party to access, using a wallet of a specified type (e.g., having a trusted execution environment protecting private keys, and biometric authentication of users), any tokens with smart contracts issued by an AAA-rated certification authority. Here, the AAA-rating may be provided by a conglomerate of insurers, based on audits, historic behavior of the certificate authority and the number of paid complaints associated with smart contracts said certificate authority. A certificate authority whose associated rate or numbers of paid complaints exceeds a threshold may be downgraded to a AA-rating, and tokens with smart contracts would not be allowed to the wallet of the insured users unless also certified by a certificate authority that retains the AAA rating.

An insurer may cause limitations to actions performed by a user, based on an insurance policy or other agreement, and potentially receive feedback from a wallet that is used to override insurer requests. The same approach can be used for other semi-authorities to put in place controls, recommendations and feedback opportunities, e.g., to guide the behavior of one or more users with respect to usage of content, transfer of tokens, and more generally, interactions with the surrounding world. Examples of such semi-authorities are juridical entities, e.g., a court requiring a certain behavior of a specific user as a result of a legal action; parents and guardians placing restrictions on children and other minors, employers limiting what actions can be performed using a corporate computer or during work hours, and more. The disclosed technology is compatible with the technology disclosed in U.S. patent application Ser. No. 18/155,662 entitled "Crypto Wallet Configuration Data Retrieval" by Jakobsson et al., which is herein incorporated by reference in its entirety.

NFT platforms in accordance with many embodiments can apply to smart contracts and/or to smart content included in and/or referenced by tokens, where such smart content operates on other tokens and provides augmented functionality to the wallet. One example of smart content is the plugin executable described. Smart content can be used to modify the user experience, e.g., related to the user interfaces that are applied or enabled. An example of such a situation is disclosed in U.S. patent application Ser. No. 18/155,662 entitled "Crypto Wallet Configuration Data Retrieval" by Jakobsson et al., which is herein incorporated by reference in its entirety.

Another example of smart content is an executable that enhances the processing of other content, such as a faster content compression method or a DRM module that unlocks features that are not otherwise available. This can be done in the context of a wallet, as disclosed in U.S. patent application Ser. No. 18/176,920 entitled "Partitioned Address Spaces in Blockchain Wallets" by Jakobsson et al., which is herein incorporated by reference in its entirety.

It may further be used to enable functionality related to specific tokens. These are merely illustrative examples of contexts where smart content may be used to deliver functionality, using NFTs or other containers delivered to wallets, to enhance processing of data. Such smart content may have access rights that make it potentially dangerous, e.g., the right to initiate the transfer of ownership for tokens associated with the wallet in which it operates, assuming the wallet is configured to allow the smart content such access. This can make it important to judge whether the smart content is and/or contains malicious, buggy or otherwise undesirable code. The disclosed technology is compatible with the technology disclosed in U.S. patent application Ser. No. 17/806,724 titled "Systems and Methods for Blockchain-Based Collaborative Content Generation" by Jakobsson et al., filed on Jun. 13, 2022, which is herein incorporated by reference in its entirety and can be used for purposes described in that application.

NFT platforms in accordance with many embodiments can execute a smart contract and/or a smart content element, e.g., by a wallet, in a sandboxed environment that is connected, via a restricted interface, to other elements of the execution environment (e.g., wallet), and where the restricted interface includes a filter that determines the risk of requested actions and/or series of actions and based on the risk takes actions, preferably in real-time, to constrain the execution in the sandbox based on the computed risk scores exceeding thresholds that may be set by the user and/or determined based on the value of the content potentially affected by the requested actions.

For example, a smart contract or smart content element may request the transfer of an NFT to a party with which the wallet owner has a significant interaction history or otherwise has indicated is trustworthy. As long as the value of the asset to be transferred does not exceed a threshold (such as $100), the transfer request may be allowed. However, if the value exceeds the threshold, the user of the wallet may be notified and prompted to approve or deny the request. If the request is denied, the security score of the smart contract or smart content making the request may be modified downwards, e.g., by 5 points. If a transfer is requested to an entity that the user has no relationship with or that has been associated with scams in the past, then the transfer may be blocked or the wallet user notified independently of the value of the affected asset.

NFT platforms in accordance with many embodiments can set that a wallet may launch a test copy of a blockchain in a sandboxed environment to execute a smart contract. The test copy may include copies of some and/or all blocks appended to the blockchain to date and may further include all and/or some current states of other smart contracts on the blockchain. If the smart contract relates to bridging activities the wallet may further launch test copies of other blockchains to which assets may be transferred during execution of the smart contract. Through this the wallet may provide a test environment for examining results from executing the smart contract. A wallet provider and/or some other third party entity may provide snapshots of the blockchain and other blockchains that may be downloaded to speed up the process of launching the test copy and/or test copies. Within the test environment the wallet may be able to run test executions of transactions, emulating actions from other addresses or smart contracts without possessing private keys to said addresses or smart contracts. The wallet may use test techniques such as fuzz testing, Monte Carlo simulations, and/or a machine learning algorithm to spot check possible outcomes from interacting with the smart contract and/or submitting a proposed transaction. Through these means the wallet may discover potentially undesirable outcomes and may inform the user accordingly.

In certain embodiments, a test environment may be provided by the wallet provider and/or some other third party entity on a separate server, for example a cloud server, and the wallet may interact with the test environment through an application programming interface (API), thus reducing the computational and/or bandwidth loads on the wallet and increasing the speed with which the wallet may obtain test execution results. The wallet provider and/or third party entity may also compile a database over time that includes records of known risky smart contracts which may be examined during testing for possible malicious interactions during execution of the smart contract.

NFT platforms in accordance with many embodiments can interpret and/or compile a smart contract in real-time, as it is to be used. This can result in machine-dependent machine code segments together comprising an executable element. NFT platforms in accordance with many embodiments can score smart contracts at the level of the programmer-readable code; the entire executable element; and/or the segments corresponding to machine instructions and sequences thereof. In several embodiments, an entity may create a repository of hashes or other content descriptors, along with associated scores, where the repository may contain score for programmer-readable code, segments of programmer-readable code, executable elements, and segments of machine code instructions, as described. Each can be associated with a security score and optionally a reference to a record that includes a list of common use contexts; a list of endorsing entities associated with the smart contract; and/or a list of abusive entities associated with it.

If a given code structure of one of the above four types is identified as having a vulnerability, a reference can be included to a corrected version that does not have the vulnerability, thereby enabling on-the-fly substitution of vulnerable smart contracts with executable elements that have the same benevolent functionality but which are believed not to have the vulnerability. Such mappings can be certified to be correct, e.g., by a trusted entity such as a security service provider. Here, "correct" can be used to mean that the new code is a desirable substitute of the old code, but without the vulnerability. By desirable substitute, there may be new features added that are understood to be desirable, are required by law enforcement in a given jurisdiction, and/or are requested by the owner of the token with the smart contract under consideration. The certification can be expressed as one or more digital signatures, and/or can be managed by the security service acting as an online verifier.

NFT platforms in accordance with many embodiments can utilize a multiplicity of trusted authorities, preferably independent from each other, in order to certify one update in order for this update to be accepted. This can reduce a risk and impact of a trusted authority being hacked, which could otherwise cause propagation of malicious code. An update may correspond to an identifier of some smart contract code (whether machine language or not; whether a complete smart contract or merely a part thereof) and its replacement. Thus the identifier, which may be the code or a hash of the code, and the associated replacement code can make up pairs. Such pairs may be digitally signed or otherwise authenticated, and stored, along with the authentication information and timestamps for the creation of the pairs, in a database accessible to nodes that execute smart contracts. In several embodiments of the NFT platforms, these authenticated pairs may also be associated with expiration dates. They may also be associated with a list of references to other such authenticated pairs which are made redundant by the distribution of the new authenticated pair. NFT platforms in accordance with many embodiments can flush redundant authenticated pairs from the database. The substitute smart contract component may include a reference to a third party that can evaluate at least a portion of the smart contract, e.g., for security purposes. This third party may be an entity that a user of the wallet accessing the token has a relationship with. It may be a distributed entity, such as a DAO or a consensus mechanism, e.g., one implementing watchfulness.

NFT platforms in accordance with many embodiments can include a smart contract that can include one or more policies indicating conditions for when a token may be transferred from one party to another, where these policies may depend on the parties involved and their configurations, said configurations being at least in part publicly logged or recorded. A smart contract may specify when a transfer is not legitimate, and a reversal needs to be initiated. These policies may also be expressed as meta-data, and may refer outside the token but references from the token, e.g., using traditional hyperlinks, IPFS file naming or other types of references. The policies may also indicate whether second-factor authentication (2FA) validation is needed for specified types of transactions, and may list conditions and security actions that may be taken when a condition is matched. Such conditions may be evaluated by a wallet executing a smart contract, by a marketplace determining whether to list a token, by a consensus mechanism assessing whether to record a transaction involving the token, and/or by other parties able to access blockchain data, among others.

A smart contract and/or other metadata may be used to signal a degree of requested and/or required replication of a token, using so-called tokenettes. This is disclosed in U.S. patent application Ser. No. 18/179,884 entitled "Systems and Methods for the Facilitation of Blockchains" by Jakobsson et al., which is herein incorporated by reference in its entirety. The processing of a token, e.g., allowing or denying access, allowing or denying a transfer, among others, may depend on the degree of duplication requested or required, and/or the actual determined degree of duplication observed, where a discrepancy may cause some transactions to be blocked, or where some transactions may only be permitted if there is a pre-specified degree of duplication, which could be a policy of a blockchain, a jurisdiction, a token, or a wallet of a user involved in the transaction.

NFT platforms in accordance with many embodiments can include one or more smart contracts that can be associated with a token have zero or more content elements that may be executable without decryption, and at least one element that may require at least some decryption to be executed. This may entail decrypting of instructions or data. The protection of contract data by means of encryption can limit what parties can execute the contract to parties that have access to decryption of the smart contract. In certain embodiments, references to code can be included in a token, where only parties with access privileges can obtain the executable code and/or its parameters from a resource that determines what parties may access what code, e.g., using access control lists (ACLs) and/or by determining whether the party is an owner to the token including or referencing the smart contract.

Figure 27:
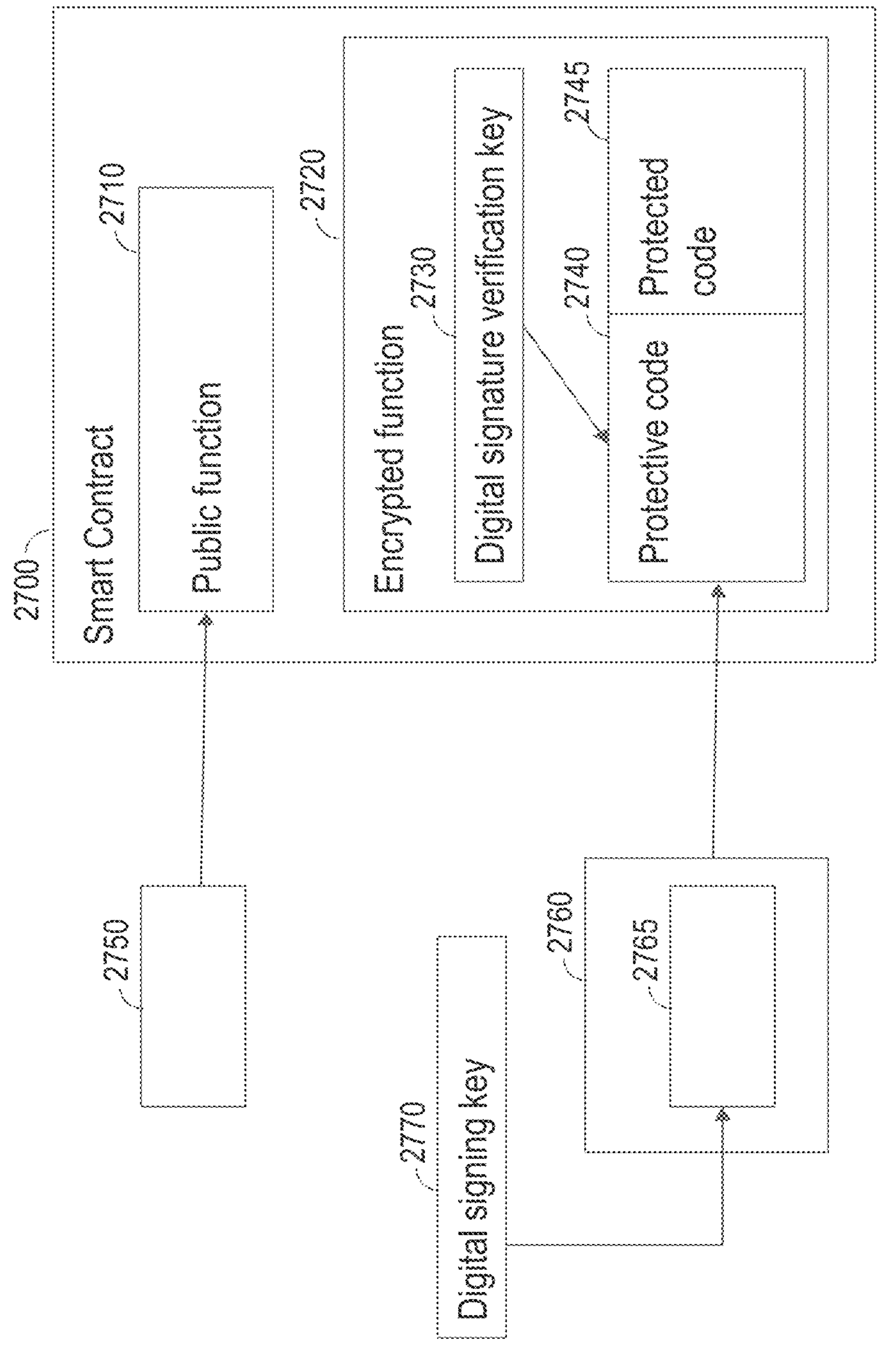
FIG. 27 illustrates a smart contract with an encrypted function that includes protected code in accordance with an embodiment of the invention.

A process for access smart contracts in accordance with an embodiment of the invention is illustrated in FIG. 27. A smart contract (2700) may include a public function (2710) and may include an encrypted function (2720).

The public function (2710) may be invoked through a first transaction (2750) made by any address, for example an externally owned address or another smart contract.

The encrypted function (2720) may include protected code (2745), protective code (2740) and a digital signature verification key (2730) for determining whether a second transaction (2760) should allow the protected code (2745) of the encrypted function (2720) to be invoked, based on content of the second transaction (2765), said content of the second transaction (2765) generated using an digital signing key (2770).

In several embodiments, the digital signing key (2770) may include a private key of an asymmetric key cryptography public/private key pair, and the digital signature verification key (2730) may include a public key of the asymmetric key cryptography public/private key pair. The content of the second transaction (2765) may include an encryption of a string including an address of a wallet submitting the second transaction (2760), a hash of a block header of a recent block on a blockchain, and a block height of the recent block, said encryption performed with the digital signing key (2770). The protective code (2740) may decrypt the content of the second transaction (2765) using the digital signature verification key (2730), retrieve the hash of the block header of the recent block from the blockchain identified by the block height decrypted from the content of the second transaction (2765), and check that the hash of the block header of the recent block decrypted from the content of the second transaction (2765) matches the hash of the block header of the recent block from the blockchain and that the address submitting the second transaction (2760) matches the address decrypted from the content of the second transaction (2765), and then only invoking the protected code (2745) if both matches return true. Through this a smart contract function may be instantiated such that the smart contract function may only be invoked by a specific set of wallets, namely those wallets that include the digital signing key (2770).

In certain embodiments, the encrypted function (2720) may include code allowing the digital signature verification key (2730) to be replaced with a new decryption key by one or more authorized addresses. This may be useful, for example, if the digital signing key (2770) is compromised.

In several embodiments, the encrypted function (2720) may include a plurality of decryption keys, for example stored in an array, and any one of the plurality of decryption keys may be used to verify the content of the second transaction (2765) before invoking the protected code (2745). The second transaction (2760) may further include a parameter indicating which of the plurality of decryption keys should be used by the protective code (2740) in a decryption of the content of the second transaction (2765), or in other embodiments the protective code (2740) may loop through all of the plurality of decryption keys, trying each in turn.

In several embodiments, the digital signature verification key (2730) may include a first public key of a first asymmetric key cryptography public/private key pair of a wallet, and the digital signing key (2770) may include a first private key of the first asymmetric key cryptography public/private key par, with the digital signature verification key (2730) derived from the first private key or from a common value used to produce both keys in the keypair. The wallet may include functionality that detects if a user of the wallet is submitting a transaction making a call to a digitally signed function (2720) of a smart contract (2700) when using a second public key of a second asymmetric key cryptography public/private key pair of the wallet, and may subsequently retrieve and use the digital signing key (2770) to produce the content of the second transaction (2765) for the transaction. Through this, accounts of a wallet, present and future, may be listed for the digitally signed function (2720) by listing just one digital signature verification key (2730) in the function (2720). In certain embodiments, the first asymmetric key cryptography public/private key pair may be the second asymmetric key cryptography public/private key pair.

In several embodiments, a wallet may provide a user with an option to specify a given public/private keypair of the wallet, commonly known as an "account", to be an allowlist account for the wallet. Although FIG. 27 illustrates a particular process of accessing a smart contract, any of a variety of processes can be utilized as appropriate to the requirements of specific applications in accordance with embodiments of the invention.

In several embodiments, a first party provides a first smart contract to a second party, where the second party provides configuration data to the first smart contract, resulting in a second smart contract. The first smart contract can be digitally signed by the first party and provide the digital signatures with the first contract. The second contract may include the potentially authenticated (e.g., using a digital signature) first smart contract and the configuration data. A third party may verify that the digital signature and/or other authentication of the first smart contract component of the second contract is valid, and only accept the second smart contract if so. The first party may provide smart contracts as a service (SCaaS) and these may be configured by second parties. The first party may create the first smart contract in a manner that assures a third party that the second smart contract is not malicious, e.g., by trusting that the first smart contract is not malicious based on the reputation of the first party (and/or an auditor that may also sign the first contract) and based on the first party creating the first smart contract in a manner that independently of the configuration data, the resulting second smart contract may remain non-malicious. The first party may be associated with a reputation score, and may charge for the use of the smart contracts it provides to other parties. In several embodiments, every time the second smart contract is evaluated, it executes a payment determination process that can determine, based on the type of evaluation, whether a payment is due to the first party. This corresponds to a pay-as-you-use model of smart contracts. The type, for example, may be whether the evaluation causes a transfer of funds or not. Royalties may be paid as a result of the use of smart contracts that initiate payments. Third party auditors, such as bounty hunters or entities that are part of a consensus mechanism, may also enforce the payment of royalties, whether to the first party (i.e., the creator of the first smart contract) or to a creator of content comprised in a token (such as an NFT) that is governed by a smart contract.

Figure 28:
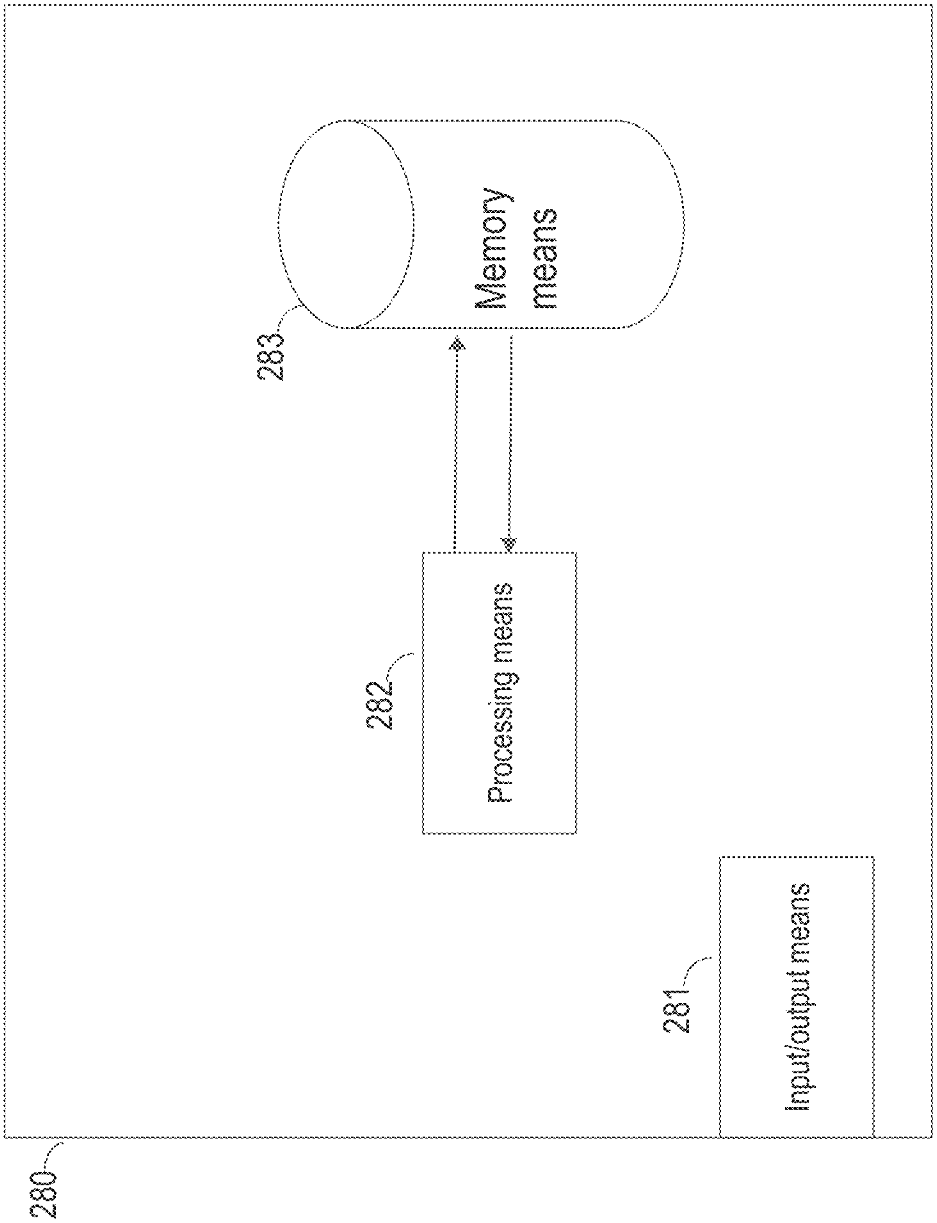
FIG. 28 illustrates a blockchain node configured for determining a risk associated with a token in accordance with an embodiment of the invention.

FIG. 28 illustrates a device 280 for scoring smart contracts in accordance with an embodiment of the invention. The device 280 can include input/output means 281 by means of which the device may receive information and transmit and/or provide information to other units, devices and/or entities. The device can include processing means 282 and memory means 283, the memory means 283 including instructions, which when executed by the processing means 282 causes the device to perform the methods described herein. Although FIG. 28 illustrates a particular device configuration for scoring smart contracts, any of a variety of device architectures can be utilized as appropriate to the requirements of specific applications in accordance with embodiments of the invention.

Detection of Malicious Code within Blockchain Smart Contracts

It is currently simple to hide malicious code in smart contracts on, for example, the Ethereum blockchain, and such malicious code may give an attacker the opportunity to steal large sums of digital assets with commercial value.

Currently, third-party providers such as OpenZeppelin provide open source code blocks or software libraries for smart contract developers to use in their software, and these code blocks have been verified and battle-tested for vulnerabilities. Nevertheless, it is not obvious even to experienced developers that a given code block or library has not been maliciously altered to subvert the trustworthiness of the smart contract utilizing it.

For example, adding as few as 20 characters to a line in the OpenZeppelin ownable.sol library may allow a malicious developer to gain full control of a smart contract.

Third-party services such as Etherscan.io allow developers to publish the source code of their contracts and verify that the source code is indeed what was used to compile and deploy a smart contract in order to provide other developers and auditors with the opportunity to inspect and verify the trustworthiness of the smart contract, and users are becoming aware that interaction with smart contracts that do not have their source code published and verified is inadvisable.

Nevertheless, although source code may be available, developers may use obfuscation in order to hide malicious content.

Description.

The present disclosure describes a system and method for reducing or eliminating risk associated with, for example, malicious code inserted in open source software used on a blockchain. It also applies to contexts where tokens reference code that is not publicly available, may be modified, or may be in part obfuscated.

The system comprises components, which may be implemented separately in some embodiments, and collectively in others.

A first component may comprise a database of open source code previously published, that developers may copy and paste into their own code, or import from separate files. Developers may obtain the source code from the database, or from another source.

A second component may comprise scanning software which may scan a blockchain for existing or newly deployed smart contracts. In other embodiments, developers may submit their source code to the second component, or may submit pointers to their deployment on the blockchain to the second component. The second component may repeatedly scan the blockchain per block submitted, regularly per passing of a predetermined time period, or some other periodic time span. The second component may during each scan examine some or all of the blockchain, matching new code, submitted with entries in the first component database.

The results of scans conducted by the second component may be stored in or used to update records in a third component, which may comprise a second database in which records corresponding to deployed contracts on the blockchain are maintained, along with further data relating to each deployed contract. The further data may comprise a status as to whether or not the deployed contract has published source code and additionally may comprise a pointer to the published source code, a status as to whether or not the source code compiles to the deployed contract and therefore accurately corresponds to the deployed contract or alternatively a measure as to how closely the source code corresponds to the deployed contract, a list of claimed libraries included in the deployed contract together with a confirmation or refutation of the presence of the claimed libraries in unaltered form, a record as to the absence or presence of code from a list of previously audited software fragments known to be safe or malicious, as determined by auditors, code reviewers, user feedback, or some other method of establishing the reliability of a given block or line of code.

Data stored by the third component may then regularly be assessed by a fourth component to obtain a measure as to the safety or risk involved in interacting with or storing or transferring assets to each detected smart contract. In some embodiments, the measure may comprise categorizing a given smart contract as undetermined, unexamined, malicious, unsafe, probably safe, definitely safe. In other embodiments, each contract may be given one or more numerical scores in order to categorize the smart contract. For example, a smart contract may be given a score out of 100, where 0 means "definitely malicious", and 100 means "certainly safe".

A fifth component may comprise a software module within a blockchain wallet, which may be activated when a user initiates an action, either from the wallet or from a web3 website connected to the wallet, or some other interface between the user and the wallet, in which the user initiated action interacts with a smart contract or generates a transaction to a smart contract. In an embodiment, the action may be paused while the fifth component submits a query to the fourth component in order to determine the reliability of the smart contract that the user wishes to interact with, with the fourth component returning a categorization result for the smart contract. The fifth component may then interpret the categorization result, and undertake an appropriate further action. For example, the appropriate activity may comprise determining that the risk level of the smart contract is above a given threshold, and the fifth component may subsequently block the user initiated action and may alert the user to the risk. In another case, the fifth component may determine that the risk level of the smart contract is below a given threshold and may allow the user initiated action silently. In a further case, the fifth component may determine that the risk level of the smart contract is high, and may offer advice to the user, for example, that the user should reconsider their transaction, but may allow the user to ignore the advice provided by the fifth component. In addition, the components may report the results of their analysis to a log or remote system designed to aggregate potential risks for the benefit of others.

The present disclosure may be extended to cover code that, although not malicious, violates financial regulatory requirements. For example, in some embodiments the fourth component may instead or also determine a measure of compliance with financial regulatory requirements of a given smart contract, identifying a mix network that is used to obfuscate an origin and destination of digital assets as not complying with the financial regulatory requirements, and subsequently the fifth component may retrieve this classification for the smart contract and may prevent the user from submitting transactions to the smart contract. Tor is one such mix network. There are both synchronous and asynchronous mix networks, and either can be used in this context.

The present disclosure may be extended to cover code that, although not malicious, violates intellectual property legislations such as copyright law. For example, in some embodiments the fourth component may instead or also determine a measure of compliance with current intellectual property law of a given smart contract, classifying a non-fungible token contract that instantiates tokens pointing to digital assets that are in violation of copyright law, and subsequently the fifth component may retrieve this classification for the smart contract and may prevent the user from submitting transactions to the smart contract to purchase or sell the non-fungible token.

One aspect of the disclosed technology is a determination of any executable element or data element associated with a smart contract, wherein the executable element or data element comprises or corresponds to a transaction in which ownership of a token is changed. Such determined elements are compared to a blocklist comprising known addresses associated with prior abuse, and if there is such a match, then the element is flagged as being high risk. Alternatively, a risk score associated with the entry in the blocklist is determined. The risk score may also be affected by the quantity or type of resource to be transferred by the execution of the transaction associated with the determined element. However, not all transfers of ownership are undesirable. For example, a smart contract may comprise an element that causes a royalty payment when the associated token is transferred from one party to another. This payment can be distinguished from an undesirable transfer, for example, by being associated with the token at the time it was first minted, as opposed to being associated with it at a later time. It can also be distinguished from an unwanted transfer of funds by being associated with the creator of the token as opposed to being associated with it by another party. Different heuristics determining risk can be associated with elements identifying transactions of tokens, whether fungible or non-fungible, where such heuristics may be expressed in terms of policies. These policies associate risk with elements such as those described above.

In one embodiment, machine learning is used to compute such a risk score. A probabilistic classifier or regression model, for instance implemented in a neural network, is trained to take as inputs a vector of features which encode properties such as those enumerated above, as binary or real-valued terms, and to output a risk score which may be interpreted as a probability of risk or a risk value on some numerical scale. Such a model can be trained using data collected from the wild, on contracts known to be risky or not; using contracts or code written in part by researchers; or other synthetic data assembled by researchers, for instance including examples comprised of manually- or algorithmically-constructed hypothetical feature vectors with labels.

Similar to how smart contracts are scored or assessed based on instructions associated with transfer of tokens, including tokens representing funds, smart contracts are also scored by the disclosed technology with respect to the presence of instructions associated with other actions indicative of malice. For example, a smart contract may comprise instructions that initiate the execution of externally stored instructions that are not certified by a trusted party or stored in a location known to be trusted. The existence of a reference to such instructions is indicative of risk. In some instances, the instructions may be available to evaluate the software assessing risk, in which case the remotely stored instructions are also assessed and scored. In instances where the remotely stored instructions are not made available for evaluation, this very fact is indicative of risk, and a score updated to account for that.

In one embodiment, a collection of scores are generated and combined to generate a combined score. The combination of scores may, in this way, combine signals related to several indicators of risk, where some combinations may be of greater concern than others as they are more indicative of risk. In one embodiment, machine learning techniques are used for the generation of the individual scores and/or the generation of the combined score from the individual scores, where the machine learning model used is trained on known examples of malicious contracts, where some may have been seen in the wild (i.e., have been deployed by actual malicious actors) whereas other examples may derive from contracts written or modified by security researchers or from feature vectors algorithmically or manually constructed by researchers, e.g., for the purpose of training the machine learning. An algorithm such as logistic regression or a more complex neural network may be used to output the combined score, which may be interpreted as an overall probability that a piece of code is malicious, or it may be a probability distribution over risk categories, or it may be score within some range (e.g., between 0 and 100). Artificial intelligence (AI) techniques can be used in addition to or instead of machine learning (ML) techniques.

The generation of a combined score from individual scores may also take as input risk indicators, such as binary signals indicating the presence or absence of a given signal. One example signal is whether a contract comprises a transfer of funds to a party that is not the same as the current owner of the token. A second example signal is whether externally stored instructions are referenced. A third example signal is whether externally stored instructions are part of an approved library of instructions or are custom. A fourth example signal is whether any instructions are associated with known obfuscation techniques, such as methods to make recognition of executable elements more difficult. One example of an obfuscation technique is to add a value 5 to a counter and then subtract a value 4 to the same counter, which has the same functionality as increasing the counter (which is commonly done for loop control). This is because in another instance, another obfuscated copy may first subtract 88 and then add 89 to the counter, which corresponds functionally to both adding 5 and subtracting 4, and to the traditional increment of 1 of the counter; however, these three example code segments have different appearance, which is sometimes used by malicious code authors to evade detection. Thus, the detection of such obfuscation is a signal of risk. Another type of obfuscation is the use of self-modifying code. One example of self-modifying code is wherein at least some instructions are stored, in the contract, in an encrypted or otherwise obfuscated format and then modified prior to execution; another example is where the code causes changes of itself in the stored format, e.g., causing the contract to be replaced by a modified contract, which may take place in an automated manner in response to a transfer of ownership. A further example of self-modifying code comprises the smart contract or code comprising an interpreter, with editable data within the code comprising instructions for the interpreter. Through this, a malicious entity may deploy an immutable smart contract that nevertheless may execute arbitrary instructions that may be altered at a later date.

In one embodiment, the generation of a combined score may also take as input other representations of risk indicators. For instance, a machine learning algorithm such as a transformer or autoencoder may be applied to a portion of code in order to transform it into another representation, which may explicitly or implicitly model aspects of variation within such code portions such that assessing their risk becomes more accurate or efficient.

In one embodiment, a risk scoring unit, which may comprise the above-described risk scoring techniques or other techniques disclosed herein, generates a risk assessment based on comparing a contract to one or more signatures. A signature comprises a description of code known to be associated with risk. The signature may be generated by an external entity, such as a company assessing contracts. It may also be produced by one of the risk scoring units disclosed herein, and may relate to a previously discovered risk associated with a contract assessed in the past. Such signatures may be stored in a contract security unit that may be part of a wallet, and used to assess contracts that are evaluated in the future. Signatures may be generated by other wallets, e.g., trusted wallets or by digital rights management (DRM) units associated with wallets of other users. A trusted wallet may be a wallet that is linked to a wallet performing an evaluation of a contract for a given user, where two wallets may be linked by two users who trust each other. These two users may be colleagues, family members, friends, or may belong to an organization that exchanges signatures, and where this organization may assess the quality of signatures, e.g., by assessing the input from which the signatures were generated and determine whether the signature was correctly generated from this input.

The signatures may describe instructions or functional blocks, or a combination thereof. An example instruction is one in which a value is increased by one. An example functional block comprises a series of instructions that perform a common task, such as determining whether a digital signature is valid. A functional block may be described at various levels of abstraction. For example, it may be described as a loop that causes updates to a collection of identified registers. It may be characterized as a series of instructions that causes communication with a website. It may be characterized as a script that changes a state, such as an ownership state of a token, an access control variable, or a digital rights management setting. A software unit, or portions thereof, may be characterized in terms of multiple characterizations, where the combination of the characterizations may be used as input to a unit that generates a score that indicates a risk of malicious contract instructions. Thus, this extends traditional signature-based approaches and behavioral approaches as used for malware detection, and applies the new approach to the more complicated scenario of detection of malicious contracts, or contract elements. One reason contracts pose more complicated problems than detection of traditional malware is that users may have strong wishes to evaluate contracts they did not originate, e.g., to perform an ownership change of a token in a manner that appears desirable to the user. In contrast, traditional anti-virus is strengthened by measures to simply not allow arbitrary installations, e.g., in the context of mobile device management (MDM) technologies used by enterprises to secure devices used by employees. There are many other differences between malicious contracts and malicious software ("malware"), as will be understood by skilled artisans. Malicious software typically takes over the processing of the computer on which it executes, for example, whereas a malicious contract may simply be a contract that performs an undesirable transfer but without taking over processing control in the sense that malware does.

In one embodiment, contracts are assessed from a risk perspective by a unit, e.g., associated with a wallet, prior to allowing a token associated with the assessed contract to be accessed by a user of the wallet using a user interface of the wallet. If a token with a malicious contract, or a contract with a risk score exceeding a threshold, has been transferred to a wallet, e.g., by binding it to a public key associated with the wallet, then the token can be hidden from the user, e.g., by placing a reference to it on a blocklist stored in or associated with the wallet. As the wallet is engaged, e.g., by an app being opened, the blocklist may be read and a determination made of what tokens to allow the user to view data related to. Such data may be icons indicating the availability of the token, or content that is rendered or used in response to a user action. A token with a malicious contract, or a contract with a risk score exceeding a threshold, which may be referred to as a dangerous token, may also be permanently destroyed, e.g., by transferring ownership of it to an address from which content is not (or cannot be) transferred out. A dangerous token may also be flagged in a manner that causes it to only be accessible to users with the required access rights, such as a system admin. Dangerous tokens can be made accessible to such selected users only after such selected users have acknowledged the risk, e.g., in a user interface prompting the selected user, and potentially only with specified applications or in secure environments, such as wallet sandboxes. A wallet sandbox is a computational environment that enables the blocking or reversal of actions, e.g., by reverting to a previous system stage and blocking communication.

In some embodiments, interface elements are presented to the user in order to make more obvious the characteristics of contracts and their elements. In one such embodiment, a risk scoring unit "dashboard" displays various components of the contract, depicting the risk associated with each element and the contract as a whole. In some embodiments, textual descriptions of each individual component risk are provided. In some embodiments, icons or images depict code segments that are deemed safe, low danger, high danger, etc. For example, meter-like indicators of safety are displayed, with color coding such as green for safe code segments, red for high risk code segments, yellow for moderate risk, etc. In some embodiments, auditory displays can be used to indicate risks of individual components and/or the contract as a whole.

In one embodiment, text, icons, or other means are used to indicate potential issues with copyright, financial regulations, age-related restrictions (so called "age gate" restrictions for end users under 18, 13, or other ages), geographical restrictions, etc.

One embodiment, a token is protected against abuse using a conjunctive ownership structure, as disclosed in U.S. Prov. Patent App. No. 63/365,269 titled "Directed Acyclic Token Structure" by Markus Jakobsson, which is herein incorporated by reference in its entirety. The process P controlling the transfer of ownership rights for a token may be associated with or receive input from a script detecting risk, as disclosed herein, and may block ownership transfers when a risk is detected.

In one embodiment, a first security analysis is performed of a smart contract, and based on the result of the first security analysis, a security action is performed. Example security actions comprise blocking the execution of the smart contract, e.g., stopping it from being performed; generating a notification to a user, e.g., of a wallet associated with the digital asset comprising the smart contract; requesting from said user whether the contract should be allowed to be executed; and performing a second security analysis. The second security analysis may require an external entity to evaluate the smart contract; it may involve executing the smart contract in a sandbox and determine whether there are adverse effects associated with the execution, or it may involve comparisons of components of the smart contract with previously blocked smart contracts, a repository of which may be stored by an external entity and made available for analysis. An example adverse effect is a transfer of funds to a party different from the seller of the token and the creator of the content of the token. Another example of an adverse effect is a transfer of funds that is anomalous in size, e.g., based on a comparison with estimated market values of the asset. Yet another example of an adverse effect is the engagement of a subscription when the user of the wallet performing the evaluation has indicated not wanting to pay subscriptions, e.g., as part of a configuration step, or who has not permitted previous subscription requests. An example subscription is a service contract for the provision of information, or for the engagement of a bounty hunter acting on behalf of the user of the wallet.

Figure 29:
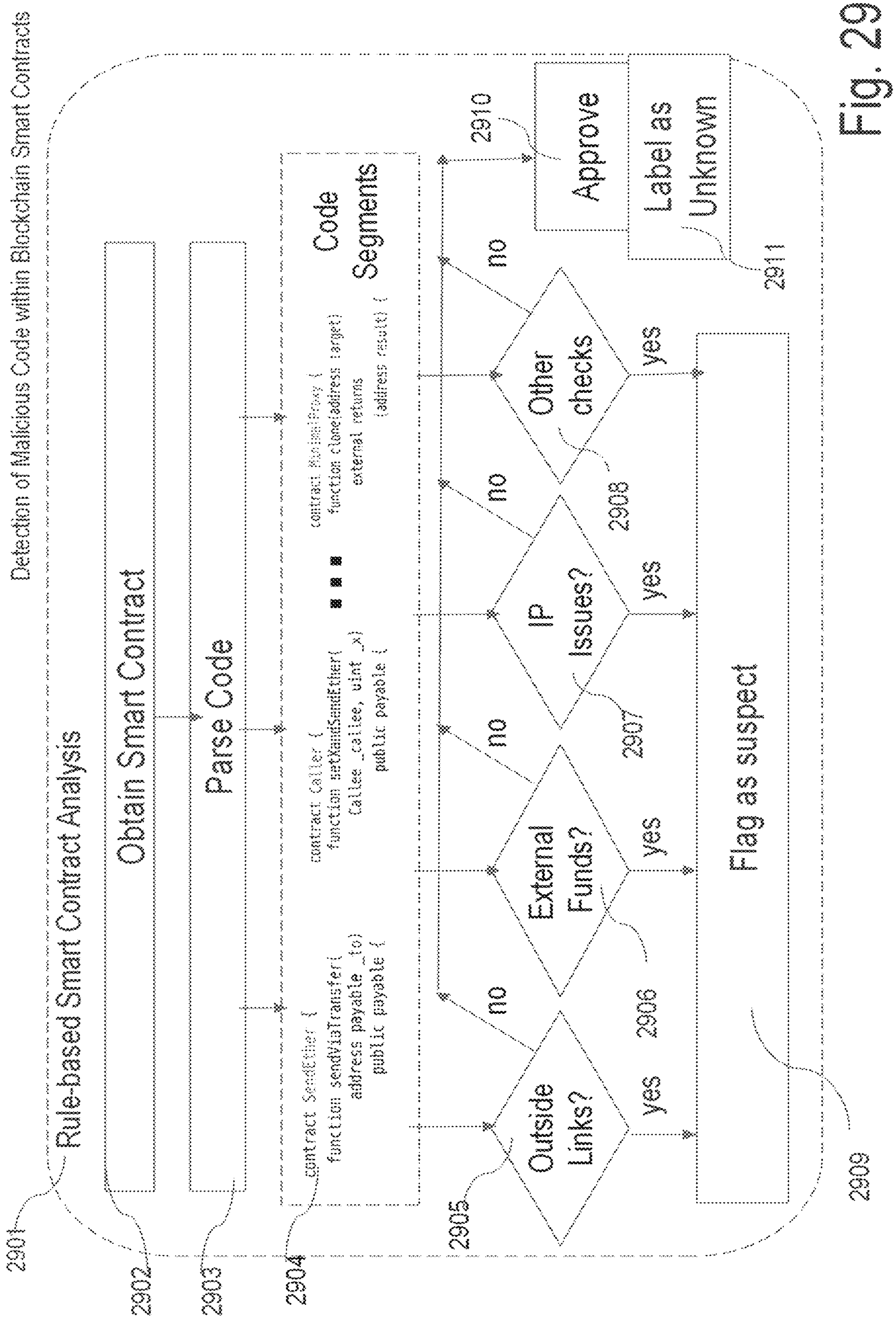
FIG. 29 illustrates a system and method for rule-based analysis of smart contracts in accordance with an embodiment of the invention.

FIG. 29 Illustrates a system and method for rule-based analysis of smart contracts 2901. In this embodiment, a smart contract is obtained 2902 and parsed 2903 into individual code segments 2904. Various rules are applied to each code segment, including checks for outside references 2905, external funds transfers 2906, various intellectual property considerations 2907, and other potentially insecure activities 2908. Note that parsing and checking could also flag code segments which may have been intentionally obfuscated.

Based on the code checking, segments can either be flagged as suspect 2909, approved 2910, or labeled as unknown 2911, for further analysis.

Figure 30:
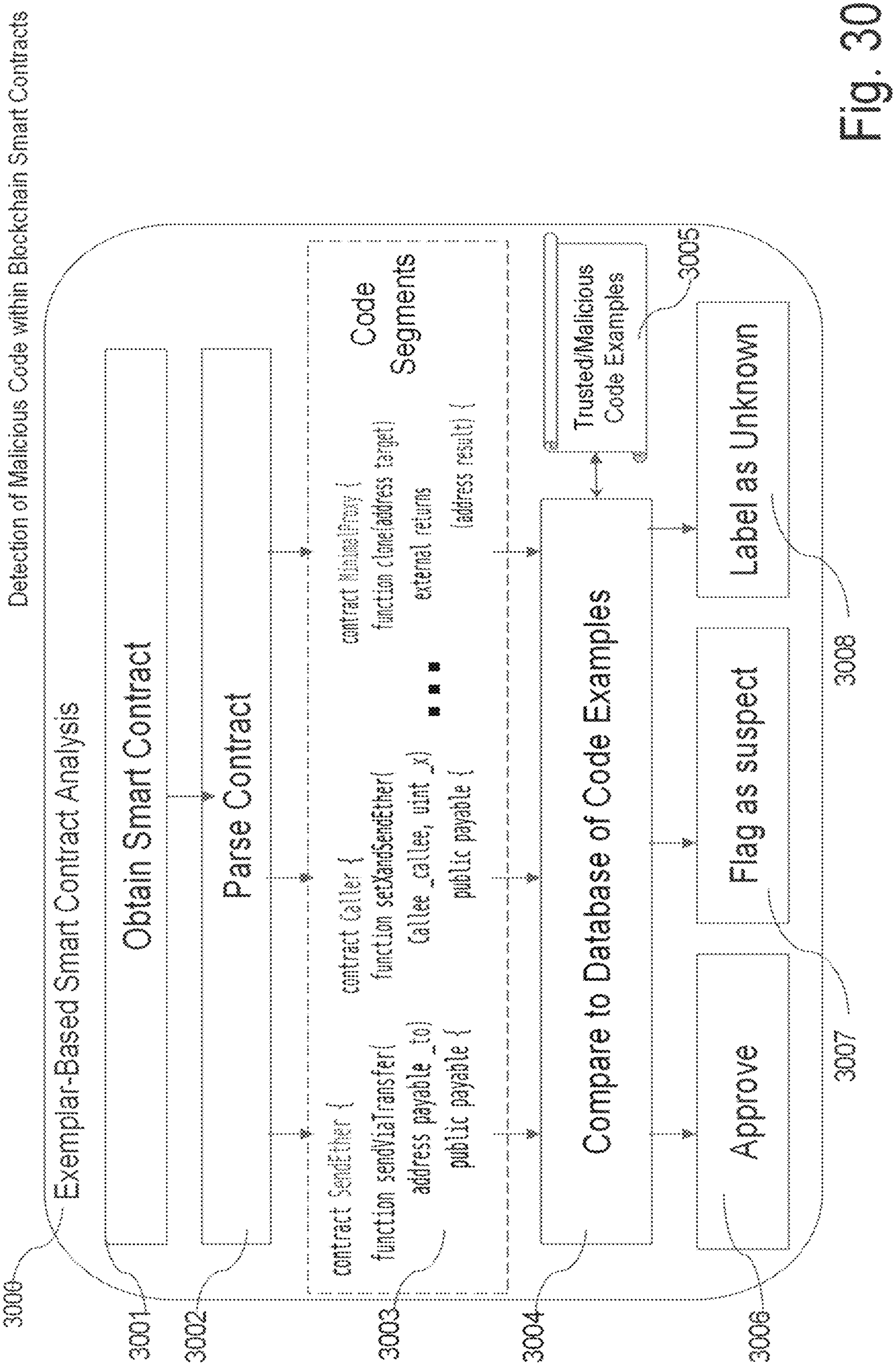
FIG. 30 illustrates a system and method for exemplar-based analysis of smart contracts in accordance with an embodiment of the invention.

FIG. 30 Illustrates a system and method for exemplar-based analysis of smart contracts 3001. In this embodiment, a smart contract is obtained 3001 and parsed 3002 into individual code segments 3003. Each code segment is compared 3004 to a database of trusted and malicious code examples 3005. Note that parsing and checking could also flag code segments which may have been intentionally obfuscated. Based on matches with trusted/malicious code exemplars, segments can either be approved 3006, flagged as suspect 3007, or labeled as unknown 3008, for further analysis.

Figure 31:
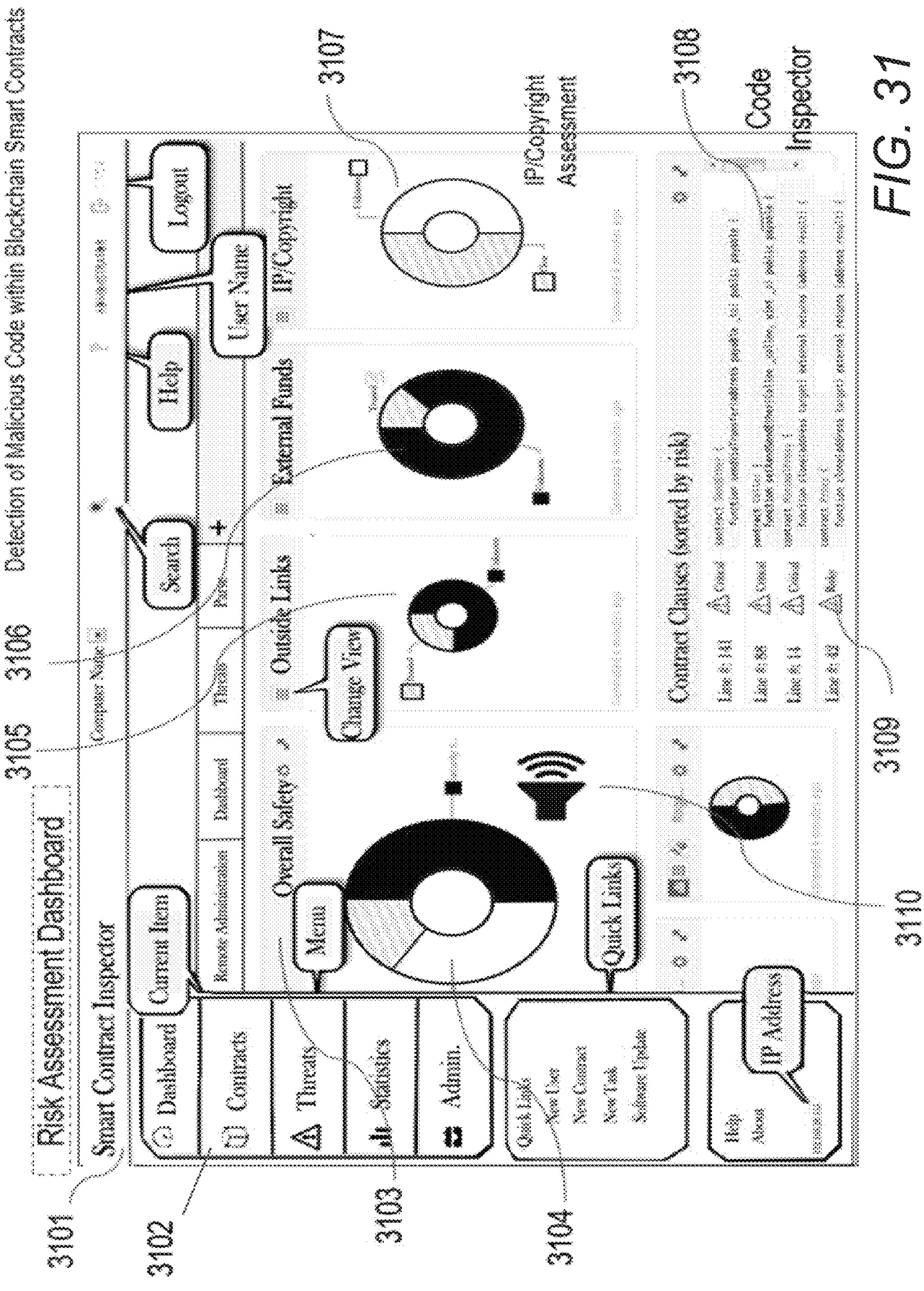
FIG. 31 illustrates a Smart Contract Inspector Interface, sometimes referred to as a "Dashboard in accordance with an embodiment of the invention.

FIG. 31 Illustrates a Smart Contract Inspector Interface 3101, sometimes referred to as a "Dashboard". A Smart contract can be loaded 3102 and analyzed by the system. Based on various analyses such as those previously described, an overall threat assessment is displayed 3101. Graphical means 3104 such as pie charts, bar charts, or other, with color coding, can be used to display how much of the contract is trusted, risky, or unknown. Examples of potential threats include links to unknown outside contracts or other resources 3105, external funds transfers 3106, IP/Copyright issues 3107, or other. A list of individual contract code segments 3108 can be displayed, with the risk associated with each described. Threat, safety, unknown status of code segments and the contract as a whole, along with other status components such as progress and completion can be indicated by icons 3109 or other means such as auditory display 3110.

Figure 32:
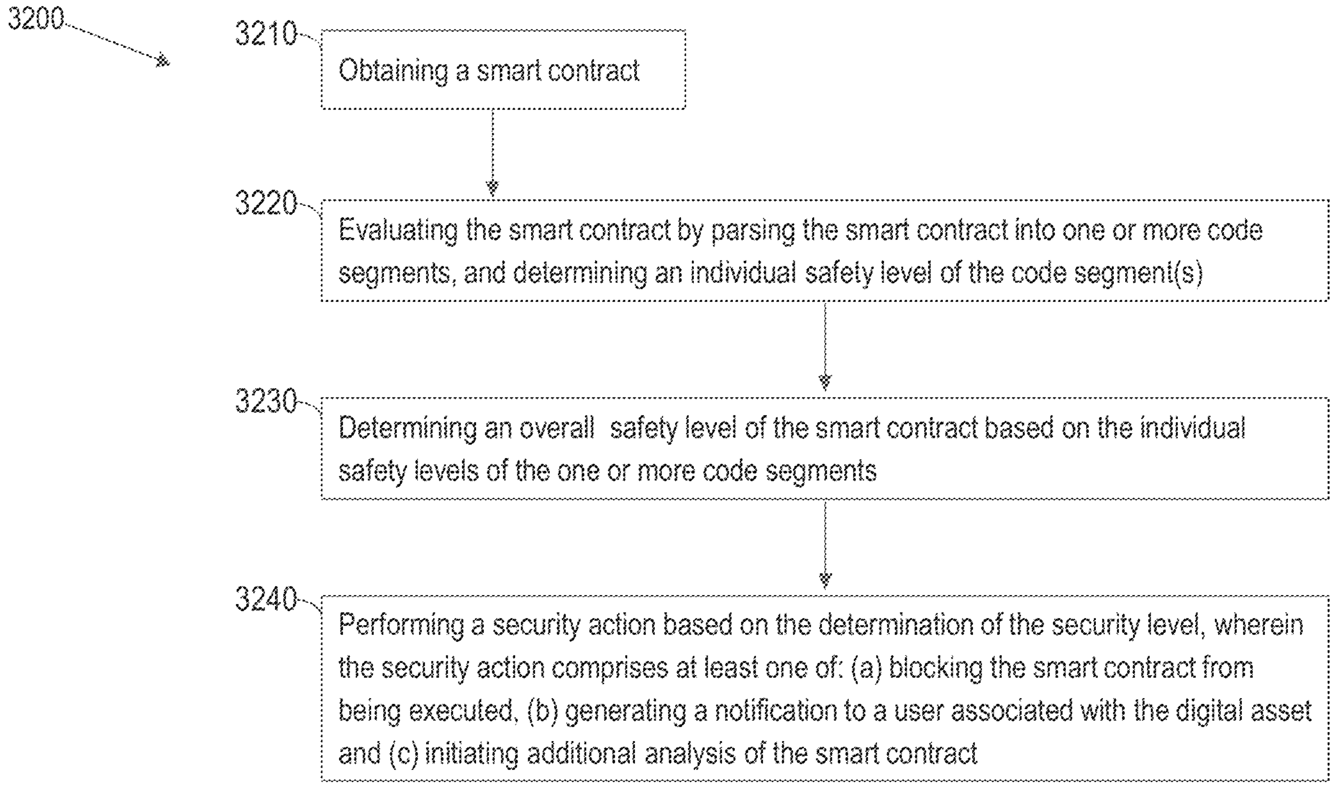
FIG. 32 illustrates a flowchart of an exemplifying embodiment of a method for safeguarding against abuse with regard to a smart contract associated with a digital asset in accordance with an embodiment of the invention.

FIG. 32 is a flowchart of an exemplifying embodiment of a method for safeguarding against abuse with regard to a smart contract associated with a digital asset. FIG. 32 illustrates the method comprising a first step 3210 of obtaining a smart contract. There are various ways for the method to obtain the smart contract, e.g., it may be received from a third party, it may be retrieved from a database, it may embedded within, or pointed to by, a received signal or message comprising for example information pertaining to a digital asset. FIG. 32 also illustrates the method comprising a step 3220 of evaluating the smart contract by parsing the smart contract into one or more code segments, and determining an individual safety level of the code segment(s). This has been described and exemplified above, e.g., be querying a database comprising records of code segments of smart contracts that have previously been evaluated with regard to malicious content. Further, the method is illustrated comprising the step 3230 of determining an overall safety level of the smart contract based on the individual safety levels of the one or more code segments. The overall safety level depends of individual code segments, hence a code segment with low safety level will affect the overall safety level negatively. FIG. 32 also further illustrates the method comprising the step 3240 of performing a security action based on the determination of the security level, wherein the security action comprises at least one of: (a) blocking the smart contract from being executed, (b) generating a notification to a user associated with the digital asset, and (c) initiating additional analysis of the smart contract. Depending on the outcome of the determination of the overall safety level of the smart contract, the method may take different actions. Merely as illustrative examples, in case of the overall safety level is determined below a predetermined safety level, e.g., by being below a predetermined threshold, the method may block or halt the smart contract from being executed. Alternatively, or additionally if the overall safety level is determined below a predetermined safety level, e.g., by being below a predetermined threshold, the method may generate a notification to a user associated with the digital asset. Still an option or example of a security action is to initiate additional analysis of the smart contract.

Figure 33:
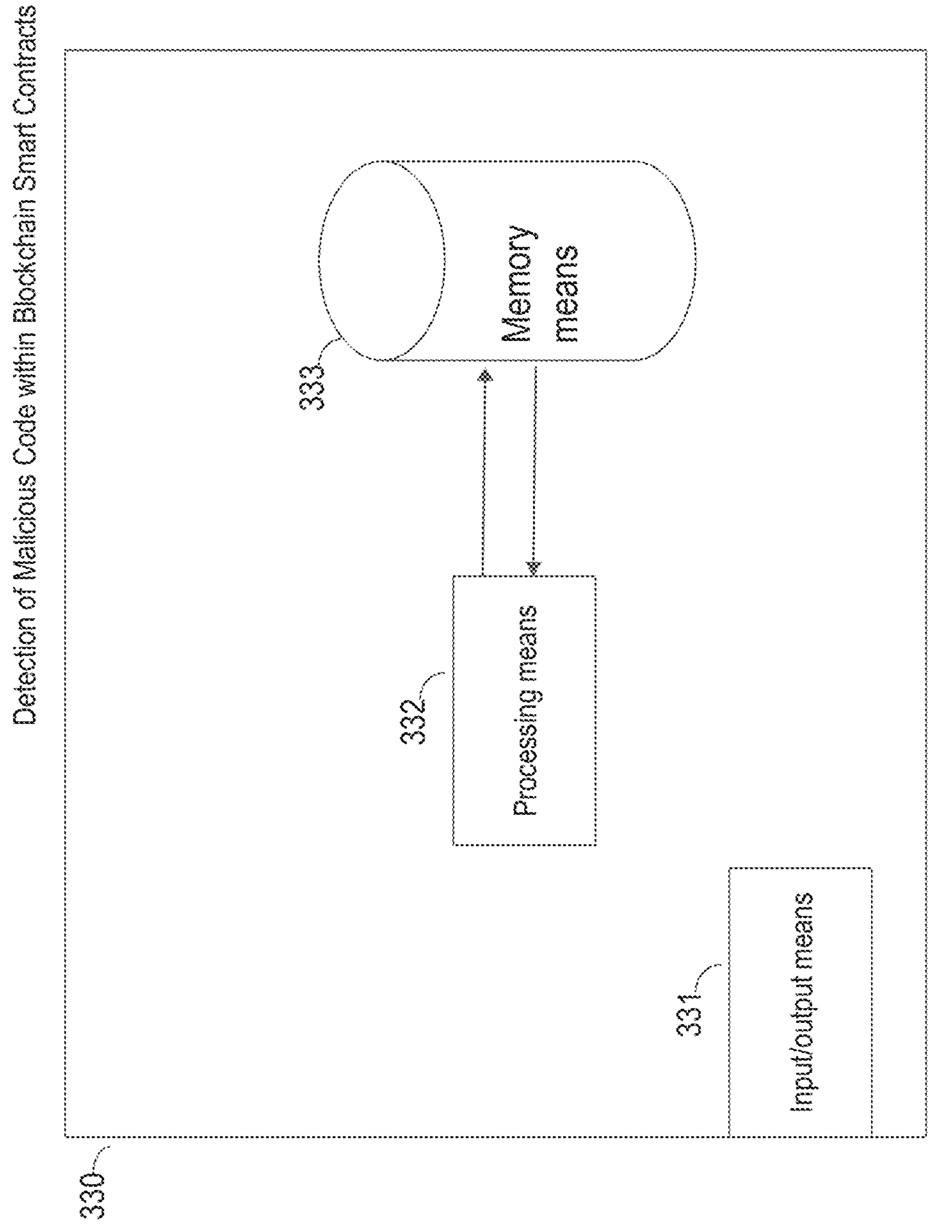
FIG. 33 illustrates a device for safeguarding against abuse with regard to a smart contract associated with a digital asset in accordance with an embodiment of the invention.

FIG. 33 is an illustration of a device 330 for safeguarding against abuse with regard to a smart contract associated with a digital asset. The device 330 is illustrated comprising input/output means 331 by means of which the device 330 may receive information and transmit or provide information to other units, devices and/or entities. FIG. 33 also illustrates the device 330 comprising processing means 332 and memory means 333, the memory means 333 comprising instructions, which when executed by the processing means 332 causes the device 330 to perform the method described herein.

Tokens with Transfer Limitations

Currently, electronic tickets are stored and tracked in a centralized database managed by a ticketing company. As such, the ticket is owned by the ticketing company, and not the ticket purchaser. Such companies often have restrictions on the resale or transfer of tickets, primarily to avoid "scalping", in which intermediaries buy tickets and then sell them for a significant profit, which may be detrimental to genuine event fans, event organizers, performers, athletes, and ticketing companies. However, using traditional technology, such restrictions are not practically enforceable, and as a result, abuse is widespread.

A ticket may be represented through the use of a non-fungible token on a blockchain, for example, through the use of an ERC721 or ERC1155 token standard smart contract. However, these standards suffer from the same problem that paper tickets do, namely that the tokens may be repeatedly transferred, again opening the scope for scalpers to profit as intermediaries in token resales, thereby extracting value from the token ecosystem.

There therefore exists a need for the improvement of non-fungible and fungible token system designs to prevent intermediaries from extracting profit from, for example, ticketing systems, at the expense of genuine participants.

In the present disclosure, methods and systems are presented for improved blockchain-based fungible and non-fungible tokens through an implementation of transfer limitations to restrict the actions of intermediaries. The disclosure has applications to electronic ticketing systems for events, movies, concerts, attractions and museums, amusement parks, parking, camping and accommodation, and many others. The disclosed technology can also be used in contexts that are not primarily about physical access control; for example, it can be applied to coupons, discounts, memberships, subscriptions, gifts and donations, and others. It can further be used to assign rights of processes within executional environments, e.g., for limited inheritance of functional properties. The latter is particularly relevant in contexts where the owner of a token is not a wallet, but a process, as disclosed in U.S. patent application Ser. No. 17/810,741 entitled "Systems and Method for Providing Security Against Deception and Abuse in Distributed and Tokenized Environments" by Jakobsson et al., which is incorporated by reference herein in its entirety, where process P is external to the transacting entities or is comprised of digital rights management (DRM) modules associated with the transacting parties.

In one embodiment of the present disclosure, a smart contract of a token may have a limitation imposed on how many times a token instantiated by the token contract may be transferred. For example, a non-fungible token (NFT) may be limited to one transfer after minting. Thus a ticketing agency may mint an NFT for an event to a customer, and the customer may transfer the token one time only to a further customer. Subsequently the token may no longer be transferred. Through this, scalping is prevented; a scalper buying the token from the customer would not be able to transfer it on to the further customer.

In an alternate embodiment of the present disclosure, the transfer limitation may comprise a predetermined number of transfers greater than one. For example, the NFT may be limited to two, three, or a higher fixed number of transfers after minting. In an enhancement to the alternate embodiment, a customer may be presented with an option to purchase a specified number of transfers. For example, an NFT that may not be transferred may cost 1 ether, and each transfer may cost a further 1 eth, thus a token that may be transferred five times may cost a total of 6 ether in the present example, provided for illustrative purposes and not meant to be limiting.

In one embodiment, the transfer limitation is associated with a time period that is indicated by one beginning event (which may be the minting or first sale of the token), and one ending event (such as a time, a date, an occurrence of a publicly detectable event, the announcement made by an oracle, etc.); outside such beginning and ending events, a second set of transfer limitations can be applied to the token. The second set of transfer limitations may be no limitations at all. Similarly, within a time period indicated by a beginning event and an ending event, other properties can be enforced or applied; an example of such properties include an ability to spawn, peel or evolve the token. Spawning, peeling and evolution is disclosed in U.S. patent application Ser. No. 17/929,894 entitled "Methods for Evolution of Tokenized Artwork, Content Evolution Techniques, Non-Fungible Token Peeling, User-Specific Evolution Spawning and Peeling, and Graphical User Interface for Complex Token Development and Simulation" by Jakobbson et al., which is herein incorporated by reference in its entirety. The time period associated with such properties may be the same as the time period of the transfer limitation; the two time periods may be overlapping; or they may be distinct and non-overlapping. In one example use scenario, a token is associated with a first property during a first time period and a second property during a second time period; for example, a token that acts as a physical access control (e.g., a concert ticket) in a first time period may have the property of being an evolvable collectible during a second period (e.g., during a time period that starts after the token has been used for the admission to the concert arena.) During the first time period, transfers may not be permitted. During the second time period, transfers may be permitted, with a royalty payment that is shared between an artist, an event organizer, and an original owner of the token (e.g., the concert-goer).

In a further enhancement to the alternate embodiment of the present disclosure, the smart contract may comprise a whitelist of, for example, blockchain addresses of authorized resellers. When an NFT is transferred to and/or from an address on the whitelist, such a transfer may not count towards the number of transfers allowed. For example: an NFT may have a transfer limitation of one transfer. However, if transferred to an address of an authorized marketplace contract, this may not count as a transfer, and similarly if transferred from the authorized marketplace to a buyer, this may also not count as a transfer. Thus an NFT minted to a first customer with only one transfer permitted, may nevertheless be transferred from the first customer to the authorized marketplace and onward to the buyer, with the buyer now owning the NFT with one valid transfer still remaining, despite the fact that the NFT has been transferred two times.

In a further enhancement of the present disclosure, the smart contract for the ticket token may be configured with a high royalty fee after the first resale, where the high royalty fee may be 50% of the sales amount. For example, if Alice buys a ticket NFT for a concert and is allowed one transfer, she may transfer or sell that token one time without the addition of an onerous royalty. A second resale of the token may trigger a large royalty, such as 50%, so as to both discourage scalpers from making a profit and for the ticket seller to enjoy additional profitability from the sale that would normally accrue to the scalper. In the white list example, this may be implemented with royalty rates that are dependent upon the whitelist participants.

In some embodiments, the token can be transferred a fixed number of times during a given time period. The number of times may depend on the terms of transfer. For example, a ticket can be blocked from being resold by a consumer, but allowed to be resold by certified ticket vendors. It may also be allowed to be transferred by a consumer as a gift, i.e., without a payment, to a related wallet, or by transferring access rights without transferring token ownership, e.g., by sharing decryption keys. In one illustrative but non-limiting example, any transfer to a dependent wallet is permitted, but no other transfers, after a limit on the number of allowable sales has been reached. Dependent wallets are disclosed U.S. patent application Ser. No. 18/155,662 entitled "Crypto Wallet Configuration Data Retrieval" by Jakobsson et al., which is herein incorporated by reference in its entirety.

In one embodiment, the token may be sold back to the original owner of the token, e.g., the event manager of the concert or event for which the token serves as an admission ticket. In case a purchaser, who becomes unable to attend the event after having purchased the token/ticket, the purchaser may have the option to sell the token back to the original owner of the token, optionally at a reduced price, which reduced price may additionally depend on how close in time it is to the event taking place, thus protecting the event manager in case the event manager does not manage to resell the token/ticket. In this example, the original owner of the token may always be able to sell the token even if the token can no longer be resold by a purchaser.

The following disclosure provides an implementation example presented for illustration only, and is not meant to be limiting in any way: the transfer limitation may be implemented within the smart contract instantiation the token, for example, through a data mapping storing a number of allowed transfers remaining for each token, and with the number of allowed transfers remaining for an NFT reduced by one every time the NFT is transferred, and wherein the NFT may not be transferred if the number of allowed transfers is 0. In some embodiments it may be possible to purchase further transfers at extra costs, for example, by a payable transaction which increments the number of allowed transfers remaining for a specific token. In other embodiments the number of transfers may be reduced as a penalty for malicious behavior. For example, if a holder of a token is determined to have perpetrated a fraudulent transaction, the number of transfers for the token held by the holder may be decremented or even reduced to 0.

In another embodiment of the present disclosure, the transfer limitation may be implemented at a protocol level rather than at a smart contract level. For example, the NFT may be sold on a layer 2 (L2) chain, with a watchful bridge monitoring and enabling a transfer of the token to a layer 1 (L1) chain, as disclosed in U.S. patent application Ser. No. 17/810,741 entitled Systems and Method for Providing Security Against Deception and Abuse in Distributed and Tokenized Environments" by Jakobsson et al., which is herein incorporated by reference in its entirety. The watchful bridge may refuse to transfer the NFT to the L1 chain if it has been transferred too many times on the L2 chain, or more generally, if the requested transfer does not comply with the terms of service specified in the token and governing transfer limitations.

In one embodiment, the transfer limitation may be implemented by associating a transfer policy with the token and conditionally locking the ownership of the token, e.g., using an external entity that needs to approve any ownership transfer, and which operates as a fiduciary of an original content creator, such as a concert organizer; approaches to do so are disclosed in U.S. patent application Ser. No. 17/810,741 entitled Systems and Method for Providing Security Against Deception and Abuse in Distributed and Tokenized Environments" by Jakobsson et al., which is herein incorporated by reference in its entirety.

In another embodiment, the transfer limitation may be implemented by associating a transfer policy with the token and conditionally locking the ownership of the token, e.g., using a smart contract; approaches to do so are disclosed in U.S. patent application Ser. No. 17/933,659 entitled "Systems and Methods for Token Content Unlocking, Biometric Authentication using Privacy-Protecting Tokens, Ownership-Based Limitations of Content Access, Policy-Based Time Capsule Technology, and Content Lock Mechanisms" by Jakobsson et al., which is herein incorporated by reference in its entirety.

In a further embodiment of the present disclosure, the limitation on transfers may be lifted when certain conditions are met, for example: when a specific date is reached (through this a used ticket NFT may become repeatedly transferable after the event is concluded), when an unlock function is called in the smart contract, after a fixed period of time has elapsed since the minting of the token, on payment of a further transfer fee, or on the customer holding an NFT with transfer limitations receiving a second NFT, said second NFT comprising a transfer-unlocking functionality.

In one embodiment, the access control associated with the token is tied to a public key of the wallet to which the token is transferred. Attending a concert, for example, will then require a user to respond to a challenge using the associated private key. The association between the public key and the token can be made by a requirement, stated in the token, that the first public key to which ownership is associated. The token can still be sold to other parties, e.g., in the form of a collectible, but the access control component is not modified, thereby causing the tie to the original owner of the token (after the ticket seller transfers it to that party and her wallet) to remain.

In one embodiment, the token may be required, by policy, to be associated with a social token, such as a biometric identity token as described in U.S. patent application Ser. No. 17/808,264 entitled "Systems and Methods for Token Creation and Management" by Jakobsson et al., which is herein incorporated by reference in its entirety. For example, a token may be associated with an identity token that signifies the token is held by an authorized distributor of the token, or, controlled by a planned attendee. Tokens controlled and tied to an identity of a scalper with a history of reselling tokens may be blocked entirely from transferring the token. Tokens detected to be associated with illegal activity or activity that is not in compliance with terms of service may be revoked, modified or returned to an issuer; technology to perform such actions is disclosed in U.S. patent application Ser. No. 17/810,085 entitled "Distributed Ledgers with Ledger Entries Containing Redactable Payloads" by Jakobsson et al., and U.S. patent application Ser. No. 17/810,741 entitled "Systems and Method for Providing Security Against Deception and Abuse in Distributed and Tokenized Environments" by Jakobsson et al., which are herein incorporated by reference in their entireties.

Wallets may be configured to warn users of any activity, including ownership transfers, that is in conflict with applicable laws or terms of service associated with tokens associated with the wallet, or other smart contracts or token-associated metadata intended to prevent misuse, etc. A wallet can also warn a user if it appears that a token the user is about to acquire may have a history indicating a breach of laws or terms of service; this is valuable information for the user, as it may indicate a risk that the token could get rescinded, modified, having ownership modified, or otherwise invalidating the token. The threat of such actions will make many users wary of purchasing tokens that are associated with abuse, therefore acting to suppress the market prices of such tokens, which acts as a financial discouragement against abuse. For example, tokens that can be shown to be stolen, e.g., in a phishing attack, may become rescinded or repossessed; therefore, such tokens will see their value severely affected, which hurts criminals. In contrast, a wallet that finds that a token has a clean history, i.e., is not associated with known types of abuse, will have a higher value. This is akin to a deed of a house, but is determined by analysis of blockchain entries, issued complaints, warnings generated by bounty hunters, and more.

In one embodiment, a token comprises an indication of its associated terms of service, which includes terms describing how the token may be used and transferred. Evidence of use, incl. transfers of ownership, are collected, e.g., by an entity observing logs on a blockchain indicating such uses, and the token is optionally repossessed if there are indications that its existence or use was not in compliance with the terms of service, laws, etc. A party able to perform the repossession may warn of the pending action by conveying alerts to a wallet associated with the token. Repossession may be performed using the techniques disclosed in U.S. patent application Ser. No. 17/810,085 entitled "Distributed Ledgers with Ledger Entries Containing Redactable Payloads" by Jakobsson et al., and U.S. patent application Ser. No. 17/810,741 entitled "Systems and Method for Providing Security Against Deception and Abuse in Distributed and Tokenized Environments" by Jakobsson et al., which are herein incorporated by reference in their entireties. Repossession may also be initiated by a breach of local laws, where the notion of locality may be associated with a geographical location of use of a wallet, e.g., as determined by its registration, by IP addresses, by determinations made by an associated trusted execution environment (TEE) or digital rights management (DRM) module with access to GPS data, IP address data, information about hotspot naming, or other information indicative of location.

The method described herein may be performed by a node, e.g., a wallet or a marketplace. Alternatively, the method may be performed by a smart contract of a digital asset (such as a token, a digital ticket), wherein the digital asset is associated, e.g., owned by, the node. In one embodiment, the method described herein is implemented using a watchful mechanism, such as described in PCT Patent App. No. PCT/US2023/062851 entitled "Systems and Methods for Abuse Safeguards in NFT-Directed Environments" by Jakobsson et al., which is herein incorporated by reference in its entirety. The transfer limitations may be expressed, for example, using a terms of service (ToS) rule associated with the token, where the ToS may be stored in the token, referenced in the token, or associated with a context of the token such as a jurisdiction. The ToS may be located in many other locations or expressed in other ways as described in the above-mentioned application, and as will be understood by a skilled artisan.

Figure 34:
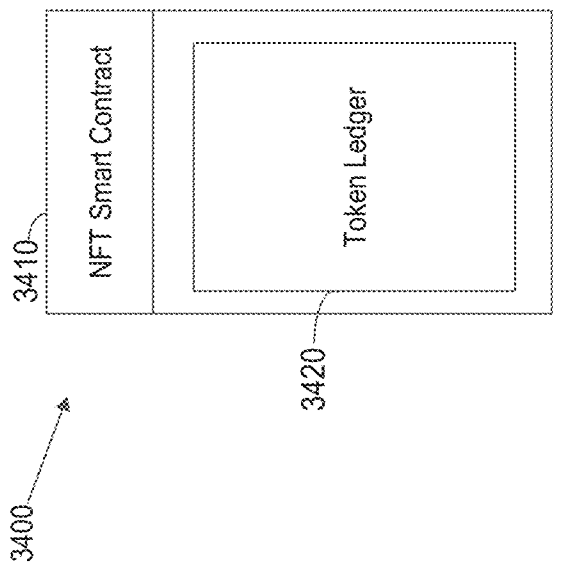
FIG. 34 illustrates a smart contract instantiating non-fungible tokens in accordance with an embodiment of the invention.

FIG. 34 illustrates a smart contract instantiating non-fungible tokens (3400). An NFT smart contract (3410) comprises a token ledger (3420), which in some embodiments may comprise a mapping.

FIG. 35 illustrates a token ledger (3420) comprising a data structure in which a token, identified by a token identifier (3510) is mapped to an owner (3520), a uniform resource locator or URL for the token (3530), and a transfer count (3540).

Figure 36:
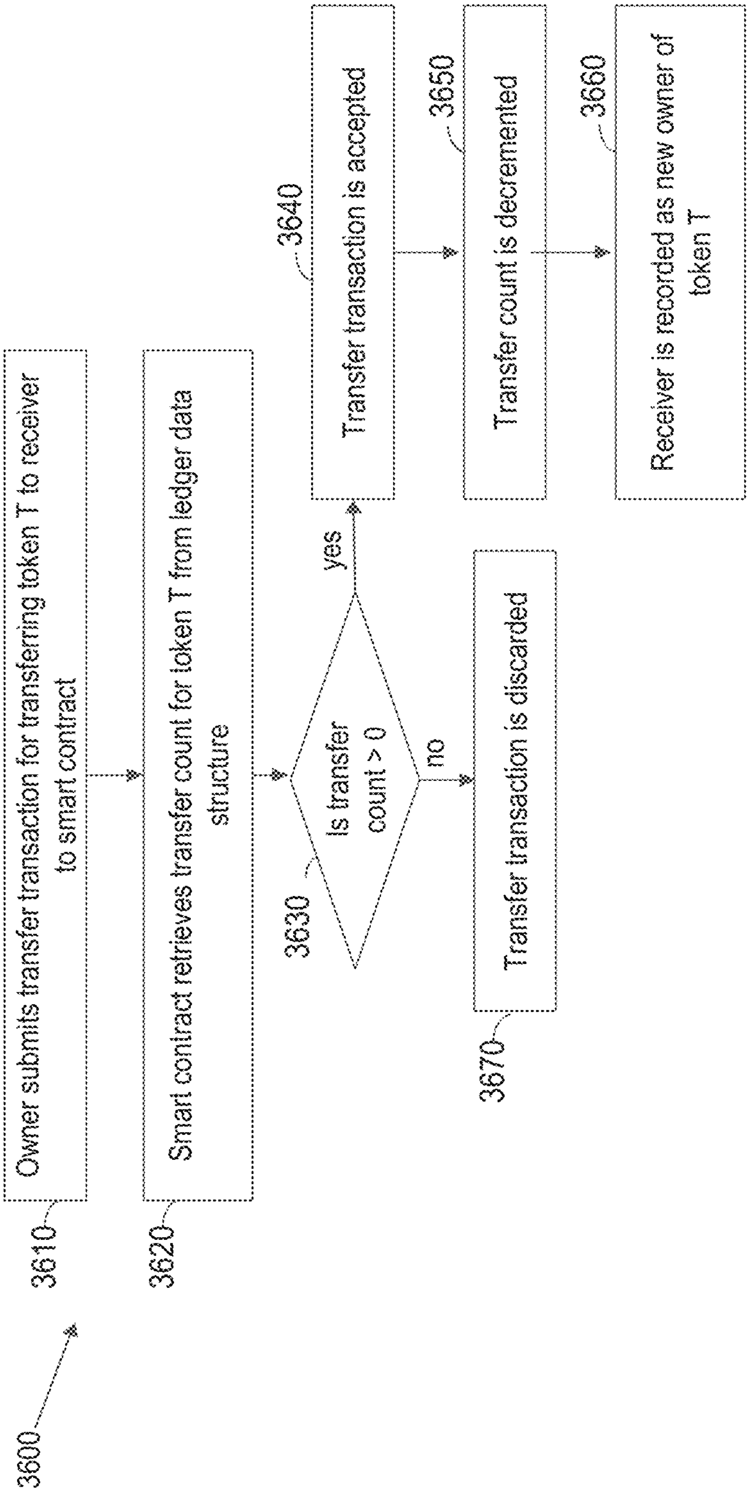
FIG. 36 illustrates a flowchart illustrating an exemplifying embodiment of a method performed by a smart contract for determining whether to transfer a token with transfer limitations in accordance with an embodiment of the invention.

FIG. 36 is a flowchart illustrating an exemplifying embodiment of a method 3600 performed by a smart contract for determining whether to transfer a token with transfer limitations. The method is triggered by an owner of an NFT or token submitting a transfer transaction, said transfer transaction requesting the transfer of ownership of the NFT or token, T, to a receiver, as illustrated in step 3610.

In step 3620, the smart contract retrieves a transfer count for token T from a ledger data structure, which in some embodiments may comprise a mapping, said ledger data structure comprising data instantiating tokens and recording one or more of: token owners, metadata uniform resource locators, and transfer counts.

In step 3630, the smart contract examines whether the transfer count for token T is greater than 0. If this is the case, activities proceed to step 3640. If this is not the case, activities proceed to step 3670.

In step 3640, the smart contract accepts the transfer transaction as valid, and activities proceed to step 3650.

In step 3650, the smart contract may decrement the transfer count value in the ledger data structure. In a preferred embodiment, the smart contract may decrement the transfer count value by 1. In other embodiments the smart contract may decrement the transfer count value by a positive integer, a fraction, or zero, with the decrementation value dependent on other aspects of the transfer transaction, such as the receiver, the current transfer count value, a timestamp, or some other information. Activities then proceed to step 3660.

In step 3660 the receiver is recorded as a new owner of the token T, whereby the transfer transaction is processed and completed.

Those skilled in the art will appreciate that steps 3650 and 3660 may be executed in reverse order to that shown, or simultaneously.

If the transfer count for token T was determined to be zero in step 3630, activities proceed to step 3670, and the transfer transaction is not acted on and is discarded.

Figure 37:
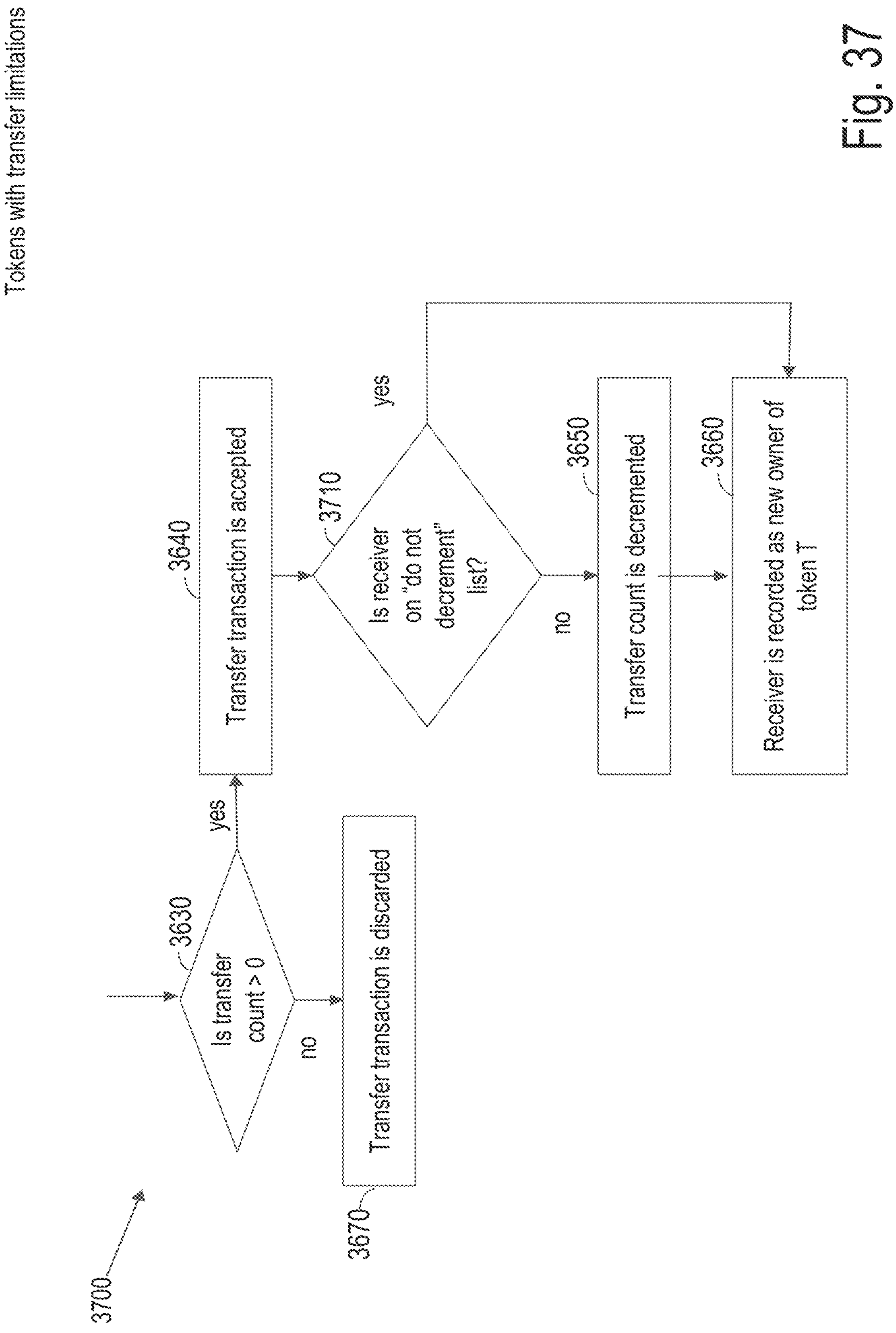
FIG. 37 illustrates a part of a flowchart illustrating an alternate embodiment 3700 for the method of FIG. 36 in accordance with an embodiment of the invention.

FIG. 37 is part of a flowchart illustrating an alternate embodiment 3700 for the method of FIG. 36 (3600). In the alternate embodiment a "do not decrement list" comprises a list of receiving addresses for which a transfer count decrementation is not required, as illustrated in an additional step 3710 to be conducted between step 3670 and step 3650 of the method of FIG. 36.

In step 3710, the smart contract may determine whether a receiver is on the "do not decrement" list. If the receiver is on the "do not decrement list", activities in the method of FIG. 37. proceed directly to step 3660, and the transfer count is not decremented. If the receiver is not on the "do not decrement list" activities proceed to step 3650, and the transfer count is decremented.

Figure 38:
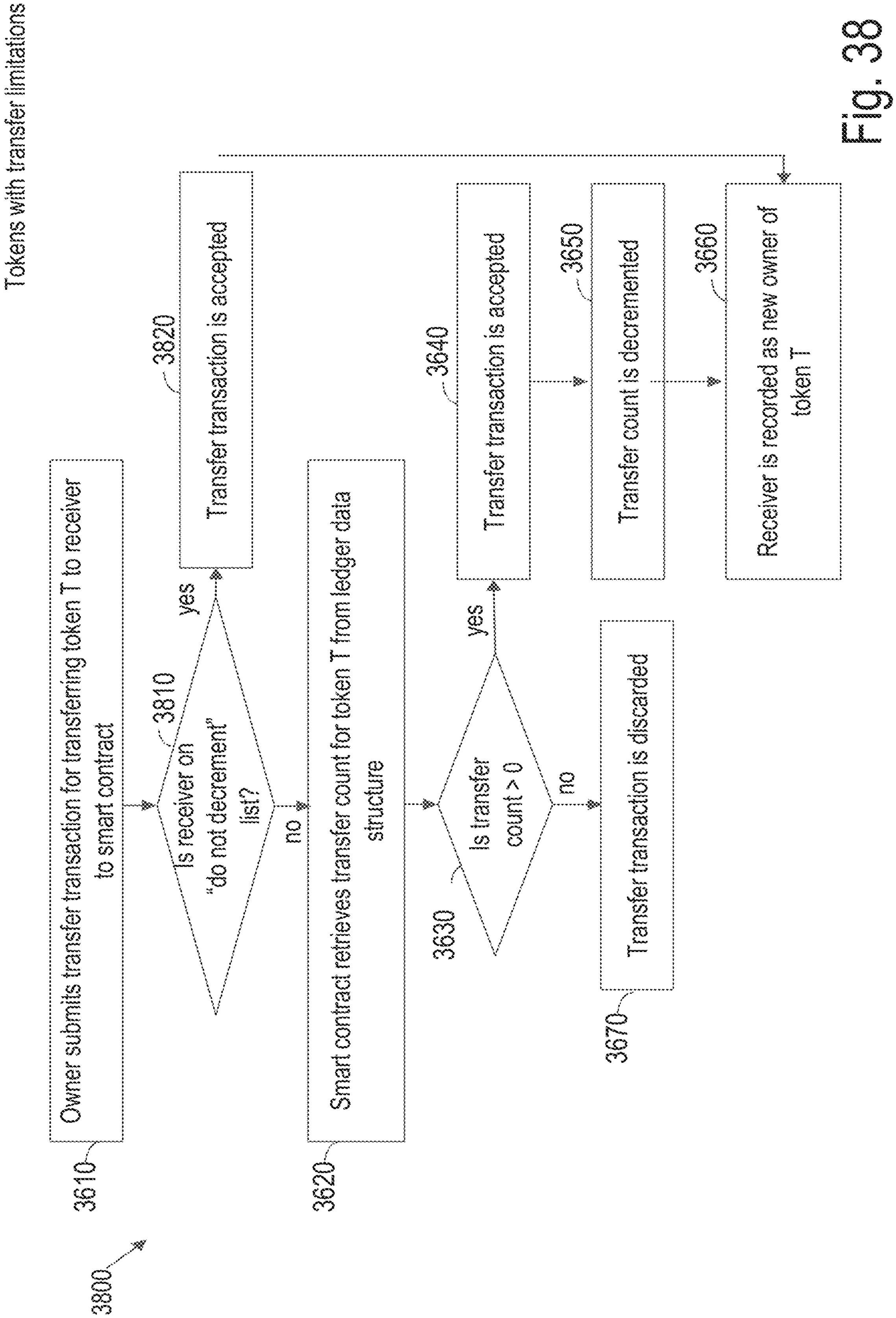
FIG. 38 illustrates a flowchart illustrating a second alternate embodiment 3800 for the method of FIG. 36, which comprises further steps 3810 and 3820 and a "do not decrement" list, comprising addresses for which a transfer count decrementation is not required in accordance with an embodiment of the invention.

FIG. 38 is a flowchart illustrating a second alternate embodiment 3800 for the method of FIG. 36 (3600), which comprises further steps 3810 and 3820 and a "do not decrement" list, comprising addresses for which a transfer count decrementation is not required.

After step 3601, activities proceed to step 3810, in which the smart contract may determine whether the receiver is on the "do not decrement" list. If the smart contract determines that the receiver is on the "do not decrement" list, activities proceed to step 3820, and the transfer transaction is accepted. Subsequently, activities proceed directly to step 3660, and the receiver is recorded as a new owner of token T, without the transfer count being decremented. If the smart contract determines that the receiver is not on the "do not decrement" list activities proceed to step 3620 and continue as per the method of FIG. 36 (3600).

In the light of the above disclosures of methods 3600, 3700 and 3800, and the following disclosure, those skilled in the art will appreciate that the methods of 3600, 3700 and 3800 may be generalized to a plurality of lists with corresponding decrementation constants. For example, in a specific example of this generalized embodiment, a standard decrementation of 5 may apply for transfers to receivers not on any of the plurality of lists, a decrementation of 1 may apply to receivers on a first of the plurality of lists, and a decrementation of 2 may apply to receivers on a second of the plurality of lists. Similarly, in a further embodiment, decrementations may comprise a negative value (thus actually incrementing the transfer count), or a fractional value.

Furthermore, in other embodiments, the "do not decrement" list and subsequent decrementation of the transfer count may apply against the owner rather than the receiver, or both the owner and the receiver.

Figure 39A:
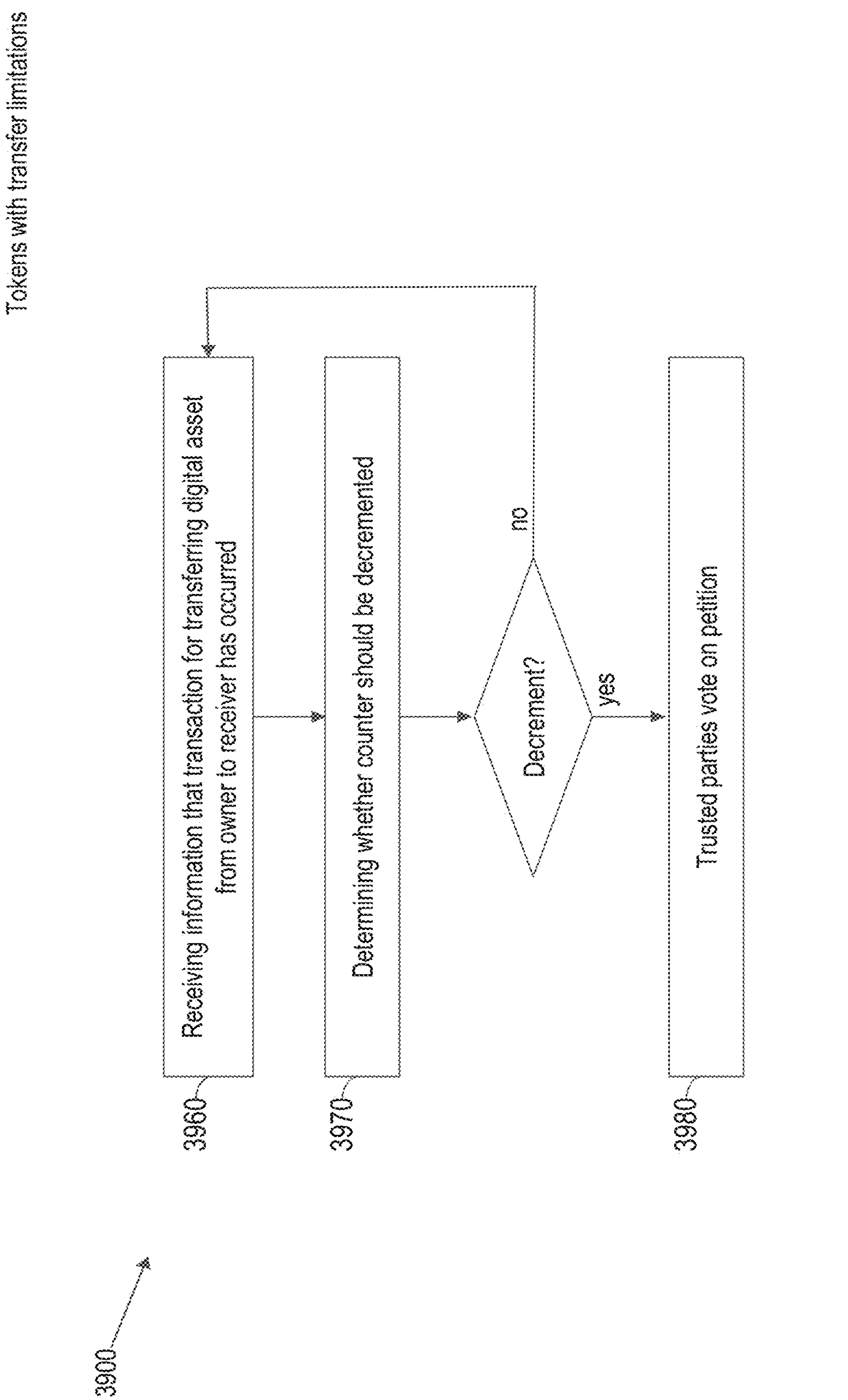
FIGS. 39A-39B illustrate a flowchart of an example of an embodiment of a method for imposing a limit on a number of transfers of ownership of the a digital asset, wherein the digital asset is associated with a counter initialized with a value corresponding to the number of transfers of the digital asset that are permitted in accordance with an embodiment of the invention.

FIG. 39A is a flowchart of an example of an embodiment of a method for imposing a limit on a number of transfers of ownership of the a digital asset, wherein the digital asset is associated with a counter initialized with a value corresponding to the number of transfers of the digital asset that are permitted. FIG. 39A illustrates the method comprising a step 3960 of receiving information that a transaction for transferring the digital asset from an owner to a receiver has occurred; and a step 3970 of determining whether the counter should be decremented. FIG. 39A also illustrates the method comprising a step 3970 of decrementing the counter if it is determined that the counter should be decremented.

Figure 39B:
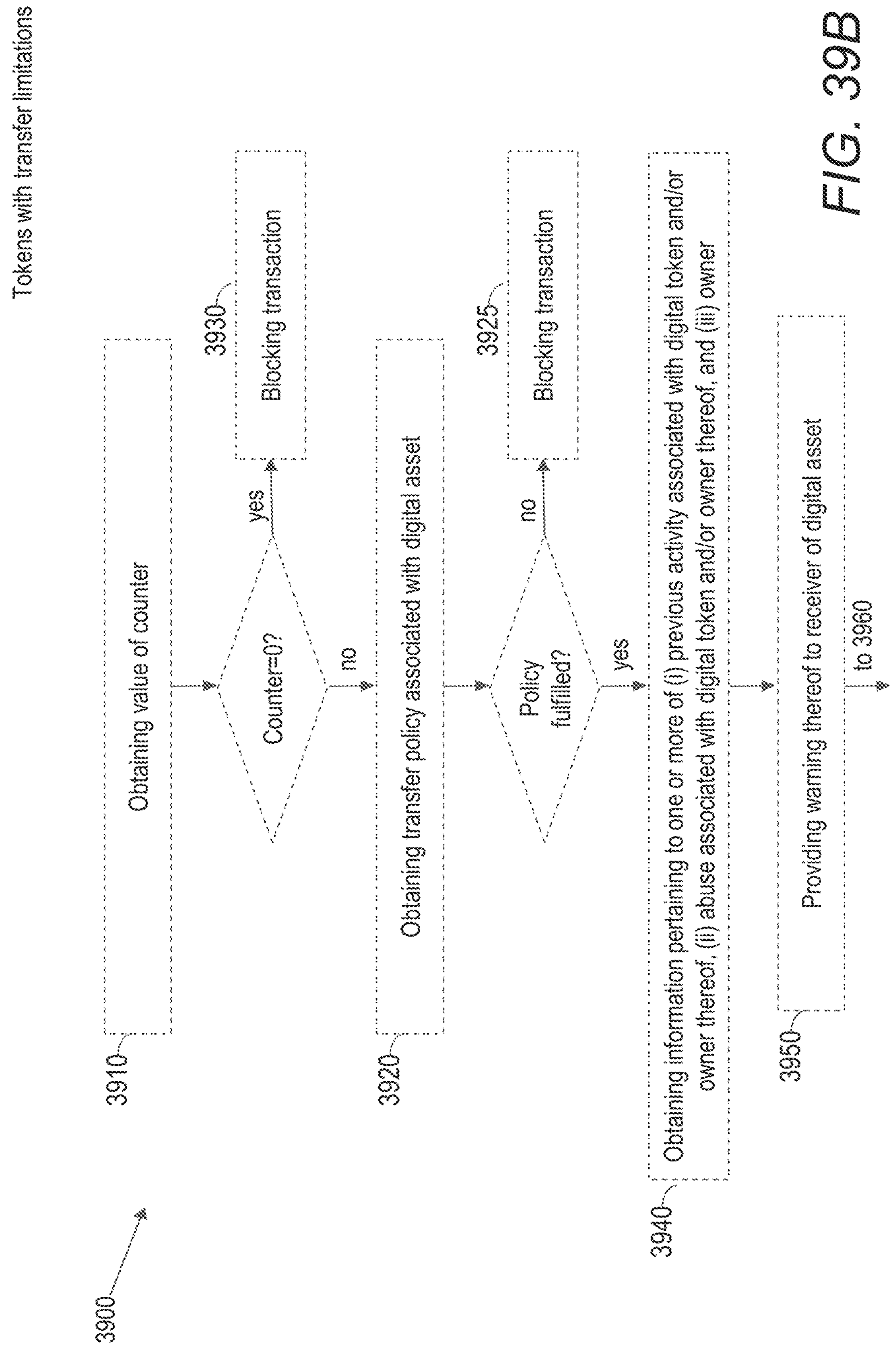

FIG. 39B is a flowchart of an example of an embodiment of a method for imposing a limit on a number of transfers of ownership of the a digital asset, wherein the digital asset is associated with a counter initialized with a value corresponding to the number of transfers of the digital asset that are permitted. FIG. 39B illustrates the method comprising an optional step 3910 of obtaining the value of the counter, and if the counter value equals zero then the method comprises the step 3930 of blocking the transaction for transferring the digital asset from the owner to the receiver. This means that as long as the counter is higher than zero, the digital asset may be eligible for transfer of ownership. However, if the counter is zero, the digital asset may not be transferred and hence any transfer of ownership is blocked. FIG. 39B also illustrates the method comprising the optional step 3920 of obtaining a transfer policy associated with the digital asset and a step 3925 of blocking the transaction for transferring the digital asset from the owner to the receiver if the transfer policy is not fulfilled with regard to the owner and the receiver. It is pointed out that the order of the steps illustrated in FIG. 39B may be performed in any order and all steps are optional. Consequently, step 3910 may be performed after step 3920; and one of them may be performed without the other having to be performed. FIG. 39B further illustrates the method comprising still an optional step 3940 of obtaining information pertaining to one or more of (i) previous activity associated with the digital token and/or the owner thereof, (ii) abuse associated with the digital token and/or the owner thereof, and (iii) the owner; and an optional step 3950 of providing a warning thereof to the receiver of the digital asset.

Figure 40:
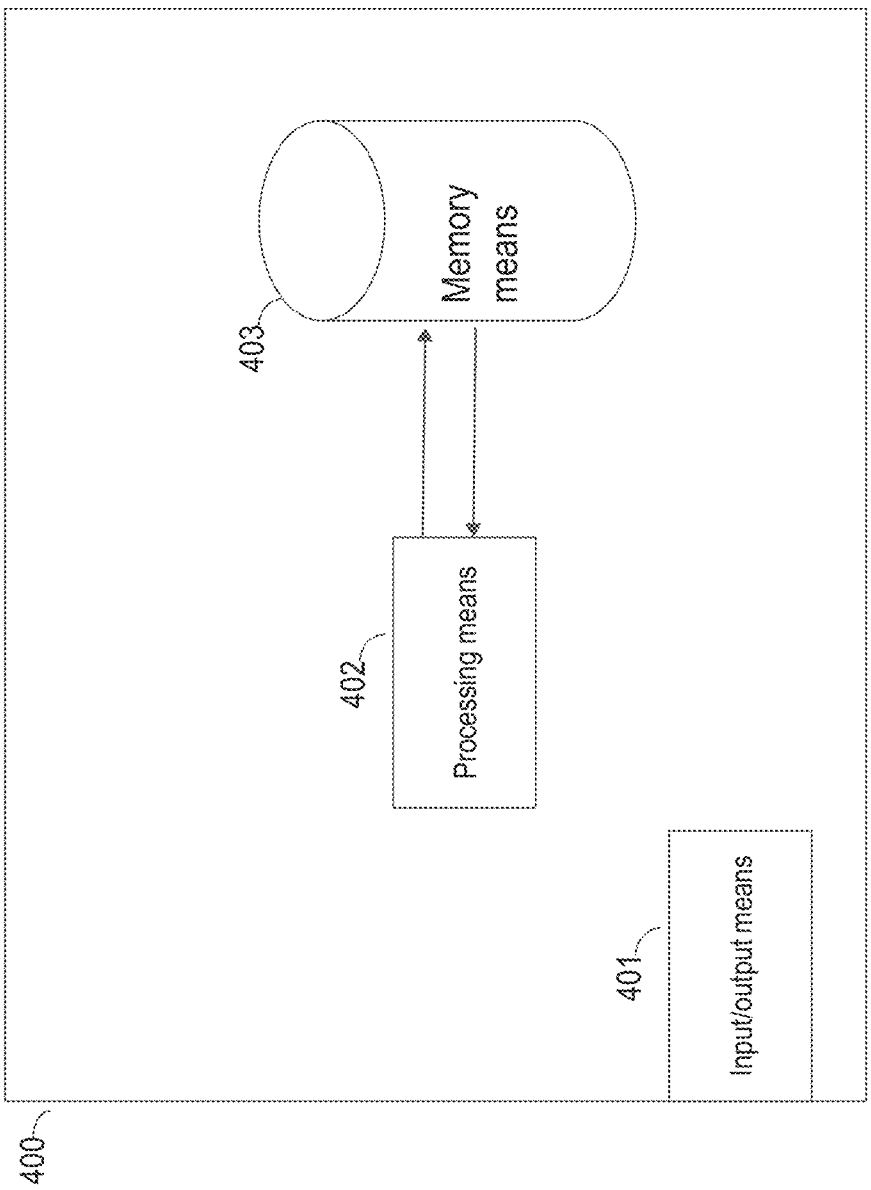
FIG. 40 illustrates a block diagram of an exemplifying embodiment of a node 400 configured for imposing a limit on a number of transfers of ownership of a digital asset, wherein the digital asset is associated with a counter initialized with a value corresponding to the number of transfers of the digital asset that are permitted in accordance with an embodiment of the invention.

FIG. 40 is a block diagram of an exemplifying embodiment of a node 400 configured for imposing a limit on a number of transfers of ownership of a digital asset, wherein the digital asset is associated with a counter initialized with a value corresponding to the number of transfers of the digital asset that are permitted. The node 400 is illustrated comprising input/output means 401 by means of which the node 400 may receive information and transmit or provide information to other units, devices and/or entities. FIG. 40 also illustrates the node 400 comprising processing means 402 and memory means 403, the memory means 403 comprising instructions, which when executed by the processing means 402 causes the node 400 to perform the method described herein.

Mirror Tokens and Parallel Addresses

Multiple blockchains currently exist, with varying levels of value locked up in them. There are numerous protocols and companies in existence, which facilitate the transfer of value from one chain to another through the use of bridges. However, this is typically done by locking up a collateral asset on a first chain, and instantiating a new token on a second chain, such that only when the new token is destroyed or locked up can the collateral asset on the first chain be unlocked. In this disclosure we refer to this new token as a secondary token, and it acts as a receipt for redeeming the token on the first chain.

As a result of this mechanism, the collateral asset becomes useless until the secondary token is redeemed, thus limiting or completely eliminating any financial activities that can be undertaken with the collateral asset once it is locked up, thereby limiting opportunities for making capital gains on the collateral asset.

There is therefore a need for decentralized finance solutions that enable limited or even extensive further uses for collateral assets after they have been "bridged" to a second blockchain.

In the present disclosure, solutions to problems relating to bridging and interconnectivity between two blockchains are presented. In contrast to tokens that come into existence by moving a first token from a first chain to a second chain, by locking (destroying) the first token on the first chain and creating it on the second chain, this secondary token is created on the second chain without locking/destroying the first token, but by creating an association between the two. We call this kind of secondary token a mirror token.

Mirror Tokens

Fundamental to this disclosure is the invention of mirror tokens, in which an original token existing on a first blockchain, or parent chain, is mirrored by a mirror token instantiated on a second blockchain, or secondary chain, and subsequently systems and methods are provided through which the mirror token mimics some or all of the activity and behavior of the original token, and in some embodiments, vice versa. Through this improvement to the present art, both the original token and the mirror token may be utilized at the same time, as opposed to current bridging technology, in which the bridged asset is no longer usable on the parent chain.

There are a number of problems that arise with mirror tokens, which are solved in the disclosures that follow.

Issues Concerning Entities, Private Keys, and Public Addresses

It is necessary to ensure that ownership of a token on the parent chain by an entity is matched by ownership of a corresponding mirror token on a secondary chain by the same entity.

Establishing corresponding ownership between an original token and its mirror token may depend on the digital signing and address scheme used by each blockchain. Ownership of a token is typically indicated by registering a public address against the token, and by restricting the right to change the registered public address to the holder of a private key from which the public address is derived. The restriction is typically implemented at a chain protocol level, in which a transaction to transfer a token to a new owner requires the transaction to be signed with the private key.

The problem is therefore how to identify that a holder of a first token on the parent chain is the same as the holder of the mirror token on the secondary chain. We now examine three cases:

If the parent chain and the secondary chain use the same digital signing algorithm and address schema, then any private key on the parent chain will derive the same address on the secondary chain.

For example, the Ethereum mainnet and the Polygon "layer 2" chain both use ECDSA secp2561k as a digital signing algorithm. Ethereum and Polygon also both use the same mechanism for deriving a public blockchain address from the ECDSA public key, namely the last 40 bytes of a Keccak-256 hash of the ECDSA public key.

Therefore, given a private key, the same public address is derived for the Ethereum mainnet and the Polygon layer 2 chain. We may thus establish that assets owned by a first public address on Ethereum and assets owned by a second public address on Polygon that is character for character equal to the first address, are owned by the same entity.

We describe instances of this first case (for example Polygon and Ethereum mainnet) as address isomorphic.

Figure 41:
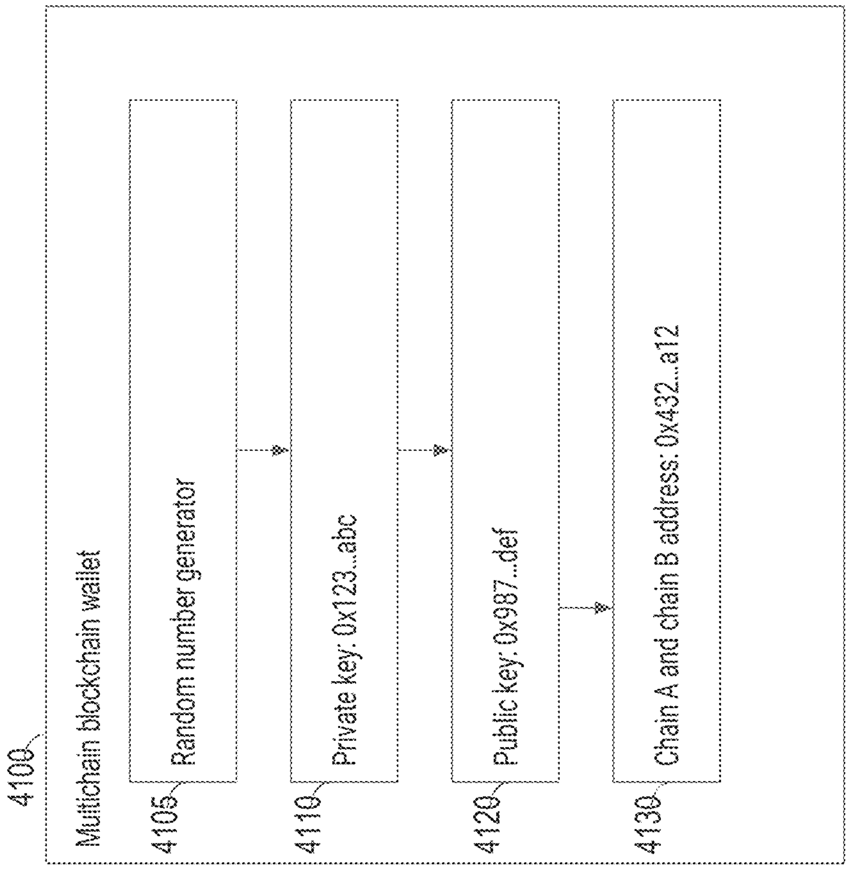
FIG. 41 illustrates a possible embodiment of a multichain blockchain wallet (4100) for instantiating mirror addresses for address isomorphic blockchains using the same digital signing algorithm and the same blockchain address derivation algorithms, for example Ethereum and Polygon in accordance with an embodiment of the invention.

FIG. 41 is an illustration of a possible embodiment of a multichain blockchain wallet (4100) for instantiating mirror addresses for address isomorphic blockchains using the same digital signing algorithm and the same blockchain address derivation algorithms, for example Ethereum and Polygon. The wallet (4100) may comprise a private key (4110), which in some embodiments may be generated through a random number generator (4105). In other embodiments the private key (4110) may be derived from a seed phrase, which may be supplied by a user, or may be generated by a random number generator.

The wallet (4100) may derive a public key (4120) from the private key (4110) using the digital signing algorithm. The wallet (4100) may then derive an address (4130) for chain A and chain B using the same blockchain address derivation algorithm.

The user may then use the wallet (4100) to sign transactions on chain A using the address (4130) and to sign transactions on chain B using the address (4130).

If the parent chain and the secondary chain use the same digital signing algorithm, but a different address schema, then a private key will derive different addresses on the parent chain and the secondary chain.

For example, Bitcoin uses multiple address generation schemas, such as the legacy addressing system of a base58 encoding of a concatenation of a RIPEMD-160 hash of a SHA-256 hash of the ECDSA public key with network and checksum bytes. A private key held by an owner will therefore derive a different address on the Ethereum mainnet and the Bitcoin blockchain, and therefore the same owner may hold assets against both the Ethereum chain and the Bitcoin chain using the same private key. However this will not be apparent to an external observer.

We describe instances of this second case (Ethereum mainnet and Bitcoin) as address homomorphic.

Figure 42:
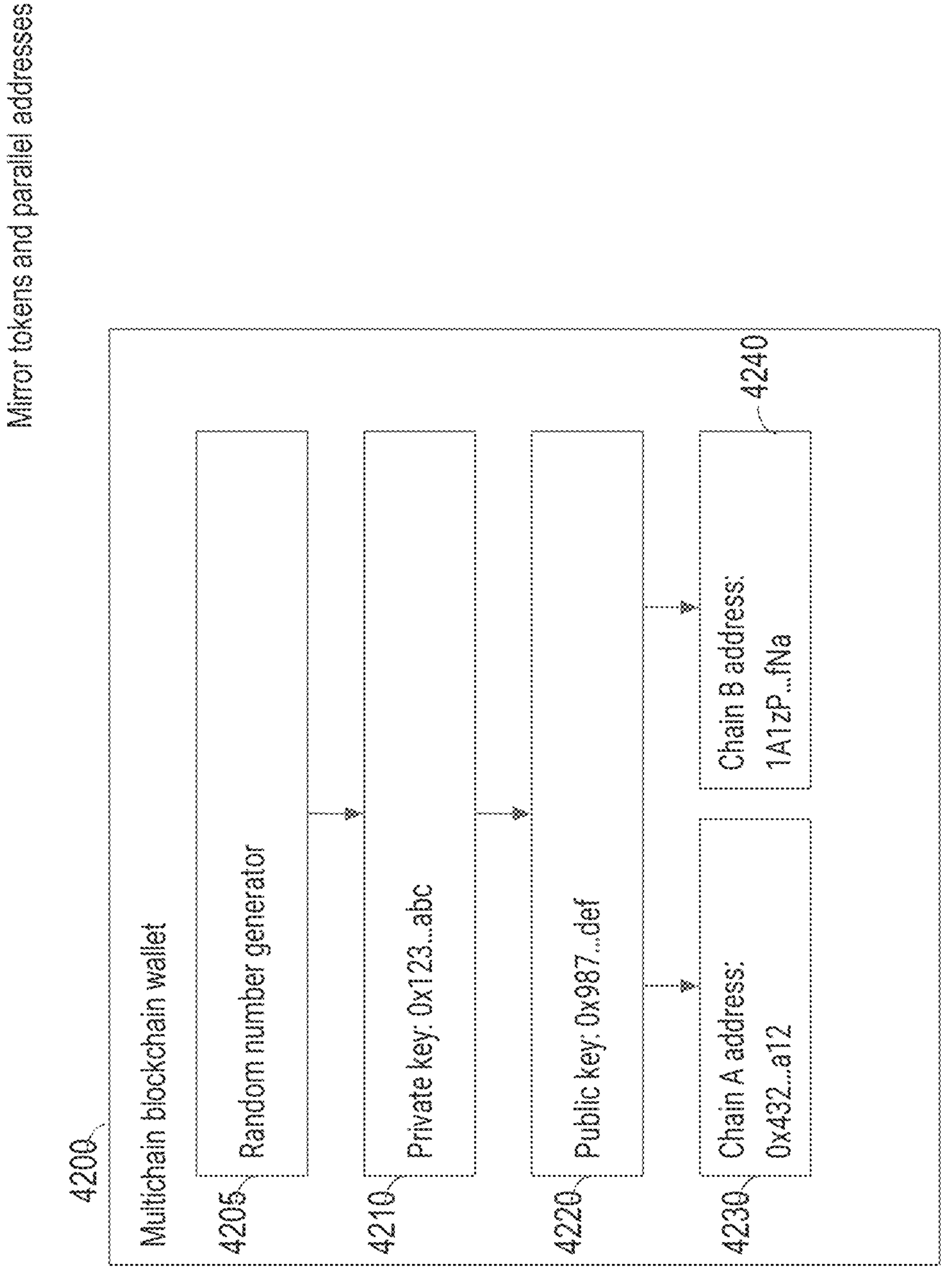
FIG. 42 illustrates a possible embodiment of a multichain blockchain wallet (4200) for instantiating mirror addresses for homomorphic addresses on two blockchains using the same digital signing algorithm but different blockchain address derivation algorithms, for example Ethereum and Bitcoin in accordance with an embodiment of the invention.

FIG. 42 is an illustration of a possible embodiment of a multichain blockchain wallet (4200) for instantiating mirror addresses for homomorphic addresses on two blockchains using the same digital signing algorithm but different blockchain address derivation algorithms, for example Ethereum and Bitcoin. The wallet (4200) may comprise a private key (4210), which in some embodiments may be generated through a random number generator (4205). In other embodiments the private key (4210) may be derived from a seed phrase, which may be supplied by a user, or may be generated by a random number generator.

The wallet (4200) may derive a public key (4220) from the private key (4210) using the digital signing algorithm. The wallet (4200) may then derive an address for chain A (4230) using a chain A address derivation algorithm, and an address for chain B (4240) using a chain B address derivation algorithm.

The user may then use the wallet (4200) to sign transactions on chain A using the address for chain A (4230) and to sign transactions on chain B using the address for chain B (4240).

If the parent chain and the secondary chain use a different digital signing algorithm, and a different address schema, then there may be no correspondence between digital signing algorithms and address generation schemes used by the two blockchains.

An example is Bitcoin and Stellar, with the former using ECDSA secp2561k and the latter using EdDSA and curve25519 (although a 256 bit private key is still used). It is not recommended to use the same private key with different signing algorithms, and so one entity owning assets on a parent chain and a secondary chain may hold different private keys, with different derived public addresses.

In other cases, a parent chain and a secondary chain may use a signing algorithm for which private keys are not interchangeable. For example, a parent chain may use a 512 bit private key, and a secondary chain may use a 256 bit private key.

We describe the third case as address non-homomorphic.

Figure 43:
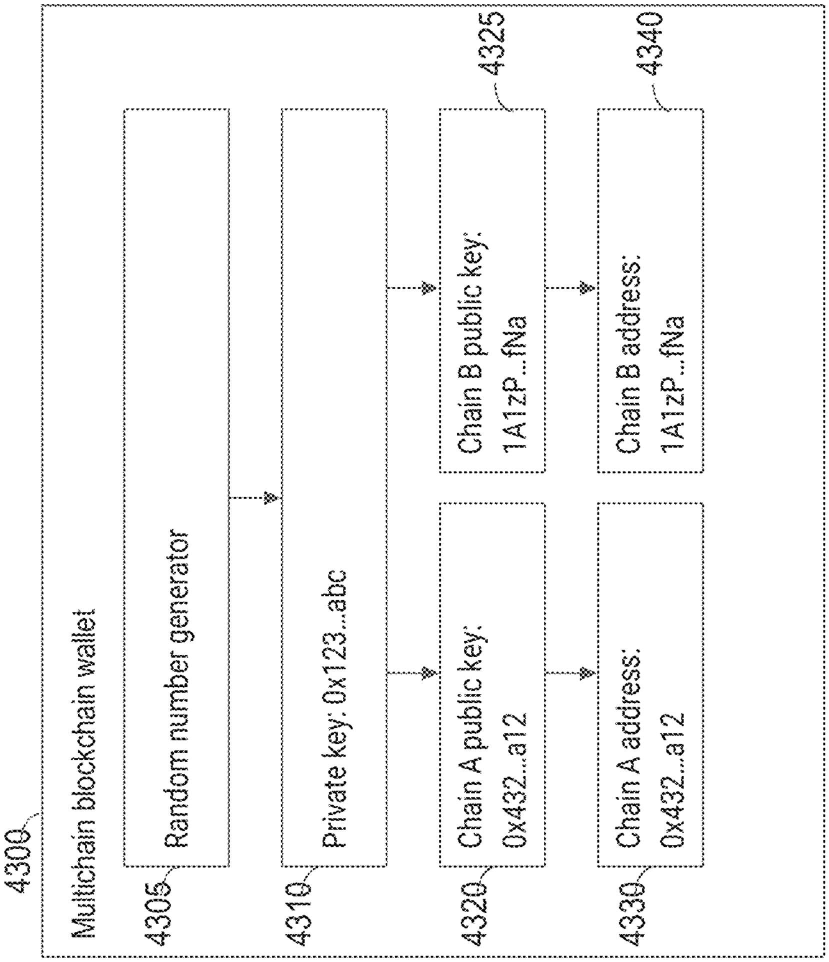
FIG. 43 illustrates a possible embodiment of a multichain blockchain wallet (4300) for instantiating mirror addresses for blockchains using differing digital signing algorithms and differing blockchain address derivation algorithms, for example Ethereum and Stellar in accordance with an embodiment of the invention.

FIG. 43 is an illustration of a possible embodiment of a multichain blockchain wallet (4300) for instantiating mirror addresses for blockchains using differing digital signing algorithms and differing blockchain address derivation algorithms, for example Ethereum and Stellar. The wallet (4300) may comprise a private key (4310), which in some embodiments may be generated through a random number generator (4305). In other embodiments the private key (4310) may be derived from a seed phrase, which may be supplied by a user, or may be generated by a random number generator.

The wallet (4300) may derive a chain A public key (4320) from the private key (4310) using the digital signing algorithm for chain A and a chain B public key (4325) from the private key (4310) using the digital signing algorithm for chain B. In other embodiments chain B public key (4325) may be derived from a different private key to private key (4310).

The wallet (4300) may then derive a chain A address (4330) for chain A using the chain A public key (4320) and chain A address derivation algorithm, and a chain B address (4340) for chain B using the chain B public key (4325) using the chain B address derivation algorithm.

The user may then use the wallet (4300) to sign transactions on chain A using the address for chain A (4330) and to sign transactions on chain B using the address for chain B (4340).

Those skilled in the art will appreciate in the light of the above disclosures that a blockchain wallet may comprise components for some or all of wallet (100), wallet (200), and wallet (4300).

Identifying Entities and their Asset

Having classified and defined the cases which may apply to mirror tokens, we proceed to disclose techniques and methods for common ownership of different assets on different chains by the same entity.

In the case of address isomorphic blockchains, shared ownership of a mirror token pair may be determined by parsing the second blockchain for the address of the owner of the original token on the first blockchain.

In the case of address homomorphic blockchains, in one embodiment of the present disclosure, an owner of an original token and a mirror token may make a claim that they are the one owner of both tokens. A third party, such as an oracle, may then present a challenge to the owner to digitally sign. As the digital signature reveals the public key associated with the owner's private key, the oracle may subsequently derive a first address on the first blockchain and a second address on the second blockchain, and verify that the original token is owned by the first address and the mirror token is owned by the second address.

In the case of address non-homomorphic blockchains using one private key, in one embodiment of the present disclosure, an owner of an original token and a mirror token may make a claim that they are the one owner of both tokens, and a third party, such as an oracle, may then present a challenge to the owner to digitally sign a first challenge comprising the first address using the private key and the digital signing algorithm of the second chain, and to digitally sign a second challenge comprising a second address using the private key and the digital signing algorithm of the first chain. The oracle may subsequently verify that a public key revealed by the first challenge may be used to derive the second address, and a public key revealed by the second challenge may be used to derive the first address, thus proving linked ownership of the mirror token pair.

In the case of address non-homomorphic blockchains using a first private key and a second private key, in one embodiment of the present disclosure, an owner of an original token and a mirror token may make a claim that they are the one owner of both tokens, and a third party, such as an oracle, may then present a challenge to the owner to digitally sign a first challenge comprising the first address using the second private key and the digital signing algorithm of the second chain, and to digitally sign a second challenge comprising a second address using the first private key and the digital signing algorithm of the first chain. The oracle may subsequently verify that a second public key revealed by the first challenge may be used to derive the second address, and a first public key revealed by the second challenge may be used to derive the first address, thus proving linked ownership of the mirror token pair.

Through this, in both embodiments, the first address and the second address become cross-linked, namely a connection of ownership of both is established.

Figure 44:
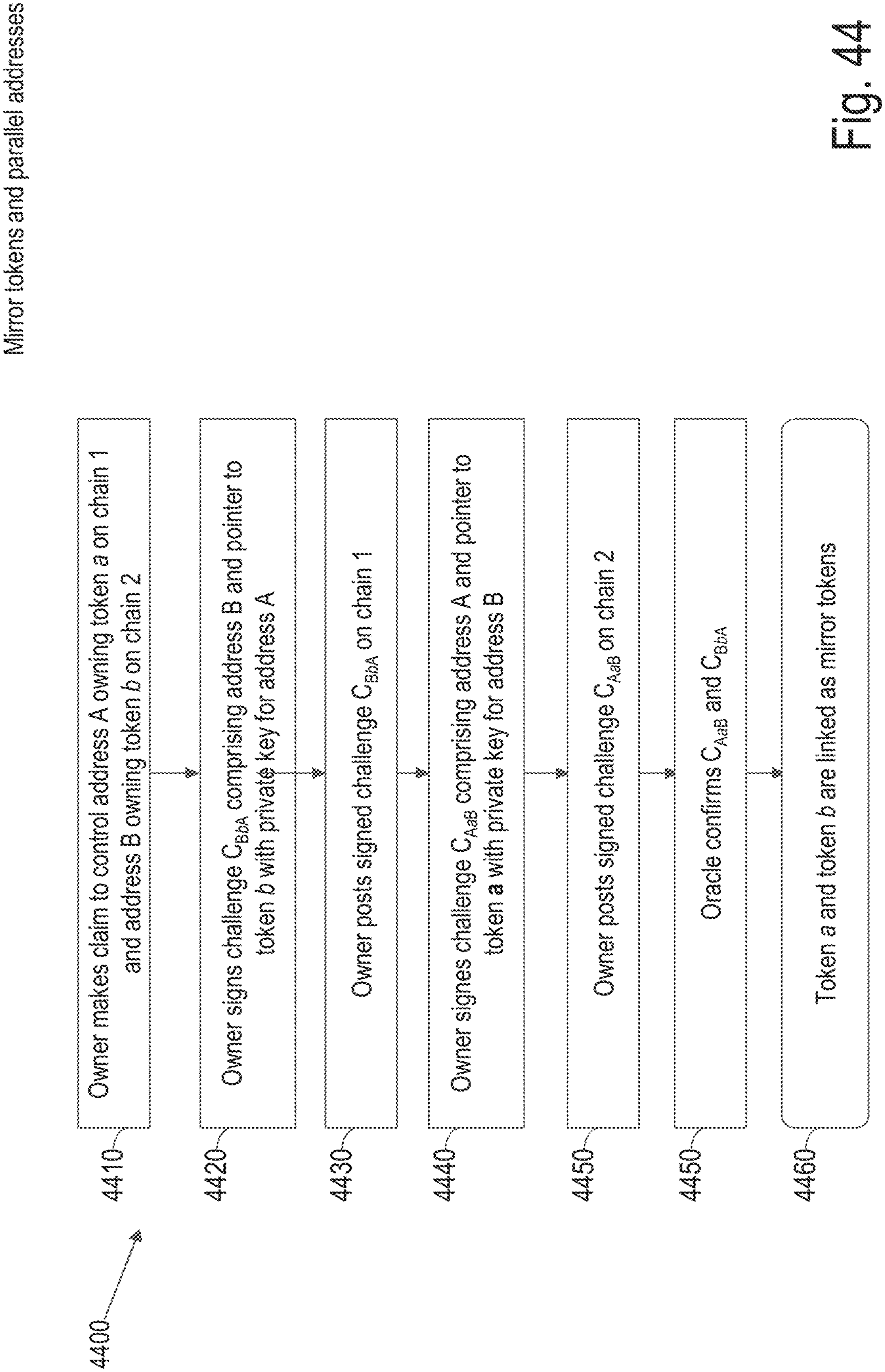
FIG. 44 illustrates a possible embodiment of a method for linking two tokens as comprising mirror tokens owned by homomorphic or non-homomorphic addresses in accordance with an embodiment of the invention.

FIG. 44 is a flowchart illustrating a possible embodiment of a method for linking two tokens as comprising mirror tokens owned by homomorphic or non-homomorphic addresses.

Actions commence when an owner of two tokens, token a and token b, held by address A and address B, on chain 1 and chain 2 respectively, wishes to assert that token a and token b are mirror tokens through making a claim, as illustrated in step 4410. In alternate embodiments, a third-party, smart contract, or other entity may request that the owner provides evidence that token a and token b are mirror tokens.

For example, a decentralized finance protocol may be instantiated by a third party on a first blockchain and a second blockchain, said decentralized finance protocol accepting tokens for staking in order to provide a loan, voting rights, wrapped tokens, or some other purpose. The third party may be willing to accepts assets existing on the first chain as a stake on the second chain through the use of mirror tokens. An owner of a token on the first chain may thus instantiate a mirror token on the second chain, make a claim that the token and the mirror token are indeed mirror tokens, and then provide evidence to that effect, thus enabling the third party to accept the mirror token and the token as stakes in the decentralized finance protocol on the first chain and the second chain.

Actions may then proceed to step 4420, in which the owner generates a challenge $C_{BbA}$, comprising address B, a reference or pointer to token b, and signs the challenge $C_{BbA}$ with the private key for address A. In alternate embodiments, the challenge $C_{BbA}$ may be generated by the third-party, smart contract, or other entity.

Actions may then proceed to step 4430, in which the owner may post the signed challenge $C_{BbA}$ on chain 1. In some embodiments, posting may comprise a transaction submitted to one or more nodes of chain 1. In other embodiments, posting may comprise a function call to a smart contract on chain 1 with function parameters comprising a signature for challenge $C_{BbA}$.

Actions may then proceed to step 4440, in which the owner generates a challenge $C_{AaB}$, comprising address B, a reference or pointer to token b, and signs the challenge $C_{AaB}$ with the private key for address A. In alternate embodiments, the challenge $C_{AaB}$ may be generated by the third-party, smart contract, or other entity.

Actions may then proceed to step 4450, in which the owner may post the signed challenge $C_{AaB}$ on chain 1. In some embodiments, posting may comprise a transaction submitted to one or more nodes of chain 1. In other embodiments, posting may comprise a function call to a smart contract on chain 1 with function parameters comprising a signature for challenge $C_{AaB}$.

Actions may then proceed to step 4450, in which an oracle may confirm or verify $C_{AaB}$ and $C_{BbA}$. Evidence of verification may be published on chain 1, chain 2, or both.

An outcome of steps 4410 through 4450 is illustrated in 4460, in that the third-party, smart contract, or other entity may now consider token a and token b to be mirror tokens.

Those skilled in the art will recognize that, other than step 4420 being required before step 4430, and step 4440 being required before step 4450, steps 4420, 4430, 4440 and 4450 may be executed in any order.

In one embodiment of the disclosed invention a first key is related to a second key, enabling a party with access to the first key to determine the second key. For example, by escrowing the second key by encrypting it, generating a ciphertext that can only be decrypted (to obtain the second key) using the first key, one creates a one-way relationship in which knowledge of the first key, and access to the escrow ciphertext, enables access to the second key. This is an asymmetric relationship, as knowledge of the second key does not enable computation of the first key, unless a similar escrow ciphertext, decryptable using the second key and "containing" the first key, is created. To get a symmetric relationship between two keys, two such escrow ciphertexts can be generated. Each one of them may be associated with a proof of knowledge that the contents, i.e., the plaintext, is a private key corresponding to the associated public key, which is the verification key of associated digital signature generated using the private key. A person of skill in the art would know many ways of creating such proofs of knowledge, e.g., using a highly parallel cut-and-choose protocol in which a challenge is determined by an oracle, which may be implemented using a hash function applied to the input of the cut-and-choose protocol. Related and compatible escrow techniques are disclosed in U.S. patent application Ser. No. 17/821,444 entitled "Systems and Methods for Management of Token Interactions" by Jakobsson et al., which is herein incorporated by reference in its entirety.

The above-described escrow methods also work for distributively held secrets, e.g., private keys that are shared by a collection of collaborating parties, e.g., using polynomial secret sharing methods. The private keys can be stored as one or more ciphertexts, where a private key stored as one ciphertext can be distributed to the relevant parties before the individual parts are decrypted. Alternatively, quorum-based re-encryption methods can be used to designate a ciphertext to be possible to decrypt by a selected party. This is disclosed in the z1999 publication titled "On Quorum Controlled Asymmetric Proxy Re-encryption" by Markus Jakobsson.

Bridging Component

If the two blockchains are address isomorphic, having the same digital signing algorithm and address schema, such as for example Polygon and Ethereum mainnet, or Binance Smart Chain and xDAI, and the same smart contracts relevant to the tokens in question are deployed on both with the same contract address, we may describe the two blockchains as contract isomorphic. In such a case when a first address owning a first token on a first blockchain interacts with a first contract using the first token, it may be feasible for a corresponding second address owning a corresponding second token on a second blockchain to interact with a second smart contract in an identical manner.

For example, on the Ethereum mainnet blockchain there exists a token with token symbol DAI and with a contract address of 0x6B175474E89094C44Da98b954EedeAC495271d0F. DAI is an ERC20 compliant token with the source code of the smart contract instantiating it publicly available. It is therefore possible to deploy the same smart contract code on a compatible second blockchain, such as Polygon, and issue Polygon DAI tokens in one-to-one correspondence with Ethereum mainnet DAI tokens. In this particular example, we are looking at two blockchains that use the same digital signing algorithm, the same blockchain address derivation schema, and the same virtual machine (namely the Ethereum Virtual Machine, or EVM), that is an address and contract isomorphic blockchain pair.

Figure 45:
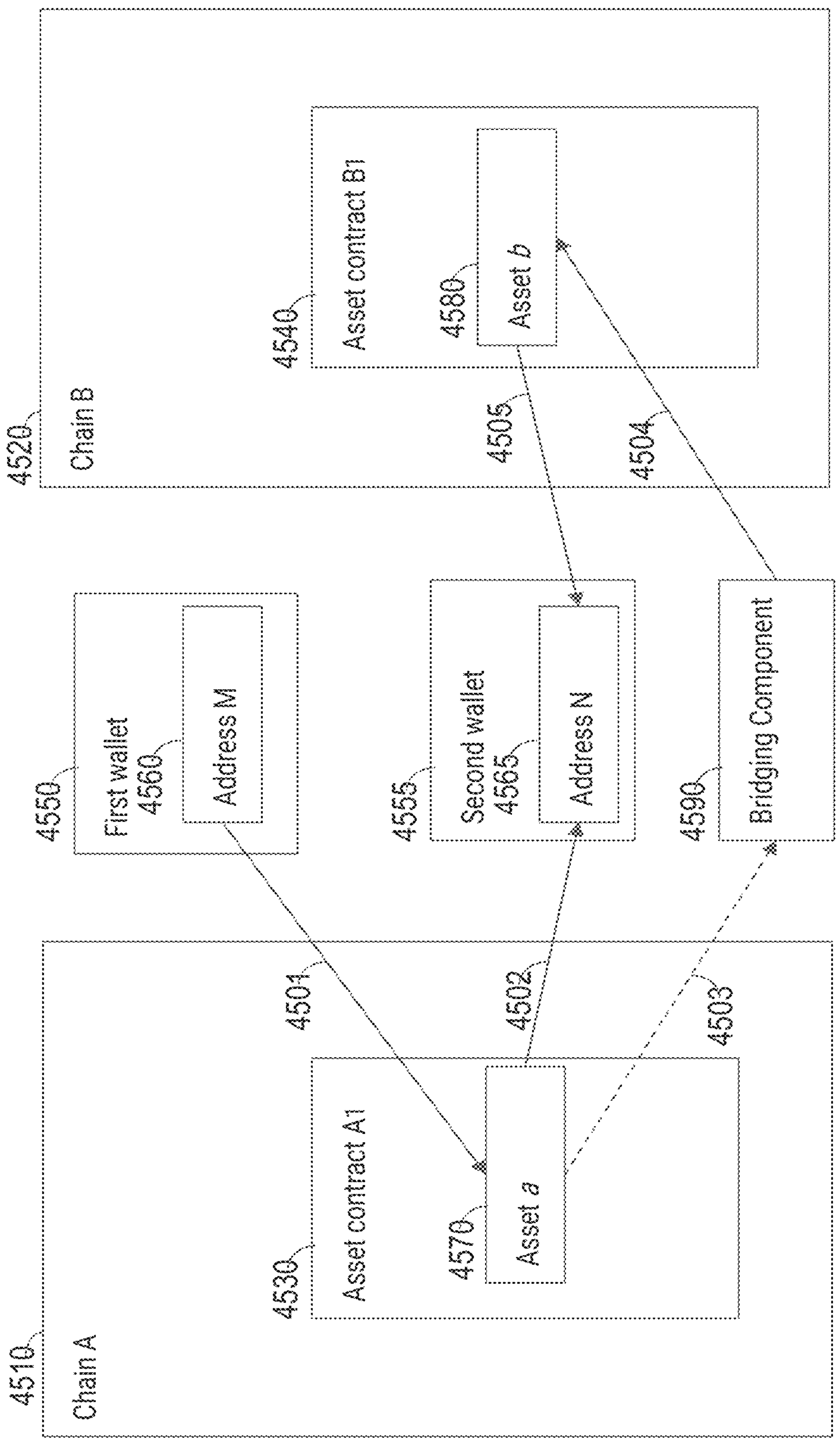
FIG. 45 illustrates an exemplary embodiment of a system for illustration purposes, the embodiment comprising a bridging component in accordance with an embodiment of the invention.

FIG. 45 presents an exemplary embodiment of a system for illustration purposes, the embodiment comprising a bridging component (4590).

In the illustrative example, two chains, chain A (4510) and chain B (4520) are address isomorphic. A first wallet (4550) comprises an address M (4560) that may be used to sign transactions for chain A (4510) and chain B (4520).

An asset a (4570) is instantiated on chain A (4510) through an asset contract A1 (4530). For the purposes of the present example, asset a (4570) is owned by the first walled (4550) by asset a (4570) being registered as owned by address M (4560), and the first wallet (4550) comprising address M (4560).

The owner of the first wallet (4550) signs a transaction 4501 using a private key for address M (4560) transferring asset a (4570) from address M (4550) to address N (4565). Thus the owner of a second wallet (4555) comprising address N (4565) is now the owner of asset a (4570).

The bridging component (4590) detects the transfer of asset a (4570) through repeatedly querying or scraping (4503) a state of asset contract A1 (4530) in chain A (4510) and determining that ownership of asset a (4570) has changed from address M (4560) to address N (4565).

Subsequently, the bridging component (4590) sends a transaction (4504) to an asset contract 1 (4540) on chain B (4520) requesting transfer of a mirror token to asset a (4570), namely asset b (4580) from address M (4560) to address N (4565).

The bridging component (4560) may obtain the authority to submit transaction 4504 and reliably have asset contract 1 (4540) act on the transaction through:

signing transaction 4504 with a private key corresponding to a public key recorded as owner of asset contract 1 (4540), ensuring transaction (4540) comprises some or all of transaction (4501), staking assets in asset contract 1 (4540) or some other staking contract, whereby submitting an invalid transaction results in said staked assets being forfeited, or through some other method.

Finally, asset contract 1 (4540) may act on transaction 4504 and transfer ownership of asset b (4580) from address M (4560) to address N (4565), as indicated by transaction 4505.

Those skilled in the art will appreciate that FIG. 45 and the method described above may be conducted with chain A (4510) and chain B (4520), asset contract A1 (4530) and asset contract 1 (4540), and asset a (4570) and asset b (4580) swapped. That is, the bridging component may equally ensure that if asset b (4580) is transferred, asset a (4570) is equivalently transferred.

For the case where the two blockchains are not isomorphic or homomorphic, either in address schemes used or in the virtual machine use to run or programming language used to generate compiled code for smart contracts, in one possible embodiment a bridging component may be used to detect changes made to one token on one chain, and then trigger equivalent changes on the second chain.

In some embodiments, such a bridging component may be centralized, for example, it may comprise components running on a centralized server. The bridging component may, in one embodiment, scan a first blockchain, detect a change in a state of a token on the first blockchain, and may submit a transaction to a second blockchain to effect a similar change in state of a mirror token on the second blockchain.

In other embodiments, such a bridging component may be decentralized, for example, it may comprise a pair of smart contracts, with a first smart contract of the pair running on a first blockchain, and a second smart contract of the pair running on the second blockchain, with each smart contract monitoring changes in mirror token assets. In some embodiments changes may be monitored through registration or transferal of ownership of the mirror token assets to the smart contracts on the respective blockchains. Components external to the blockchain, optionally run by third parties, may detect changes in the first smart contract and may communicate such changes to the second smart contract, and vice versa. Such components may be operated by parties independent from the first smart contract, the second smart contract, and the mirror token assets, and may be incentivized to only submit valid changes detected between the blockchains through incentivization schemes comprising one or more of: rewards in the form of digital assets or other assets for reporting changes correctly, and slashing of a stake for reporting changes incorrectly or maliciously. Correctness of changes reported may be determined through a comparison of changes reported, with incorrectness determined through a contradiction between a majority of the third parties reporting a first change, and a minority of the third parties reporting a second change.

Mirror Wrapped Token

In some embodiments a first asset token on one chain may be "wrapped", that is, ownership of the first token may be transferred to a smart contract, with a first wrapped token instantiated in the smart contract and ownership of the first wrapped token representing ownership of the first token, and with the first asset token being redeemable from the smart contract by returning the wrapped token to the smart contract. The wrapped token may, in some embodiments, provide extra features or functionality for authorizing actions upon the wrapped token by a non-owner, which may be a smart contract. In other embodiments, the wrapped token may provide a limited subset of the features and functionality provided by the first asset token.

Bridging components may detect an issuance of such a wrapped token, and may subsequently cause a second smart contract on a second blockchain to issue a mirror wrapped token. In some embodiments, this may occur without an underlying second asset token ever being issued. Actions undertaken on or with the first wrapped token may trigger corresponding actions on or with the second mirror wrapped token, and vice versa.

Figure 46:
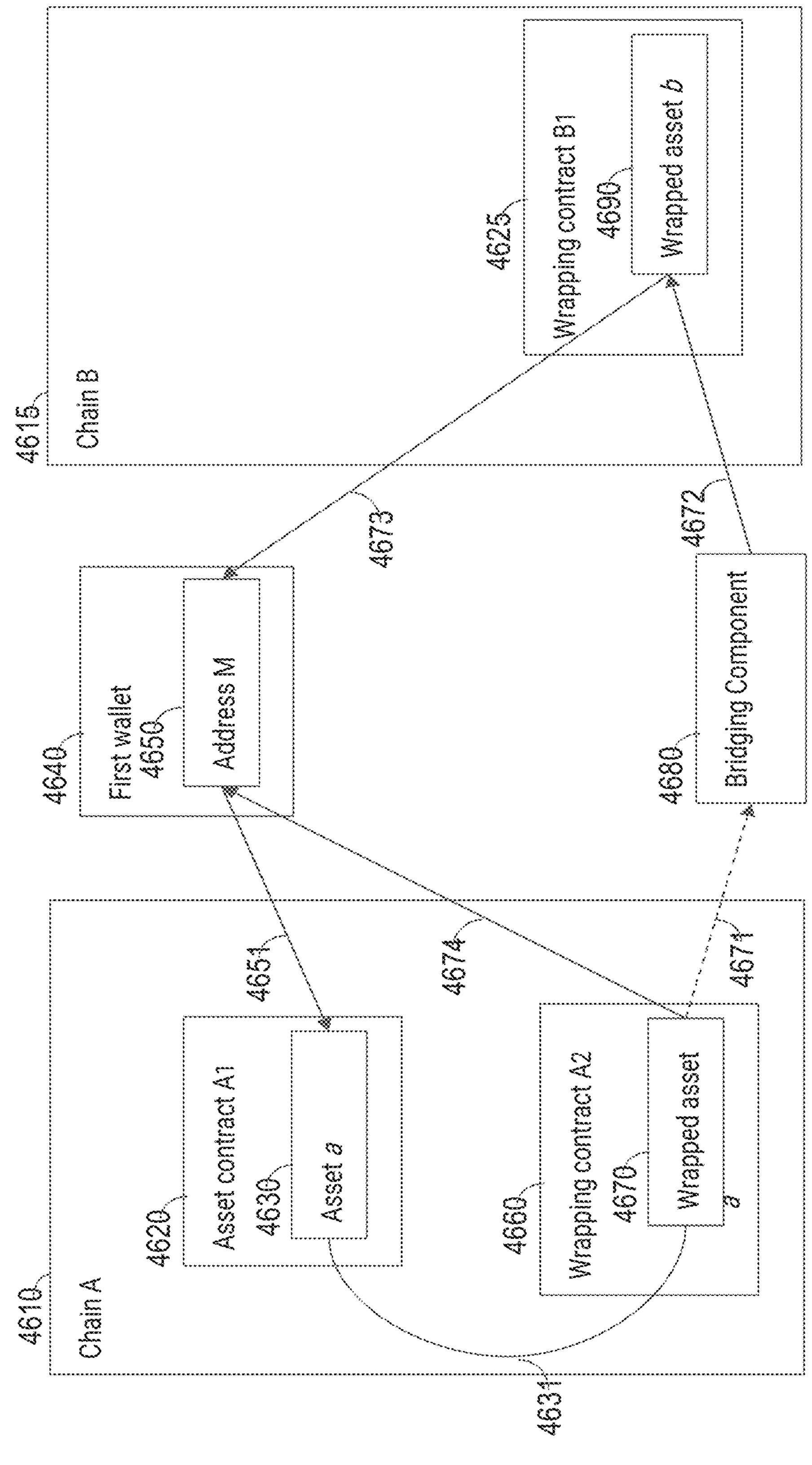
FIG. 46 illustrates a possible embodiment of mirror wrapped tokens in accordance with an embodiment of the invention.

FIG. 46 presents a possible embodiment of mirror wrapped tokens.

Two chains, chain A (4610) and chain B (4615) may be used for the deployment of smart contracts. On chain A (4610) a digital asset a (4630) may be instantiated by an asset contract A1 (4620) and ownership of said digital asset a (4630) may be recorded in the asset contract A1 (4620) against an address M (4650). A first wallet (4640) may comprise a private key from which address M (4650) may be derived.

The first wallet (4640) may assign ownership (4631) of asset a (4630) to an asset wrapping contract A2 (4660) through a transaction (4651) signed by address M (4650). The first wallet (4640) may subsequently receive a wrapped asset a (4670) in return, with ownership assigned to address M (4650) as indicated by transaction notification 4674. In an embodiment, asset a (4630) may be redeemed by the first wallet (4640) at any time by transferring wrapped asset a (4670) to the wrapping contract A2 (4660), as is known to those skilled in the art of wrapped tokens.

A bridging component (4680) may monitor wrapping contract A2 (4660) on chain A (4610), and on detecting an issuance of wrapped asset a (4670), as indicated by 4671, may submit a transaction to a second wrapping contract B1 (4625) on chain B (4615) to issue a mirror wrapped asset b (4690). In an embodiment relating to address isomorphic chains, wrapping contract B1 (4625) may record ownership of wrapped asset b (4690) against the same address as wrapped asset a (4670), namely address M (4650), through action 4673. In an alternate embodiment relating to address homomorphic and address non-homomorphic chains, the address to register wrapped asset b (4690) may be determined in some other way, as is discussed below in the section "Mirror address registries".

In one embodiment, a token is mirrored between two chains for reasons of control. One of the chains is controlled by a watchful bridge entity, where the watchful bridge can eliminate entries, modify entries, and transfer entries between chains and portions of a chain. Watchful bridging is disclosed in U.S. patent application Ser. No. 17/810,741 entitled "Systems and Method for Providing Security Against Deception and Abuse in Distributed and Tokenized Environments" by Jakobsson et al., which is herein incorporated by reference in its entirety.

While the watchful bridge in said application applied a filter when bridging between two chains, such as from a level-2 (L2) chain to a level-1 (L1) chain, it can also be applied to filtering within one and the same chain, as described in the context of the disclosed delay functionality within a chain (such as an L2 chain); this delay functionality can be combined with filtering, e.g., modification. This enables the control over one component of the mirrored token. The other component may reside on another chain. In case of some state discrepancies, such as in terms of content reference and ownership in the context of reversal (but not arbitrary assignment), the chain with the watchful entity would control, whereas in of other state discrepancies (such as ownership outside the context of reversal of a transaction for change of ownership), the other chain may control.

Mirror Address Registries

In some embodiments, a registry may be used to record matching mirror addresses for externally owned accounts and smart contracts. The registry may be implemented in a centralized database running on a server, external to any blockchain, or it may be implemented on the parent chain, or the secondary chain, or some other blockchain.

The registry may comprise a registry list comprising two columns, in which a first column contains addresses for the parent chain and a second column contains matching mirror addresses for the secondary chain. Registering an address and corresponding mirror address may require cryptographic evidence as described above in this disclosure, before an entry may be made. In an embodiment using a centralized database, a third party may validate a proposed entry before adding or refusing to add the entry to the database. In an embodiment using a smart contract on the parent chain, the secondary chain, and/or some other blockchain, the cryptographic evidence may be provided in a standardized format verifiable by the smart contract, and the registry list may comprise a third column for storing the cryptographic evidence or a result derived from the cryptographic evidence, for example, a zero-knowledge proof.

In some embodiments, a smart contract on a secondary chain receiving a transaction comprising a transfer request from a first address to a second address for a token may delay acting on the transaction until confirmation is received that the first address is not a mirror address. If the first address is a mirror address, the smart contract may delay acting on the transaction until confirmation is received, by for example a bridging component, that a corresponding transaction from the first address to the second address has completed on the parent chain.

Figure 47A:
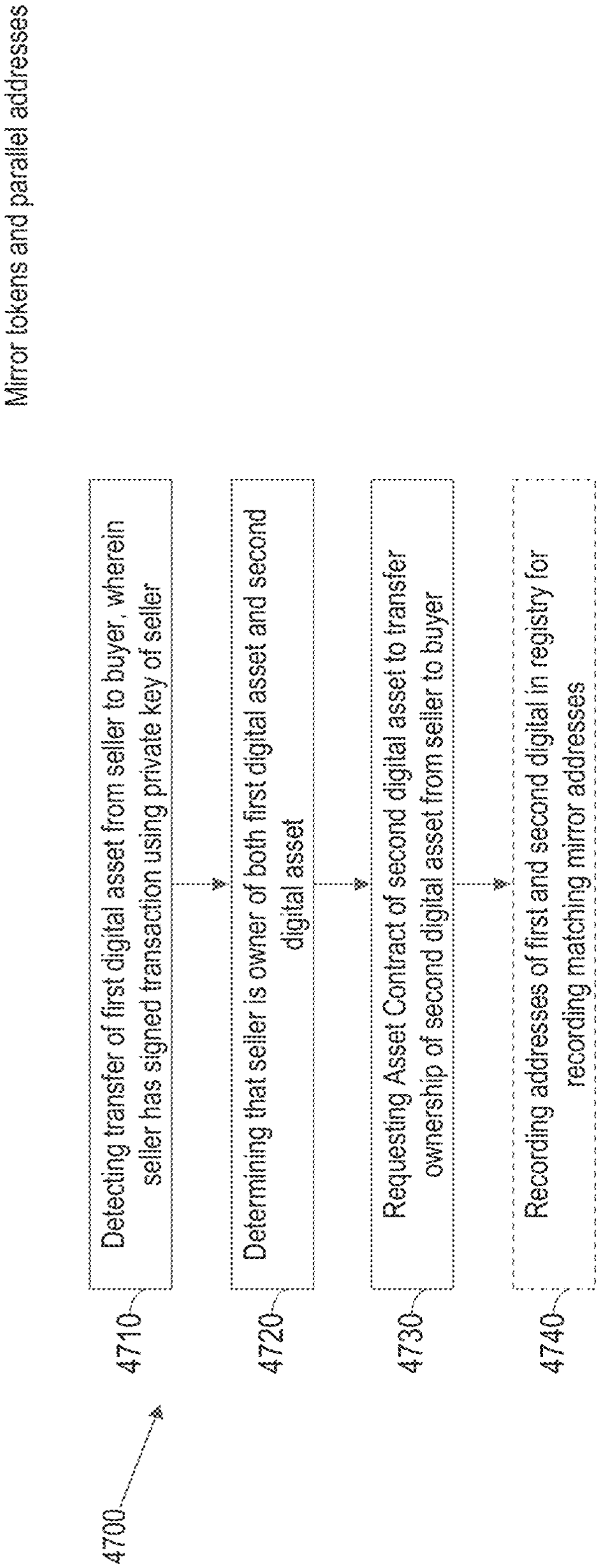
FIGS. 47A-47B illustrate a flowchart of an exemplified embodiment of a method performed by an entity, such as a bridging component, for transferring ownership of a first digital asset, such as a first token, and a second digital asset, such as a second token, being a copy of the first digital asset, wherein the first digital asset is recorded on a first blockchain and the second digital asset is recorded on a second blockchain, and wherein the ownership of the digital assets is indicated by an address associated with the seller in accordance with an embodiment of the invention.

FIG. 47A is a flowchart of an exemplified embodiment of a method performed by an entity, such as a bridging component, for transferring ownership of a first digital asset, such as a first token, and a second digital asset, such as a second token, being a copy of the first digital asset, wherein the first digital asset is recorded on a first blockchain and the second digital asset is recorded on a second blockchain, and wherein the ownership of the digital assets is indicated by an address associated with the seller. FIG. 47A illustrates the method comprising a step 4710 of detecting a transfer of the first digital asset from a seller to a buyer, wherein the seller has signed a transaction using a private key of the seller; and a step 4720 of determining that the seller is the owner of both the first digital asset and the second digital asset. FIG. 47A also illustrates the method 4700 comprising a step 4730 of requesting an Asset Contract of the second digital asset to transfer ownership of the second digital asset from the seller to the buyer. The entity thus ensures that both digital assets belong to the same owner before a transfer of ownership of both digital assets is performed.

Figure 47B:
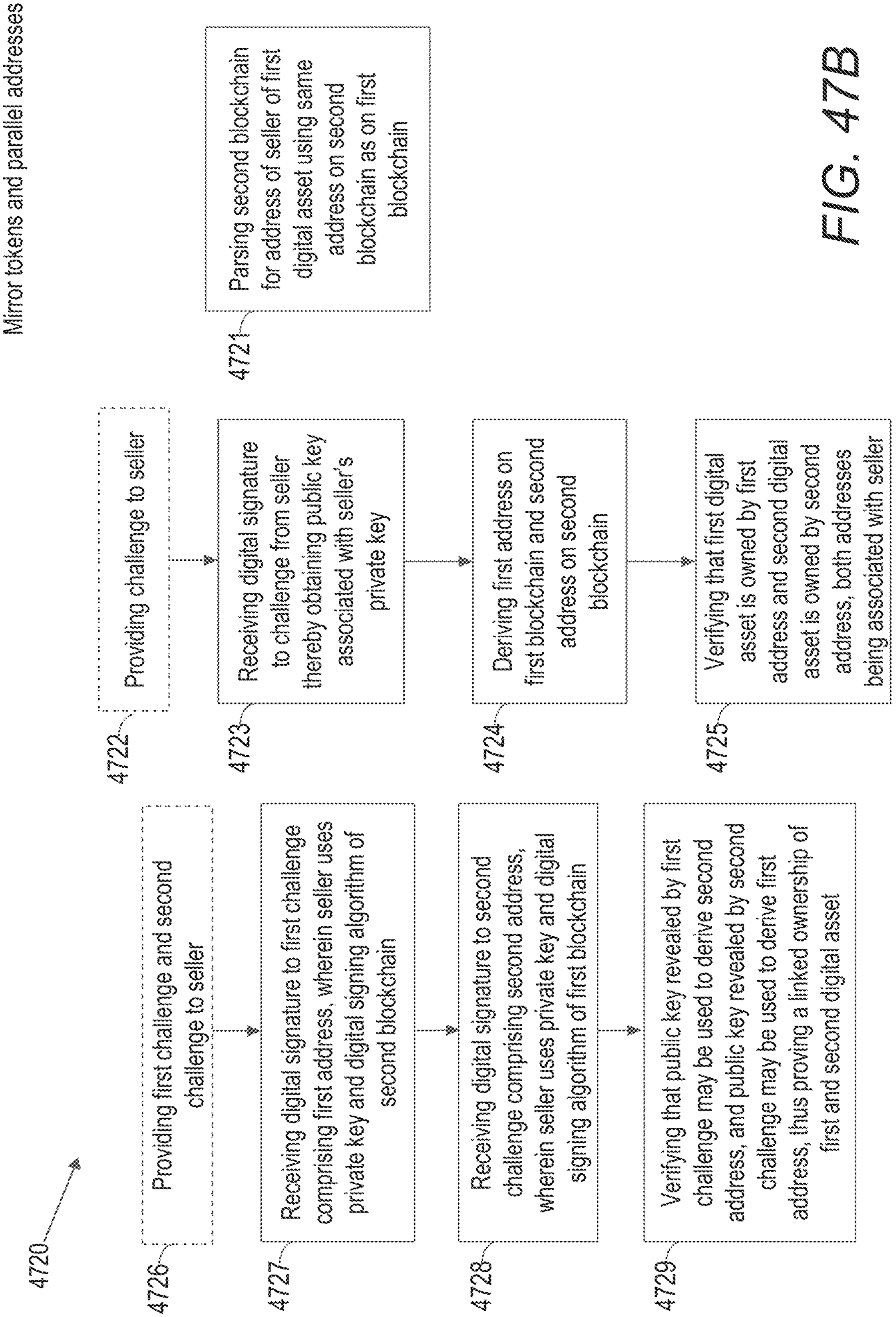

FIG. 47B is a flowchart of different exemplifying embodiments of the step 4720 of determining that the seller is the owner of both the first digital asset and the second digital asset. In one example, the first blockchain and the second blockchain use the same digital signing algorithm and address schema wherein any private key on the parent chain derives the same address on the secondary chain. This is also referred to above as address isomorphic. In such a case determining 4720 that the seller is the owner of both the first digital asset and the second digital asset comprises parsing (4721) the second blockchain for an address of the seller of the first digital asset using the same address on the second blockchain as on the first blockchain.

In another example illustrated in FIG. 47B, the first blockchain and the second blockchain use the same digital signing algorithm, but a different address schema wherein a private key derives different addresses on the parent chain and the secondary chain. This is also referred to above as address homomorphic. In this example determining 4720 that the seller is the owner of both the first digital asset and the second digital asset comprises a step 4723 of receiving a digital signature to a challenge from the seller thereby obtaining a public key associated with the seller's private key; and a step 4724 of deriving a first address on the first blockchain and a second address on the second blockchain. FIG. 47B also illustrates this example comprising a step 4725 of verifying that the first digital asset is owned by the first address and the second digital asset is owned by the second address, both addresses being associated with the seller. Still further, FIG. 47B illustrates an optional step 4722 of providing the challenge to the seller.

FIG. 47B also illustrates an example in which the first blockchain and the second blockchain use a different digital signing algorithm, and a different address schema wherein there may be no correspondence between digital signing algorithms and address generation schemes used by the two blockchains. This is referred to above as address non-homomorphic. FIG. 47B illustrates an example wherein determining 4720 that the seller is the owner of both the first digital asset and the second digital asset comprises a step 4727 of receiving a digital signature to a first challenge comprising a first address, wherein the seller uses the private key and the digital signing algorithm of the second blockchain; and a step 4728 of receiving a digital signature to a second challenge comprising a second address, wherein the seller uses the private key and the digital signing algorithm of the first blockchain. FIG. 47B also illustrates this example comprising a step 4729 of verifying that a public key revealed by the first challenge may be used to derive the second address, and a public key revealed by the second challenge may be used to derive the first address, thus proving a linked ownership of the first and the second digital asset. FIG. 47B illustrates an optional step 4726 of providing the first challenge and the second challenge to the seller.

Figure 48:
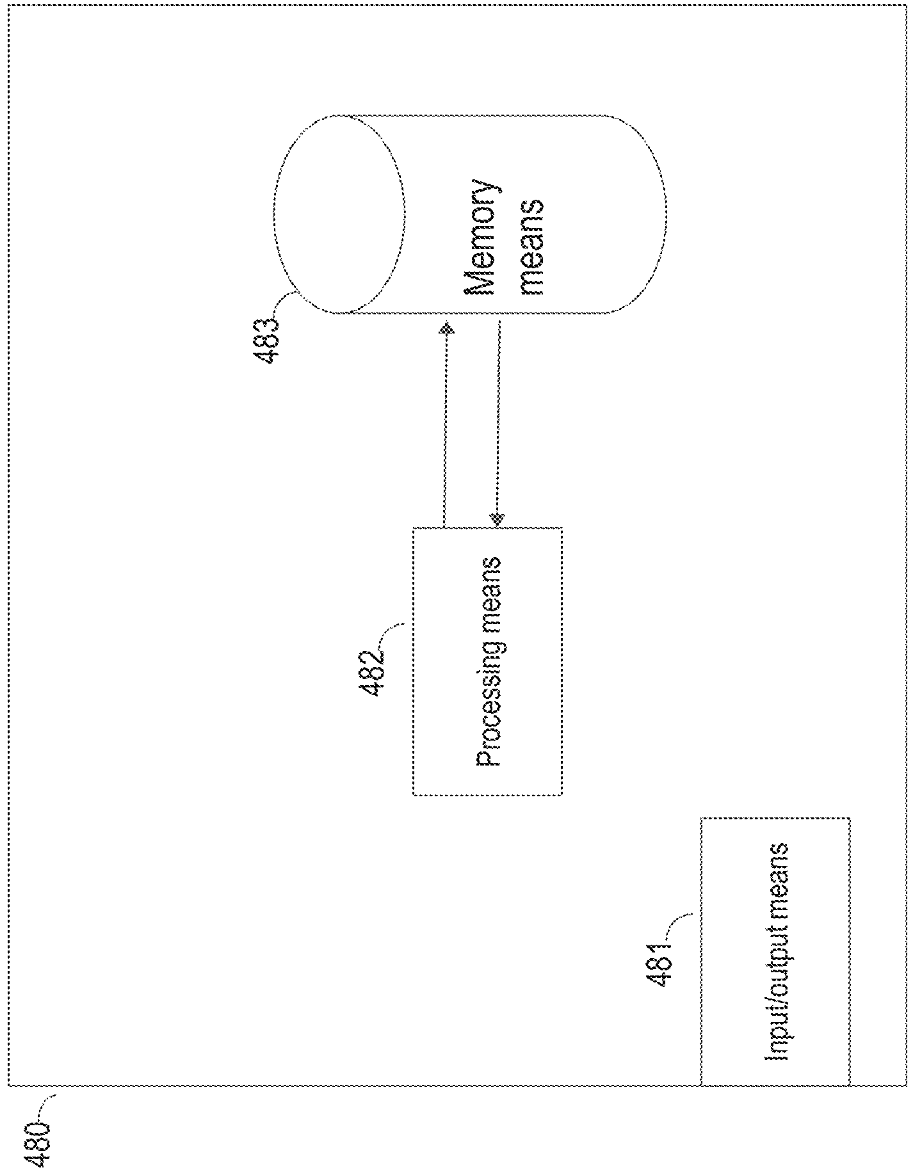
FIG. 48 illustrates a block diagram of an exemplifying embodiment of an entity 480, such as a bridging component, for transferring ownership of a first digital asset, such as a first token, and a second digital asset, such as a second token, being a copy of the first digital asset, wherein the first digital asset is recorded on a first blockchain and the second digital asset is recorded on a second blockchain, and wherein the ownership of the digital assets is indicated by an address associated with the seller in accordance with an embodiment of the invention.

FIG. 48 is a block diagram of an exemplifying embodiment of an entity 480, such as a bridging component, for transferring ownership of a first digital asset, such as a first token, and a second digital asset, such as a second token, being a copy of the first digital asset, wherein the first digital asset is recorded on a first blockchain and the second digital asset is recorded on a second blockchain, and wherein the ownership of the digital assets is indicated by an address associated with the seller. The entity 480 is illustrated comprising input/output means 481 by means of which the entity 480 may receive information and transmit or provide information to other units, devices and/or entities. FIG. 48 also illustrates the entity 480 comprising processing means 482 and memory means 483, the memory means 483 comprising instructions, which when executed by the processing means 482 causes the entity 480 to perform the method described herein.

Cross-Device Digital Rights Management

A common type of abuse of owners of non-fungible tokens (NFTs) and crypto funds involve the planting of malicious code on a device or application used by the victim. For example, a common attack involves a malicious browser plugin or malware on a laptop computer used by the victim, where the user is instructing a marketplace to perform a first transaction (e.g., buy an NFT for $5) with a second transaction (e.g., transfer a crypto token to the attacker at no cost). Whereas, in theory, a solution is for users to only use dedicated safe devices to transact with, this is not a practical solution. The dedicated safe devices may, for example, have no screen, or a very small screen, making it impractical for a user to employ them for making purchases or sales. Connecting the dedicated safe device to an untrusted device, such as a laptop with a malicious browser plugin, does not solve the problem, as it is sufficient for the attack to replace instructions in one of the two locations. The problem is further exacerbated by the general lack of knowledge and experience that users have with distributed ledger technologies and the broad range of potential threats.

One aspect of the disclosed technology is a first digital rights management (DRM) module associated with a first device, where the first device is used for output of data. For example, the first device may have a speaker, a printer, or a monitor on which data is output. The first DRM module is associated with a key that enables encryption of data for it, where such encrypted data can be sent over a communication channel to the first device, and then conveyed to the first DRM module where it is decrypted. The first DRM module is also associated with an address, which may be the address identifying the first device on which it resides, which may be a monitor, a speaker, a printer or a computer being connected to or having integrated one of a monitor, a speaker or a printer. We refer to this address as the address of the first DRM module, The address may also be the public key of the first DRM module, e.g., in a case in which identity-based encryption (IBE) is used, and where the address of the DRM module may be a serial number, for example. In some embodiments, the address may be a public key, which may be certified by an authority, and wherein the certification attests to the validity of the DRM module. One form of a DRM module is a software unit that is constructed to protect itself against being modified, e.g., using checksums on the code that are computed and used to offset variables computed, thus causing incorrect variable assignments if the code is modified. Another type of DRM unit uses virus detection methods to determine whether the module has been attacked. DRM units may also use remote attestation techniques to verify a secure state. DRM modules may also comprise software running in a trusted execution environment (TEE), where the software is verified not to be manipulated using a secure boot process. Various methods of creating DRM modules, such as these, can also be combined with each other.

The first device may have multiple DRM units, and may also be associated with a second DRM module that, like the first DRM module, is cryptographically enabled. The second DRM module may be associated with an input element, such as a keyboard, a mouse, a joystick, a camera, a microphone or a biometric reader.

The first DRM module is capable of receiving encrypted data, decrypt it using a key that is not accessible to general processes of the first device, and then cause the display of the data that resulted from the decryption on at least one of the output elements, such as a monitor, i.e., a screen. The first DRM module may convey the data to the output element without the interception of this data by an application executing on the first device. This may be achieved by designated physical pathways, encrypted tunnels, or controls put in place on the operating system level or using TrustZone™ or similar technologies. The communication channel between the first DRM module and the output element may be managed using encryption using another encryption and decryption key than what is used to convey encrypted data from other devices to the first DRM module. The first DRM module may also be physically part of the output element to which it conveys data, or directly connected to the same by a dedicated bus, e.g., executing on a Graphics Processing Unit (GPU) that outputs data on a bus connected to the display. Similarly, the second DRM module, which is optional, may be connected in a similar manner to its associated input element, such as a keyboard.

The first DRM module is capable of performing a key exchange process or participating in a key delivery process with an external entity, as is the second DRM module. The key exchange may be part of a pairing process in which a DRM module associated with the first device is bonded with a process on a second device. The pairing process, in turn, may utilize physical distance bounding methods, to ascertain that the pairing is not performed with a remote device, e.g., using a man-in-the-middle attack. Distance bounding protocols were disclosed in the 1993 publication titled "Distance-Bounding Protocols" by Stefan Brands and David Chaum. Many versions of those protocols have been developed, and can be used herein.

A second device may be a secure device, e.g., running secure code in a trusted execution environment (TEE). It may also be a device that has a secure enclave or a secure partition such as TrustZone, or otherwise implements a secure execution area. One such approach involves the use of verification of the execution environment by a third party, e.g., using software based attestation. One method of performing software-based attestation is disclosed in M. Jakobsson, "Secure Remote Attestation", available at https://eprint.iacr.org/2018/031.pdf, also see U.S. Pat. No. 10,747,878.

The second device may also be a device with similar capabilities as the first device, e.g., a peer device. The first device and/or the second device may further be a service provider, a content distributor, a consumer device such as a wallet, a marketplace server, etc. These are non-limiting illustrative examples of the roles of the devices, which we may also refer to as entities as each may be represented by a plurality of distinct but collaborating physical units; these are also collectively referred to as devices in the context of this disclosure.

In one illustrative embodiment, we refer to the first device here as the I/O device (input/output device), as it is associated with at least one of an output device (such as a screen) or an input device (such as a keyboard), and optionally both. We refer to the second device here as the wallet device. The wallet device comprises storage used to store a state associated with a wallet, where this state may reference or store data related to crypto payments, non-fungible tokens (NFTs), usage data related to either, as well as personal data such as transaction data, including web browsing data and personal information identifying preferences of one or more wallet users. The wallet device typically has limited I/O capabilities, e.g., it may not have a large screen. On the other hand, the I/O device typically has a much higher risk for being affected by malicious code, including malware and malicious browser plugins, and may be physically exposed to risks that the wallet may not be, e.g., be publicly visible to a much greater extent than the wallet device is.

The I/O device and the wallet device may be paired as described above, where the pairing comprises a phase in which a communication connection is established, a key exchange or a key transport phase, and an optional distance-bounding phase. An I/O device may establish multiple pairings with wallet devices, and a wallet device may establish multiple pairings with I/O devices. Data related to these pairings may be stored in at least one of the two endpoint devices for reasons of practicality, to avoid forcing a user to repeat the pairing process each time the user wishes to use the I/O device and the wallet device in conjunction. Pairing may involve the physical connection using a cord, or the establishment of a wireless connection, e.g., Bluetooth, BLE, NFC, or other wireless technologies. Pairing may optionally involve multiple connections, for example, both Bluetooth and a wired connection, or any combination of pairings listed in the previous sentence.

In one example use situation, an I/O device is paired with a wallet device using NFC or BLE, which are both examples of short-range wireless communication protocols. An input element of the I/O device is used to provide selections of actions executed by the wallet device, and an output element of the I/O device is used to provide a corresponding output based on the selected action. In one use situation, only the output device of the I/O device is protected by a DRM module, which is then connected to a process running on the wallet device. Optionally, an input device of the I/O device is also connected to the wallet device and the corresponding process.

In one example use situation, a wallet comprises a token that indicates that an owner of the token has the right to drive a car. The wallet receives an indication that a user corresponds to the owner of the token, e.g., using a biometric authentication associated with a biometric token. The wallet then transmits an enablement signal to a paired vehicle, assuming the vehicle matches the restrictions of the drivers license, i.e., the user is allowed to drive a vehicle of that type. Multiple enablement signals may be required to start the car. For example, it is not enough to have a driver's license to drive a car, but one must also be authorized to drive a given car, i.e., be the owner or having rented the car. This may correspond to a second enablement signal received from a wallet (which may be the same wallet as transmitted the first enablement signal corresponding to the user having a driver's license.) Alternatively, the wallet may determine that the user is both authorized to drive the particular car, and has the right to drive cars of that type, and send an enablement signal indicating that both these conditions are satisfied. In this example, a DRM module may be associated with the car, determining that the enablement signal is sent from a certified wallet, where the sending wallet may also comprise a DRM module which may perform the verification of the underlying requirements, which may be based on ownership of tokens, interactions with tokens (such as authentication to a biometric token), and other verifications, such as verifications of the user being sober, e.g., based on signals received from sensors associated with wearable computers.

In one embodiment, a first DRM module generates a list comprising descriptors of content it has received, and information about the providing modules, as well as a list comprising descriptors of content it has provided to other modules, as well as information about to what modules the content was provided. If two associated DRM modules produce such lists, these two lists should align in terms of the content that was provided by one of the modules to the other. For example, one of the modules may be incorporated in a phone, and the other module may be a monitor onto which content from the phone can be displayed. Any content that is sent by the phone to the monitor will be recorded by the phone as content being provided to the monitor, and by the monitor as being provided by the phone. If both the lists were reported to a trusted third party, this trusted third party would be able to determine discrepancies, such as the phone not reporting content being conveyed to the monitor. Such discrepancies may be due to errors, or intentional misconfigurations, e.g., for the purpose of avoiding having to pay usage fees, such as royalties, subscription fees, etc. Discrepancies may also be due to attempts to suppress the expiration of content, e.g., content that can be played only once, content that can be played any number of times within a 48 h period of the first viewing but not thereafter, or content that has been pirated and may not be watched at all. Discrepancies may also be indicative of a presence of a virus, trojan, or other unwanted and unauthorized software. A trusted third party may receive batches of these lists and determine discrepancies, and based on the type or quantity of anomaly report such discrepancies. The trusted third party may erase the received lists after such analysis, and only report errors and likely abuse, where errors may be reported to a user of the DRM module appearing to be misconfigured and likely abuse reported to content originators, law enforcement or organizations representing content providers. In some instances, the trusted third party may also profile the accounts associated with some of the DRM modules in order to provide recommendations to the associated users, or to provide anonymized usage statistics to advertisers, potentially having some demographic information along with the data about what content is being consumed by the users of the associated devices. This may enable advertisers to determine trends, identify correlations of preferences, and to perform recommendations without having access to the lists of individual modules, or the associated user accounts. A user may select a preferred trusted third party from a list of available trusted third parties upon registration of an account or configuration of a wallet. A first DRM module may be associated with a first trusted third party while a second DRM module may be associated with a second trusted third party, where if the first DRM module sends content to the second DRM module, this will result in some data being reported to the first trusted third party whereas other (and associated) data being reported to the second trusted third party. The association between DRM module and trusted third party entity may be publicly observable, e.g., readable from a database in which these relationships are recorded. These two trusted third parties will be able to determine each other's identities, after which they can determine whether the relevant list items received are matched or not. This can be performed using a so-called socialist millionaires' protocol, but could also be performed by exchanged entries that may be, in part, obfuscated, e.g., using cryptographic hashing, or which may be in cleartext. The socialist millionaires' problem is described in "Proving without knowing: On oblivious, agnostic and blindfolded provers" by Markus Jakobsson and Moti Yung, published in Crypto '96.

In another embodiment, a process in a first environment associated with a device performs one or more actions related to some content, where the first environment may be a DRM implemented in software and running on an application processor. The process reports a list of transactions related to other entities, which may be internal to the same device as the first environment, and wherein these other entities may be DRMs. This report is conveyed to a process running in a second environment of the device, where the second environment may be a TEE, or a DRM that is more secure than the first environment, or a DRM process managed by another entity than what manages the process in the first environment. The process in the second environment also optionally receives reports from other entities, such as an entity receiving data from the process in the first environment; an example of such an entity is a display or a speaker associated with the device comprising the first environment. The process of the second environment alternatively can access a bus or other communication link between the first environment and the entity receiving data from the process in the first environment. Based on the received data, the process in the second environment determines whether there are likely anomalies, e.g., under-reporting of data by the process in the first environment. If so, the process of the second environment may attempt to communicate an alert with an external entity, such as a watchdog entity, or to refuse to collaborate with the process of the first entity. The process of the second environment may be in charge of decrypting data for the process of the first environment, so a refusal to cooperate would lead to a failure for the process of the first environment to receive data. The second environment may be TrustZone, for example, or a process integrated with an anti-virus program. The first environment and the second environment may correspond to different software environments in the same physical environment; they may correspond to different virtual environments residing on the same hardware, but having different privileges; or they may correspond to physical environments that are not the same, although they may overlap.

The reporting of lists may be probabilistic, meaning that only randomly selected elements (e.g., using a given pseudo-random selection algorithm) would be reported, or all content that is received or conveyed may be reported. The reporting may also be in response to requests from the trusted third parties, which may poll DRM modules according to a risk-weighted method in which modules associated with higher risks are polled with a greater frequency or likelihood, and wherein the risk may be estimated based on the brand of the DRM module, past usage statistics reported by it, past anomalies identified for the DRM module, demographic risk information, or based on the type of content that is being handled by the DRM module, including its value and its historical exposure to abuse.

In one embodiment, a DRM module also plays the role of being a trusted third party. Some DRM modules may report lists to multiple trusted third parties. If there are inconsistencies in terms of what such trusted third parties report to authorities or other trusted third parties, this is indicative of failure or abuse of said trusted third parties. Thus, the detection methods described for processing of content, such as movies and music, also apply to content that comprises the lists used for reporting of processing of other content.

In one embodiment, anomaly detection is performed using an artificial intelligence (AI) or machine learning (ML) component is used to detect anomalies from samples of lists. Such an approach may use, for instance, a supervised learning algorithm trained to discriminate anomalous from non-anomalous phenomena, or an unsupervised learning algorithm to detect deviations from expected patterns. Algorithms such as neural networks, k-nearest-neighbor, support vector machines, DBSCAN, and others can be used for such purposes. Such a machine-learning approach may employ a classifier, which in a simple case may classify lists, list elements, or data derived from lists as anomalous or not. Or, a probabilistic classifier may output an estimate of the probability that a phenomenon is anomalous. Or, a model may employ classification, regression, or probabilistic modeling to assess the level of risk associated with a sample. The output of such an AI or ML component may be used on its own to make a determination of anomalous phenomena, or it may be used to inform further processing.

Two or more entities can communicate with each other, e.g., to transfer ownership rights, access rights, to request content, to request modifications of content, to request changes of rights, and more. Some digital containers, such as NFTs, may require a pre-specified security level to be established for content to be accessed, owned, shared, rented out, etc. This level of security relates to the party or parties gaining or having access to the content or the digital container comprising the content. Examples of content include but is not limited to: entertainment data such as movies, music, written material; promotional material such as advertisements, discount coupons, tokens with royalty conditions associated with access actions, and more; executable material, including smart contracts; access controls, whether for digital material or physical resources; and identity-imbued tokens such as biometric tokens that tie a personal characteristic with a digital assertion such as a public key. The transfer of content may be conditional on one or more of the parties in communication with each other satisfying one or more requirements relating to protection of content. For example, there may be rules stating that content can only be accessed by a computational entity that is associated with a specified digital rights management (DRM) level, such as the computational entity matching a specified standard, having a specified type and a version number that is higher than a threshold number, or being certified by a trusted party such as a certification authority that is recognized by the party making the security determination. Another condition may relate to the recipient of access or data being a computational module running in a pre-specified type of trusted execution environment (TEE), or a TEE that meets a pre-specified certification level. These verifications of compliance may be performed by verifying authenticated messages, e.g., digitally signed messages, where the digital signatures correspond to a public key that is certified by a trusted entity. Another method of implementing such an assurance is to make the key management functionality comprised in the secure environment, such as the DRM or TEE, e.g., by means of a public key used for key establishment being certified by a trusted authority, such as a certificate authority that is trusted. Any asymmetric or symmetric key that is derived using such a public key, or related data, is understood to be securely managed by virtue of being controlled by the secure environment, thereby enabling the establishment of secure channels using said key or keys, or the establishment of encrypted channels using the said key or keys. A secure channel is an encrypted and authenticated channel. The verification of requests to come from secure environments, and/or the use of channels that are secured using keys derived in or protected by secure environments enables communicating parties to ascertain that data is only shared with entities with sufficient security levels.

Two computational entities may be configured to share information related to one account, e.g., of an account holder with a given public key or other identifier. This may be initiated by a user performing a pairing request between the two devices. The pairing request may result in a verification of the two devices being in physical proximity, e.g., using a distance bounding protocol such as the one disclosed in "Distance-Bounding Protocols" by Brands and Chaum, published at Eurocrypt '93; it may also result in a verification, at least by one of the devices of the other, of the verified device being compliant with a minimum requirement associated with the verifying device, the user configurations of the account holder, or of the wallet or other application on the verifying device. Examples of minimum requirements include but are not limited to having a TEE of a specified type, having a DRM of a specified type, having installed security software such as anti-virus (AV) software of a specified type, or passing a remote attestation verification of a specified type. An example of a remote attestation method is disclosed in "Secure Remote Attestation" by Markus Jakobsson, available at https://eprint.iacr.org/2018/031, and incorporated by reference. The verification may also comprise receiving a digital signature generated by a trusted party, asserting that the verified device complies with one or more requirements. Similarly, three or more computational entities may be connected to share information in the same manner, whether in a pairwise manner or all three or more communicating in a verification process. An example of a context in which a computational entity, such as a hotel TV screen, is paired with a personal device such as a smartphone, may be limited in time, e.g., set up to expire as the user checks out. In other examples, such as a user pairing a headset with a smartphone, the pairing does not have an associated expiration date, but may be ended by a request performed by one or more of the devices being paired, e.g., in response to a user input requesting the termination of the pairing.

The conditions on devices with access to a given digital container, such as an NFT, may be expressed by the digital container, e.g., in a rule field, or using a reference to an external rule field. The rule field may comprise one or more conditions that need to be satisfied for a given computational device or computational environment to be given access to some element associated with the digital container, e.g., to gain access to plaintext content associated with the digital container. This may be controlled, e.g., by key management solutions that convey necessary cryptographic keys to devices with access permission; it may also be controlled using access control lists (ACLs) that are read by DRM environments, such as a DRM environment of a device with access to the content, prior to transmission of the content to a second entity verified to be included in the ACL. The ACL can be stored in the digital container, or be referenced by the digital container and stored on a blockchain. It may be updated by a service provider associated with the digital container, e.g., the entity that minted an NFT.

In one embodiment, two entities are compatible with a set of rules associated with a digital container stored by one of the entities, or otherwise having access to the digital container and its content. We refer to that entity as the first entity. The other entity, which we refer to as the second entity, is evaluated to determine whether it is allowed to have access to the digital container and its content. This can be determined based on one or more sharing rules. A first sharing rule may indicate that two wallets owned by the same party, such as a user named Alice, may share the content either wallet can access between each other. A second rule may specify that a given digital container may be shared between two wallets associated by different people belonging to the same pre-registered collection, where a collection may be a family unit, an enterprise, a buyer's club, a library, etc. A third rule may specify that a given digital container may be shared to anybody within the same jurisdiction, but that a royalty payment has to be made before the sharing is enabled. The rule may specify the size of the royalty payment. Other conditions for sharing may be specified by the one or more rules, such as a requirement of actions having been taken by one or both of the entities. One example action is having watched a promotional video. Another example action is having provided demographic information associated with the user(s) of the wallet to a third party, potentially using an executable element or address that is part of the digital container to initiate the transport of such demographic information.

DRM modules may be comprised in wallets, browsers or filters performing compliance verification tasks, e.g., to block fraudulent transactions. Such applications may also be verified to be structurally sound by DRM units that are external to the applications and which perform validity checks on the applications, e.g., as these are started, at randomly selected time periods, or in response to high-sensitivity actions being initiated. One example of such an action is a transfer of ownership of or access rights related to a token, e.g., a cryptocoin or an NFT, or another digital container such as a rights management container.

Once two entities satisfying the requirements associated with the one or more rules, as described above, have completed the verification described above then data is exchanged over a secure channel. The secure channel can be set up in response to the satisfaction of the requirements, or before, as the two entities start communicating. The data exchanged may comprise keys used to access content, ACLs, instructions and certifications to be processed by DRMs, tokens, and/or addresses referencing the location of such information. In one embodiment, the data is both encrypted and authenticated as it is transmitted, and in another it is only encrypted. In contexts where the two entities are physically connected, e.g., using a cable, a bus by transfer of data using a portable storage device, such physical security may be used instead of a secure channel.

An entity, in the context of this disclosure, may be a token such as an non-fungible token (NFT). In U.S. Provisional Patent App. No. 63/365,269 titled "Directed Acyclic Token Structure" by Markus Jakobsson and filed on May 23, 2022, which is incorporated by reference herein in its entirety, tokens that can be assigned ownership of other tokens are disclosed. Such tokens that can own other tokens may be the entity in the context of this disclosure, potentially in combination with a physical machinery that stores and executes the code of the token. For example, a token may comprise or enable functionality that satisfies one or more rules, whether alone or in combination with the physical machinery that stores and executes the code of the token.

In one embodiment, a token is associated with one or more rules identifying conditions under which tracking needs to be performed. Such tracking, and conditions associated with tracking, is disclosed in U.S. patent application Ser. No. 18/176,920, entitled “Partitioned Address Spaces in Blockchain Wallets” by Jakobsson et al., which is herein incorporated by reference in its entirety. Generation of tracking data may be required by a rule associated with a token when one or more conditions are satisfied. An example condition may specify that tracking is required when a token is shared with an entity that is not belonging to the same organization as the entity initiating the sharing. The tracking may be used to create an audit log, or to generate alerts identifying when high-risk transactions are initiated or attempted to be performed.

Figure 49:
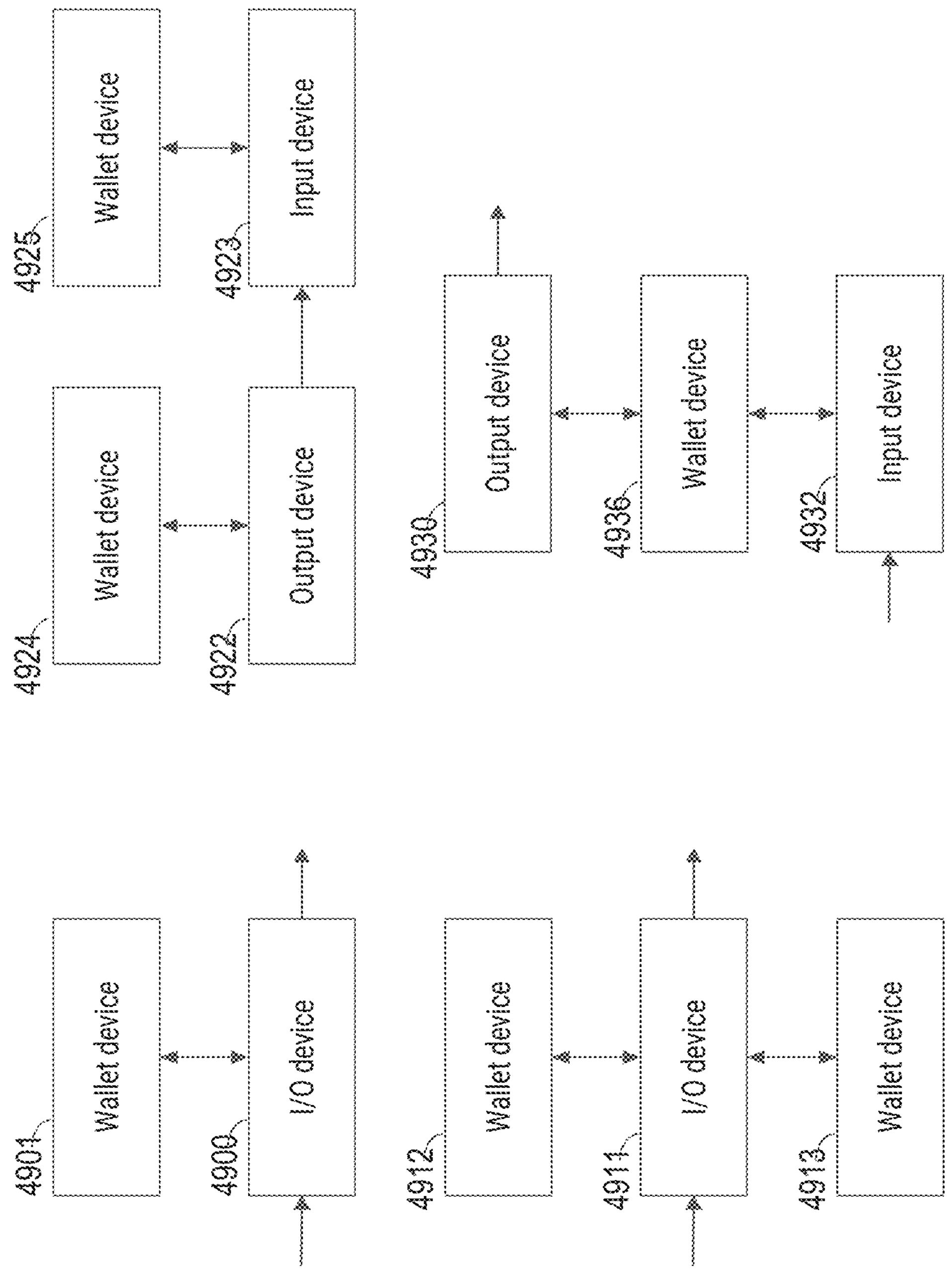
FIG. 49 illustrates possible arrangements for cross-device digital rights management in accordance with an embodiment of the invention.

In FIG. 49 various possible arrangements are presented.

In a first possible arrangement, a first wallet device (4901) may be associated with a first I/O device (4900), said first I/O device (4900) being capable of receiving input and displaying or otherwise transmitting output.

In a second possible arrangement, a second I/O device (4911) may be associated with a second wallet device (4912) and a third wallet device (4913).

In a third possible arrangement, a first output device (4922) may be associated with a fourth wallet device (4924), and a first input device (4923) may be associated with a fifth wallet device (4925).

In a fourth possible arrangement, a sixth wallet device (4936) may be associated with a second output device (4930) and a second input device (4932).

In the light of this disclosure, those skilled in the art will appreciate that many other arrangements are possible, and FIG. 49 is not presented as limiting in any way.

Another embodiment of relevance to digital rights management includes one or more ombudsmen, different ombudsmen representing the needs and rights of one or more parties. This is relevant in the context of mobile wallets, for example.

Increasingly, mobile devices will be used as wallets, exposing the owners or users of these devices to abuse in which the mobile device is stolen or obtained under the threat of violence, and wherein the attacker gains access to resources associated with the wallet by authenticating on behalf of the rightful user. This authentication may be using a device PIN that the attacker has obtained, e.g., by shoulder surfing or threat of violence, or using biometrics of the rightful user, whether this user is aware of the authentication or not.

To limit the risks associated with such attacks, a collection of countermeasures is introduced. Some of these are specific to fungible and non-fungible tokens stored in token wallets, whereas others can be applied to traditional functionality.

The introduction of the protective functionality can be made using a gateway that intercepts or otherwise processes traffic between the device and a portion of the Internet associated with the requested resource to be controlled. The functionality can also be implemented using an on-device proxy, e.g., a software agent that runs as middleware, a browser extension that filters actions, or a third party operating on the Internet, wherein this third party controls at least a portion of a key that is required for a transaction to be completed. We may collectively refer to the gateway, the on-device proxy or the third party as the ombudsman of the device. A device may be associated with multiple ombudsmen, where these may be connected in serial (causing them all to approve a transaction for this to go through) or in parallel (wherein at least one of them needs to approve the transaction for it to go through). In the case of multiple parallel ombudsmen, two or more of these may have the same capabilities with respect to a given type of transaction, or they may govern different types of transactions. For example, one ombudsman may handle all financial transactions exceeding $10 in value, whereas another one may process transactions that disclose a location to a third party.

In one embodiment, an ombudsman receives a request from a wallet and makes a determination whether to forward the request; to block the request; to hold the request; or to require additional security measures to be taken before forwarding the request. The holding of the request may, for example, cause a 12 hour delay (or another user-configurable time) before the request is forwarded to the party for which it was intended, or otherwise a 12 h delay of the completion of the request, e.g., by quarantining a response to the forwarded request or indicating to the recipient of the request that the request needs to be delayed. During this time, the user or an authorized representative would optionally be able to undo the request. The additional security measure may be step-up authentication, a user approval made from a whitelisted environment such as a pre-selected geolocation, etc. A delay can be combined with a security measure, e.g., by imposing a delay that may be cut short if the security measure is successfully completed. Another example security measure is the notification of a user, e.g., based on the type of the request or an associated value. For example, if a transfer of an amount exceeding $100 is made, then a notification may be generated. The party that is notified may be associated with the account owner associated with the request, be a registered admin or authority (such as a parent) of the account owner, or may be a tax authority associated with the account owner. Some ombudsmen may be configured to notify royalty earners of sales of relevance, where this notification action may be conditional on an indication associated with a token that is being transacted.

The disclosed technology applies to the protection of crypto wallets, which can be used to manage crypto funds and non-fungible tokens, as well as other data stored in public repositories, such as blockchains. Aspects of the disclosed technology also apply to protection of other types of resources, as will be evident to a person of skill in the art. For example, the disclosed technology can be used to control centrally managed functionality associated with mobile devices, e.g., by identifying requests to modify a state, such requests being made using a mobile device, and conditionally suppressing or delaying such requests based on a threat score, a user configuration or a combination of such. One such centrally managed capability is the feature used to find mobile devices, supported by an infrastructure of peer devices and other radio-enabled entities. In addition to suppressing or delaying modifications, the ombudsman may also initiate requests to make state modifications, e.g., for purposes of notifications in identified emergencies. This allows an augmentation of functionality, e.g., by adding multiple forms of notification to a product that otherwise only allows one form of notification.

The disclosed system can be combined with on-device digital rights management (DRM) technologies, e.g., to monitor the proper behavior or apparent functionality of the DRM units to alert rights holders or representatives thereof in situations where it appears that a DRM unit has been compromised and the associated device is used in a manner that is contradictory to the terms of service. The ombudsman may also operate a filter that blocks delivery of data or request based on non-compliance of DRM systems. Conversely, a DRM system may refuse to perform some actions in the absence of an approved ombudsman filtering the requests to and from the device with the DRM system. This enables a second line of defense for security systems, where one line of defense (the DRM system) may be hardware based but in the hands of the consumers, and the other line of defense (the ombudsman) may be software-based but under the control of a potentially trustworthy entity, or at least one whose incentives are not aligned with the user of the device with the DRM system. In one embodiment, the ombudsman is implemented in a trusted execution environment, such as a Secure Enclave or Samsung's™ Knox™ environment. It may be protected by a secure boot process that verifies the validity of code before executing it, e.g., based on certificates of authorities.

In one embodiment, the rules followed by the ombudsman are employed to establish guidelines for transactions or other transfers between people or entities ("parties"). In one example, either party can establish terms using pre-defined options for transaction protection. Concrete examples of such terms include but are not limited to "buyer can undo the transaction request for 24 hours after transaction" and "seller agrees to send proof of provenance of item being sold within 6 hours after transaction or transaction if voided." Party A can present proposed terms and conditions to Party B, who can respond with acceptance or propose changes. Party A and B may both be represented by automated agents that are provided with preference guidelines from one or more associated users, wherein the preference guidelines indicate what terms are acceptable. The preference guidelines may also identify terms that possibly are acceptable, causing the agent to request approval from an associated user when such terms are matched but no automated transaction terms are matched. Alternatively, a user associated with an agent can be notified when special conditions are identified, e.g., when one or more risk conditions are matched, where such risk conditions may be provided by external entities such as security service providers, and/or by a user or admin associated with the user. Once both parties (whether agents or users) accept, the terms become part of the transaction record, allowing standardized, transaction-specific protections to be permanently appended to transaction terms.

In one embodiment, protections evolve based on the activities of the parties. For example, a seller may have highly restricted terms (e.g., shipment only after clearance of financial instruments) for new buyers, which automatically become less restrictive as buyers complete a configurable number of successful transactions. As another example, a buyer's ombudsmen may have highly restrictive terms for initial purchases from a new seller (e.g., 72-hour delays before transfer of funds with cancellation possible during the delay), which automatically become less restrictive as the buyer completes a configurable number of successful transactions with a seller.

In one embodiment, an AI transaction analyst determines a probability of various threats, such as malware and other scams, which may be identified using a variety of techniques. One such technique is disclosed in co-pending application titled "Protection Against Token-Based Malicious Scripts" by Markus Jakobsson. Informed by such risk assessments or other relevant techniques, and based on a configurable list of acceptable probabilities, this results in additional mitigation (2FA, additional authorization, time delay, etc.). One approach for performing related tasks is disclosed in co-pending application titled "Node Characterization and Scoring Method" by Markus Jakobsson. Relevant techniques are also disclosed in co-pending application titled "Token Insurance Technique" by Keir Finlow-Bates and Markus Jakobsson. The AI transaction analyst may be associated with or part of a token that owns or otherwise controls a token that is to be insured. Techniques for this are disclosed in co-pending application titled "NFTs that own assets" by Keir Finlow-Bates.

An ombudsman can process end-to-end encrypted data between a client and a server, without having access to the plaintext data. By identifying the type of request, which can be done based on headers, packet sizes, un-encrypted data and other contextual data, the ombudsman can determine what packets or interactions to block, delay, or otherwise modify, causing an interruption of the exchange in a manner that is consistent with the security goals. Thus, an ombudsman can buffer one or more messages, potentially causing a time-out and a retry, and then initiate a security action, such as a verification with a third party, a step-up authentication with a user corresponding to the client, a security determination based on IP addresses of the client followed by a conditional action, where the conditional action may be informed by a policy associated with the client, with the type of request, or with a risk score determined based on IP address and other contextual data of the client. This enables integration of the disclosed techniques with legacy services in the context of encryption.

The ombudsman may perform security actions based on contextual information, such as behavioral profiles associated with the client computer. For example, if a client computer makes a series of API calls or network requests indicative of a potential ransomware attack being performed, then the ombudsman may block outgoing traffic except to pre-approved services, may block incoming traffic of certain types of from unknown locations, may send traffic to a sandbox that may be operated by the ombudsman or an on-network service provider. The ombudsman may also notify security service providers, admins associated with the client, or convey warnings to the client himself/herself, e.g., using a contact number associated with this user. By optionally continuing execution in a sandbox, it is possible to hide the fact that the attack was detected from the attacker, which may be associated with a command and control (C&C) server that is connected to by the ransomware. The ransomware may be configured to export sensitive data, e.g., numbers that have the format of a social security number, a bank account number, or personal photos. The sandbox may introduce fake information to be transmitted, where this fake information can be used to identify whether the attacker attempts to monetize the stolen data. This fake information may be generated by the sandbox, the ombudsman, or by associated parties, such as security service providers.

An ombudsman can operate as a proxy that is an encryption endpoint, allowing it to access plaintext data by decrypting it, then re-encrypting it before it is re-transmitted. The ombudsman can modify such data before re-encrypting it, e.g., to block dangerous requests, delay actions, or to improve user experience. For example, the ombudsman may determine a risk profile associated with a request, and modify the request according to one or more policies that are evaluated on the result of the risk profile determination. For example, if the ombudsman determines that a user is re-using a high-value password for a new service, it may replace the password with one that it generates itself. Onwards, it may replace requests and their contexts to insert the newly generated password instead of the high-value password, after verifying the incoming request to determine that it comprises data that corresponds to the high-value password. Similarly, the ombudsman can block cookies that are automatically transmitted from a client computer to a service provider if such cookies are determined to be unsafe or undesirable. Similarly, the ombudsman may be a repository of cookies and selectively introduce such along with requests based on security determinations.

An ombudsman may hold at least a portion of an access credential required to perform transactions, where another portion may be held by a wallet or other application on a user client. This way, the ombudsman and the wallet need to collaborate to initiate the transaction, where the transaction may be a transfer of ownership, for example. This may be achieved using secret sharing methods. The ombudsman may hold a value V1 and the wallet a value V2, such that V1 combined with V2 corresponds to the key needed to perform the transaction. One form of combination is bitwise XOR, and another is modular addition over a prime field. Yet other methods of combination are possible, as will be understood by a person of skill in the art. The generation of a transaction may be performed by the wallet generating a request using its share of the key, synch as V2, and transmitting this transcript to the ombudsman. The transcript would identify the requested transaction, determine a risk score, optionally perform a security verification (such as requesting a 2FA to be performed) based on the risk score and/or user settings, and, conditional on the risk score and the success of the optional security verification, generate a transcript based on the received transcript and the value V1, such that the transcript generated by the ombudsman corresponds to the transcript that would have been generated by a client alone having full access to the key needed to perform the transaction. This way, neither the client nor the ombudsman alone can cause transactions to be performed without the collaboration of the other. This reduces the threat of attacks on the client computer, such as malware attacks, social engineering attacks, and more.

The security verification taken by the ombudsman may be automated or may involve human support, e.g., to alert a user corresponding to the client of a risk by explaining a threat. Having such additional service may be a subscription feature that users sign up for to protect themselves or their loved ones from abuse, and it may be a feature that users (whether individuals or enterprises) may subscribe to in order to get discounts on insurance premiums related to protection of their digital assets. An ombudsman may notify insurers of transactions, e.g., type, size, volume, risk, as a feedback mechanism that provides the insurer with data to determine premium changes, such as discounts, and assess risk. These notifications may be anonymized in the sense that they may hide the exact nature of the asset, and only indicate a value, an asset class, etc. Subscribers may have to approve for such notifications to be generated, e.g., as part of getting a reduction of their premiums, in order to be allowed to purchase insurance, or in order to facilitate clawback of lost assets, should the ombudsman fail to properly protect a user, e.g., in the context of an advanced attack in which the 2FA channel to the user has been corrupted as well as the client device.

In one embodiment, physical objects or resources are represented with tokens, such as NFTs. One reason may be to represent ownership, e.g., of a real estate property, a car. It may also correspond to evidence of an action, such as the replacement of a roof on a home. One way to represent a physical object or an action on a physical object is to generate, using a trusted certificate authority and optionally using individual assertions, such as digital signatures generated by notaries, on descriptions that uniquely identify the physical object or action to it, where such digital representations are stored on a blockchain, e.g., in the form of tokens, such as NFTs. Fungible tokens can also be used to represent resources whose ownership can be fractional. The token representing a physical object or associated action, which we may refer to as an anchoring token as it provides an anchor between the physical and the virtual world, may be protected using one or more ombudsman entities. A first ombudman may act as a gateway to a wallet that owns the anchoring token. A second ombudsman may be associated directly with the token, as opposed to the wallet owning the token, and may be tasked with making sure that the token is only transferred in a manner that is consistent with one or more policies. These policies may be associated with the token at the time of minting, be decided or determined by a certification authority associated with the token, or may be implicitly required based on a type of resource. For example, in one jurisdiction, all condos may be required to be associated with a first policy that is policed by one out of a list of approved ombudsmen (corresponding to the second ombudsman in the description above), while in the same jurisdiction, coops may be governed by another set of policies. Accordingly, the ombudsman or ombudsmen may approve or deny modifications to the token and/or its ownership based on different policies. The ombudsman or ombudsmen may also be in charge of verifying the correct payment of royalties, taxes, fees etc., based on policies associated with tokens. Alternatively, the ombudsman or ombudsmen may be tasked with collecting and distributing such funds. If a person wishes to transfer a token between two wallets he or she owns, and this does not require the payment of taxes, for example, then this user may have to interact with the ombudsman to prove ownership of both the associated wallets, or a tax payment will be required or levied. The ombudsman receiving such evidence may be required to report this to third parties, such as governmental agencies, or at least enable the selective auditing of records related to such actions. An ombudsman may also perform such duties for virtual goods, where required by law.

In one embodiment, an ombudsman is integrated with the machinery that embodies the wallet, e.g., by placing the ombudsman in a safe environment that is protected against corruption, e.g., by malware. One such environment is TrustZone. Another such environment is a Secure Enclave. Yet another approach is a Digital Rights Management (DRM) unit with protection against malware, e.g., by executing in a protected partition. An ombudsman can also be incorporated with network appliances that handle traffic from wallets, e.g., proxies, gateways, routers, wireless modems, etc.

In one embodiment, an ombudsman, whether co-located with an associated wallet or not, is configured to manage subscriptions and other recurring payments. For example, the ombudsman and/or the wallet may associate a smart contract with a token, enabling recurring payments to be made, where at least some of these recurring payments are triggered or blocked by the ombudman. As explained previously, a wallet may be associated with multiple ombudsmen, e.g., one co-located with the wallet on the same hardware, intranet or geographic location, and another located as a gateway, a cloud service, etc. Two or more wallets may each have the capability to trigger or suppress recurring payments. The triggering of such may be performed by the ombudsman releasing a recurring payment, which may either have been delegated to be performed by the ombudsman (e.g., by associating a private key used for release with the ownership of the token) or which have already been made but for which transcripts are held by the ombudman, only released once the trigger event is observed. The suppression of a payment can be performed by blocking the transmission of a transcript or by not using the described private key to initiate it. When there are no more remaining funds, or there are insufficient funds associated with a token to which a smart contract is associated, the wallet and/or the ombudsman may automatically associate a similar contract with a new token that may optionally have been identified as being the next token to be used. Alternatively, a user may indicate that a subscription will be ended when funds associated with a token are found to be insufficient, or that upon such an event, a user is prompted to approve a renewal in the form of the connection of a new token to an applicable smart contract.

In one embodiment, an ombudsman may identify conditions that indicate that, according to a user-approved policy related to subscriptions, a subscription should be canceled. For example, a user may create or approve a policy indicating that if the user does not access a given resource, e.g., using the wallet, for a period of two months, then the subscription providing access to this resource would be allowed to lapse. As an alternative, when a triggering event (which may include the absence of an event, such as the absence of user engagement with a resource) is observed, the ombudsman may cause a notification to be made to the user, indicating a need for the user to determine whether to continue the associated subscription or not. Moreover, the ombudsman may determine, based on the volume and frequency of use, what type of subscription among a collection of tiered subscription, to switch to or prompt the user whether the user wishes to switch to. For example, a user may be allowed to choose between different levels of quality of service, volume of access, or extents of access, wherein indications of changes in user behavior may be interpreted by the ombudsman as indicative that a switch to another subscription tier may be more desirable to the user. This may be determined relative to a system-wide policy, a user-specified or selected policy, or a combination of such.

In one embodiment, subscriptions must be reconfirmed based on triggers, such as elapsed time or an event external to the contract. For example, at the creation of a contract with multiple withdrawals, the contract would have a default reconfirmation event or the user can define the reconfirmation event or user can categorize the transaction creating category-specific, standardized triggers to reconfirm. Illustrative examples of this regimen would include new, repetitive transactions reconfirmed upon second payment; media subscriptions with monthly payments requiring re-confirmation every six months; long term, repetitive payments like fixed interest, mortgage loans, confirmed annually; annual pre-defined charity donations reconfirmed when the payment account balance falls a defined percentage; weekly allowance for children, reconfirmed weekly by parents based on child's behavior; investment tranches for a startup, reconfirmed based on the performance of the startup or the broader market.

The techniques disclosed herein for managing subscriptions also apply to the management of memberships that are free. This may include the management of receiving mailing list information, e.g., based on whether a user interacts with received content. It may also be used to manage protection measures governing whether a user will see gifted tokens, including what is referred to as "dust". An ombudsman can determine, based on one or more policies, and based on interaction behaviors with a sender, whether a token that is transferred from the sender will be accepted or not. If a token is to be not accepted, the ownership can be automatically changed to a trash can entity, e.g., to protect the user against potential attacks or avoid nuisance based on token-based spam. Furthermore, an ombudsman can access a set of content-based policies, which may be set by a user, a guardian of the user, an admin or an employer of the user, etc. The content-based policies may control whether various forms of content be transferred in or out of the wallet, and by acting as a proxy between the wallet and a storage entity, what content can be processed at various times. For example, a parent may indicate that a user is not allowed to access a first type of content, and is only allowed to access a second type of content for at most 1 h, and only between 3 pm and 8 pm. This parent may also indicate that the user is not allowed to sell or lend out a given token, or purchase a token that does or does not match a given policy specified or selected by the parent. An ombudsman may also act as a digital rights management module for users within a given jurisdiction, controlling access to what content they may process or transfer.

An ombudsman may be able to suppress or delay a request from a wallet, or a response to a request from a wallet, based on evaluating whether the request is associated with a risk and performing a conditional 2FA verification with a user associated with the wallet when the risk exceeds a threshold that may be a parameter that is set by the user or an associated admin. The 2FA verification may utilize the transmission of codes, e.g., by email, SMS, or by displaying the code on a secure screen associated with the ombudsman. Such a secure screen may be physically connected with the ombudsman entity, e.g., incorporated in a device that houses the wallet. The 2FA verification may also be based on a registered user providing a biometric input to a sensor associated with the ombudsman.

It is desirable to incorporate artificial intelligence (AI) methods in ombudsman units. These AI units can, for example, be used to provide content recommendations based on previous actions and past and current wallet contents; be used to automatically configure and reconfigure devices and services, e.g., to accommodate for the inclusion of new devices or services into an environment, the replacement of devices or services, or the change of needs of the user; and to provide security guidance and actions that may be configured based on the user's exposure and needs. This can be done using an in-wallet ombudsman unit, which may, for example, provide configuration of the wallet and its operation. It can also be done by an ombudsman operating on a gateway or in the cloud, e.g., by filtering content and requests and by providing configuration parameters to an in-wallet agent. One AI method may have an in-ombudsman component that identifies training material (e.g., based on observed actions and content), and which operates with an ombudsman unit outside the wallet, or an AI agent operating on the cloud, where such a second entity may receive profiles that are generated from aggregating training material, and where the profiles may hide sensitive material from this second entity. The second entity may obtain multiple profiles from multiple ombudsman entities, which may correspond to multiple different users, and perform clustering based on these multiple profiles. The clustering of profiles enables feedback to the in-wallet ombudsman that enables learning not only from the locally observed actions and content, but also based on actions and content associated with other users in the same cluster. This strengthens security, improves recommendations, and streamlines configurations to account for insights gained by like-minded users and their ombudsmen.

An ombudsman may combine several functionalities. Some of these may be desirable to one party, such as a device user, whereas others may be desirable to a second party, such as a content creator or rights management organization. The multiple functionalities may be fused together, e.g., by depending on the same software and/or hardware components, the same certified identities, and the same audit processes. This way, a user cannot easily disconnect one functionality without also disconnecting another. For example, a user may desire security features, such as those described herein, but may wish to evade functionality that ensures proper payment of royalties or taxes. However, by combining these functionalities within one and the same ombudsman entity, a user cannot easily disable functionality in a selective manner. This is particularly relevant in contexts where the functionality considered is delivered using software and/or cloud services, but also relevant in the context of hardware embodiment, although manipulation is typically more involved in such cases. One way to achieve this is to combine two types of functionality into one flow, e.g., by requesting anti-virus updates in the same authenticated end-to-end encrypted messaging exchange as purchase audit reports are uploaded, thereby making it difficult to obtain anti-virus updates without also delivering the audit reports. Thus, one functionality can be engineered to cause side-effects whose presence or absence can be used to detect manipulation of an ombudsman unit. This technique also applies to protecting DRM environments, and especially DRM environments that in part are software. Audit data can be delivered to authorized collectors of such data, such as security companies, but in a format that is not readable to the collectors of the data; the collectors would then be required to forward the audit data. In some instances, the collectors of data may provide privacy protection by disassociating reported audit data from device identifiers, using pseudonyms instead, where such pseudonyms may be session based and stored in a lookup table by the collector of data, thereby enabling selective tracking in cases where abuse is identified by an authority receiving audit data from the collector. One such authority may be a tax collection entity; another may be a royalty collection entity. The collectors of data may use escrow functionality such as what is disclosed in the co-pending patent application titled "Automated Wallet and Transaction Control". Escrow functionality may also be incorporated in the ombudsman functionality, e.g., by the ombudsman generating encrypted records of relevant data (such as audit data), where these records are generated by encrypting using a public key of a trusted third party, i.e., the escrow authority, and transmitted to a party that stores the encrypted record. If and when needed, the encrypted record can be decrypted by the escrow authority. The encrypted records may be associated with anonymized description data, i.e., specifying purchase records, encrypted identities of the wallet performing the purchase, etc. If encrypted, such records can be searched by the escrow authority to identify select records of relevance. It is also practical to group encrypted records that are collected from a given ombudsman, where the grouping may be based on an identifier of the ombudsman, where this identifier may be a pseudonym that is not by itself identifying the associated wallet or user, but which can be linked to it, e.g., by decrypting it.

In one embodiment, the fusing of two or more functionalities, as described above, is performed without the interleaving of information exchanges related to the two or more functionalities. Instead, the ombudsman entity is programmed to perform the two or more functionalities, triggered by observations and inputs, and is keeping state information regarding the completion success of the associated interactions. The state may, for example, identify the number of consecutive times one type of interaction (such as the reporting of audit data to a tax authority) failed, and if this associated counter were ever to reach a threshold number, such as 10, then the functionality of the ombudsman would be automatically modified, e.g., to block interactions of another type, such as the downloading of new content, the decryption of stored assets, the sale of tokens associated with a wallet, etc. This makes it undesirable for a malicious user to tamper with the ombudsman, e.g., by physically or logically controlling what information it receives or is allowed to communicate to the outside world. Such manipulation would otherwise be possible, e.g., by malware or user-installed malicious processes, that are configured to block connections to selected web resources, such as the website or FTP site of the tax authorities, or proxies thereof. The automatic modification of the functionality, which we may refer to as "freezing", may be undone by a user permitting previously unsent transcripts to be sent, previously scheduled interactions and exchanges to be performed, and, optionally, for penalties to be paid. In some instances, the unfreezing of an ombudsman, and associated resources, may require the installation of trusted software on the device running the ombudsman. This may be the device running the wallet, for example, or a user-controlled infrastructure node such as a router.

The fusing of functionality has many applications, not limited to the management of crypto wallets, and can, for example, be used to improve the assurance of DRM nodes. Such nodes may be comprised of hardware and/or software, and may be semi-trusted. Their corruption, the blocking of them, or the manipulation of transcripts sent by them (e.g., using man-in-the-middle attacks) can be detected and discouraged using methods such as those disclosed herein. In one embodiment, an ombudsman unit associated with a consumer device may be required to send audit data of some pre-determined type to an external node, such as a trusted network node, where the failure to do so may be determined either by the ombudsman node or the trusted network node, and which may result in a modification of functionality of the ombudsman or the modification of functionality of the trusted network node which may, for example, stop approving transaction requests from the ombudsman. Here, the ombudsman may correspond to the DRM node to be protected. In one example use situation, each DRM node may be required to send some usage statistics for every time period of a pre-determined duration (e.g., one week) or restrictions on the services for the associated device are imposed, e.g., by limiting access to high-definition content, limiting access to advertisement-free content, limiting access to subscribed content, limiting access to leased content, limiting access to content that can be decrypted by the DRM unit, etc. If such a restriction is placed, the ombudsman unit may be unfrozen by a signed notification to unfreeze from the trusted network node, by the ombudsman, or a combination thereof.

Multiple ombudsmen, associated with different devices that are part of the same network, may interact with each other and may keep states indicating the reporting status (or more generally, perceived functionality) of other ombudsmen in the group. If one ombudsman is determined to be corrupted, e.g., by malware, user-installed malicious software, unauthorized hardware modifications etc., then other ombudsmen in the group may report on this corruption, causing a modification of access by the reported ombudsman to select resources. This way, networked consumer products can help each other determine failures. This is desirable for consumers who may not be aware of such failures, e.g., if these are caused by malware, or surreptitiously installed modifications of the consumer devices, e.g., by employers or former partners. It is also desirable for content and service providers, e.g., to protect against abuses of copyright, etc.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A non-fungible token (NFT) platform for processing tokens in a distributed computing environment, comprising:

a network interface;

a memory, storing instructions for minting an NFT; and at least one processor, executing on at least one computing unit from a plurality of computing units in a distributed computing environment, wherein a given processor of the at least one processor is configured to perform the instructions to:

generate, using the network interface, an instant NFT that is privately maintained, wherein the instant NFT represents a concrete NFT to be minted at a later stage; and wherein the instant NFT comprises an initial record, including:

a first reference to a content element to be included in the concrete NFT;

a second reference to at least one policy that will govern the concrete NFT; and a first timestamp, associated with a time of creation for the instant NFT;

determine a modification to the initial record associated with the instant NFT, wherein the modification is indicative of a transaction associated with the instant NFT; and wherein the modification is associated with a second timestamp;

monitoring, via the network interface, a set of network processing expenditure estimates associated with a public blockchain, to detect when the set of network processing expenditure estimates falls beneath a pre-determined threshold; and when the set of network processing expenditure estimates is detected to fall beneath the pre-determined threshold, automatically minting the instant NFT as the concrete NFT on the public blockchain by executing a smart contract associated with the concrete NFT using the network interface, wherein minting the instant NFT comprises generating a concrete record for the concrete NFT based on the initial record;

wherein the concrete NFT is minted to have access to the content element; and wherein the concrete NFT is minted to be governed by the at least one policy.

2. The NFT platform of claim 1, wherein the instant NFT is stored until being minted into the concrete NFT, using at least one protection technique selected from the group consisting of:

recording a value representing the initial record associated with the instant NFT on a private blockchain;

digitally signing the instant NFT, using a private key associated with a certified public key, wherein a certification indicates a level of trust associated with a holder of the private key;

recording the modification by time-stamping a collection that includes the instant NFT; and storing the instant NFT in a secure storage area, in a format that provides audit of access and additional modification.

3. The NFT platform of claim 2, wherein recording the modification by time-stamping the collection comprises:

generating a hash of edits in a hash chain, and incorporating a current hash value of the hash chain in a blockchain entry.

4. The NFT platform of claim 1, wherein the given processor is further configured to:

generate a plurality of instant NFTs, each associated with a distinct record from a plurality of records;

time-stamp the plurality of records as a collection;

generate a hash of the collection; and record the hash on a blockchain.

5. The NFT platform of claim 1, wherein all modifications to the initial record are stored in a secure storage area, wherein the secure storage area is incorporated into a digital wallet.

6. The NFT platform of claim 1, wherein:

the concrete NFT indicates at least one public key associated with at least one recent owner of the instant NFT; and minting the instant NFT as the concrete NFT comprises specifying a most recent owner of the instant NFT, associated with the at least one public key, as an owner of the concrete NFT on the public blockchain.

7. The NFT platform of claim 1, wherein:

the initial record associated with the instant NFT is associated with an ownership that confers at least one right on an associated entity; and the modification comprises a right modification of the at least one right.

8. The NFT platform of claim 1, wherein minting the instant NFT as the concrete NFT is performed in response to at least one selected from the group consisting of:

receiving a request to produce the concrete NFT from a user; and detecting an occurrence of an additional triggering event based on a given policy specified for the concrete NFT.

9. The NFT platform of claim 1, wherein the set of network processing expenditure estimates associated with the public blockchain comprise at least one financial expenditure associated with minting the instant NFT as the concrete NFT.

10. The NFT platform of claim 1, wherein the given processor is further configured to:

generate a second instant NFT;

determine a particular modification to an additional initial record associated with the second instant NFT, wherein the particular modification is indicative of a particular transaction associated with the second instant NFT;

assess that the particular transaction is at least one selected from the group consisting of an accidental transaction and a fraudulent transaction; and revert the particular modification to the additional initial record associated with the second instant NFT.

11. A method for processing tokens in a distributed computing environment, the method comprising:

generating, using a network interface, an instant NFT that is privately maintained, wherein the instant NFT represents a concrete NFT to be minted at a later stage; and wherein the instant NFT comprises an initial record, including:

a first reference to a content element to be included in the concrete NFT;

a second reference to at least one policy that will govern the concrete NFT; and a first timestamp, associated with a time of creation for the instant NFT;

determining a modification to the initial record associated with the instant NFT, wherein the modification is indicative of a transaction associated with the instant NFT; and wherein the modification is associated with a second timestamp;

monitoring, via the network interface, a set of network processing expenditure estimates associated with a public blockchain, to detect when the set of network processing expenditure estimates falls beneath a pre-determined threshold; and when the set of network processing expenditure estimates is detected to fall beneath the pre-determined threshold, automatically minting the instant NFT as the concrete NFT on the public blockchain by executing a smart contract associated with the concrete NFT using the network interface, wherein minting the instant NFT comprises generating a concrete record for the concrete NFT based on the initial record;

wherein the concrete NFT is minted to have access to the content element; and wherein the concrete NFT is minted to be governed by the at least one policy.

12. The method of claim 11, wherein the instant NFT is stored until being minted into the concrete NFT, using at least one protection technique selected from the group consisting of:

recording a value representing the initial record associated with the instant NFT on a private blockchain;

digitally signing the instant NFT, using a private key associated with a certified public key, wherein a certification indicates a level of trust associated with a holder of the private key;

recording the modification by time-stamping a collection that includes the instant NFT; and storing the instant NFT in a secure storage area, in a format that provides audit of access and additional modification.

13. The method of claim 12, wherein recording the modification by time-stamping the collection comprises:

generating a hash of edits in a hash chain, and incorporating a current hash value of the hash chain in a blockchain entry.

14. The method of claim 11, further comprising:

generating a plurality of instant NFTs, each associated with a distinct record from a plurality of records;

time-stamping the plurality of records as a collection;

generating a hash of the collection; and recording the hash on a blockchain.

15. The method of claim 11, wherein all modifications to the initial record are stored in a secure storage area, wherein the secure storage area is incorporated into a digital wallet.

16. The method of claim 11, wherein:

the concrete NFT indicates at least one public key associated with at least one recent owner of the instant NFT; and minting the instant NFT as the concrete NFT comprises specifying a most recent owner of the instant NFT, associated with the at least one public key, as an owner of the concrete NFT on the public blockchain.

17. The method of claim 11, wherein:

the initial record associated with the instant NFT is associated with an ownership that confers at least one right on an associated entity; and the modification comprises a right modification of the at least one right.

18. The method of claim 11, wherein minting the instant NFT as the concrete NFT is performed in response to at least one of:

receiving a request to produce the concrete NFT from a user; and detecting an occurrence of an additional triggering event based on a given policy specified for the concrete NFT.

19. The method of claim 11, wherein the set of network processing expenditure estimates associated with the public blockchain comprise at least one financial expenditure associated with minting the instant NFT as the concrete NFT.

20. The method of claim 11, wherein the method further comprises:

generating a second instant NFT;

determining a particular modification to an additional initial record associated with the second instant NFT, wherein the particular modification is indicative of a particular transaction associated with the second instant NFT;

assessing that the particular transaction is at least one selected from the group consisting of an accidental transaction and a fraudulent transaction; and reverting the particular modification to the additional initial record associated with the second instant NFT.

* * * * *